(12) United States Patent
Heilskov et al.

(10) Patent No.: US 11,780,690 B2
(45) Date of Patent: Oct. 10, 2023

(54) SINGLE DRIVE DUAL HOPPER CONVEYOR SYSTEM

(71) Applicant: Sukup Manufacturing Co., Sheffield, IA (US)

(72) Inventors: Chris Heilskov, Hampton, IA (US); David Jay Brownmiller, Mason City, IA (US); Adam Zweck, Rockwell, IA (US); Dustin Platte, Sheffield, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 0 days.

(21) Appl. No.: 17/885,253

(22) Filed: Aug. 10, 2022

(65) Prior Publication Data

US 2022/0380151 A1    Dec. 1, 2022

Related U.S. Application Data

(63) Continuation of application No. 17/194,413, filed on Mar. 8, 2021, now Pat. No. 11,447,348.

(60) Provisional application No. 62/987,635, filed on Mar. 10, 2020.

(51) Int. Cl.
| | |
|---|---|
| *B65G 23/34* | (2006.01) |
| *B65G 47/18* | (2006.01) |
| *B65G 67/24* | (2006.01) |
| *B65G 23/24* | (2006.01) |

(52) U.S. Cl.
CPC ............ *B65G 67/24* (2013.01); *B65G 23/24* (2013.01); *B65G 47/18* (2013.01); *B65G 2201/042* (2013.01); *B65G 2814/0326* (2013.01)

(58) Field of Classification Search
CPC ........ B65G 23/24; B65G 23/34; B65G 47/18; B65G 67/24; B65G 2201/042; B65G 2814/0326
USPC ................ 198/550.1, 550.5, 550.8, 575, 601
See application file for complete search history.

(56) References Cited

U.S. PATENT DOCUMENTS

| | | | | |
|---|---|---|---|---|
| 835,288 | A | * | 11/1906 | Patterson |
| 3,252,562 | A | * | 5/1966 | Brembeck ............ A01K 5/0258 198/550.1 |
| 3,589,502 | A | * | 6/1971 | Maillet ................. B65G 19/28 198/729 |
| 4,856,640 | A | * | 8/1989 | Beswick ................ B65G 47/18 198/771 |
| 4,953,684 | A | * | 9/1990 | Beswick ................ B65G 47/18 198/443 |

(Continued)

*Primary Examiner* — Douglas A Hess
(74) *Attorney, Agent, or Firm* — BROWNWINICK LAW FIRM; Christopher A. Proskey

(57) ABSTRACT

A single drive dual hopper conveyor system is presented having a center conveyor system and a pair of side conveyor systems that are connected to one another. A single motor is connected to the center conveyor system and drives movement of a belt within the center conveyor system. The connection of the center conveyor system to the side conveyor system causes the belts of the side conveyor systems to be simultaneously driven as the belt of the center conveyor system is driven. This arrangement eliminates the need for multiple motors. A guide at the center of the belts is configured to guide the belts through the center of the housings and prevent the buildup of grain within a cut-out section of the flights of the belt that is needed to allow access to the links of the belts to facilitate driving of the belts.

30 Claims, 35 Drawing Sheets

(56) References Cited

U.S. PATENT DOCUMENTS

| | | | | |
|---|---|---|---|---|
| 6,561,342 B2* | 5/2003 | Lepage | ............... | B65G 33/08 |
| | | | | 198/550.1 |
| 9,617,084 B1* | 4/2017 | Maxwell | ............... | B65G 47/72 |
| 9,643,787 B1* | 5/2017 | Carteri | ............... | B65G 33/34 |
| 9,663,303 B2* | 5/2017 | Waldner | ............... | B65G 41/008 |
| 9,788,489 B2* | 10/2017 | Jager | ............... | A01D 57/20 |
| 10,710,811 B2* | 7/2020 | Igoe | ............... | B65G 41/008 |

* cited by examiner

SINGLE DRIVE DUAL HOPPER CONVEYOR SYSTEM

CROSS-REFERENCE TO RELATED APPLICATIONS

The present application is a continuation of U.S. Utility application Ser. No. 17/194,413, which was filed on Mar. 8, 2021, which claims the benefit of U.S. Provisional Application No. 62/987,635, which was filed on Mar. 10, 2020, the entirety of which is hereby incorporated by reference herein in its entirety, including any figures, tables, or drawings or other information.

FIELD OF THE DISCLOSURE

This disclosure relates to grain handling devices used in agriculture. More specifically and without limitation, this disclosure relates to a conveyor system for transporting particulate material, such as grain.

OVERVIEW OF THE DISCLOSURE

Modern harvesters (such as combines) are configured to separate the desired portion of the crop (such as the grain, kernels, or beans), from the undesired chaff (such as the husk, cobb or shell). This grain, which is in particulate form is often transported from the harvester into a grain trailer of a semi-truck.

One common form of a grain trailer is what is known as a belly dump trailer. Many of these belly dump trailers have two hoppers in their bottom side that are spaced a distance from one another. One common manufacturer of dual hopper belly dump trailers includes Timpte, Inc. of 1827 Industrial Drive, David City, Nebr. 68632, however many manufacturers produce dual hopper belly dump trailers.

Once these trailers arrive at their desired location, they must be unloaded. Conventionally, most unload stations have only a single pit. This means that the belly dump trailer must be emptied one hopper at a time. That is, one of the two hoppers is aligned over the grate of the pit and then emptied. Once that portion of the trailer is emptied, the driver must climb into the truck and move the trailer such that the second hopper is aligned over the grate of the pit and then emptied.

This process is inefficient because it only allows one of the two hoppers to be unloaded at a time, which slows the process down. In addition, it requires the driver to get into the truck and move the truck and trailer after the first hopper is emptied. This requires the driver to properly align the second hopper over the grate of the pit, which causes delay and is inconvenient. Once the second hopper is pulled over that grate of the pit, the driver must get out of the truck and initiate dumping the remaining contents of the trailer from the second hopper, which causes delay and is inconvenient.

In view of the inconveniences and inefficiencies of having a single pit unload stations, it is desirable to have a dual pit unload station. While having a dual pit unload station has its advantages, dual pit unload stations have substantial complexities and drawbacks.

Therefore, for all the reasons stated above, and the reasons stated below, there is a need in the art for an improved dual hopper unload system.

Thus, it is a primary object of the disclosure to provide a single drive dual hopper conveyor system that improves upon the state of the art.

Another object of the disclosure is to provide a single drive dual hopper conveyor system that improves efficiencies.

Yet another object of the disclosure to provide a single drive dual hopper conveyor system that reduces unload time.

Another object of the disclosure is to provide a single drive dual hopper conveyor system that eliminates the need to move a grain trailer during the unload process.

Yet another object of the disclosure is to provide a single drive dual hopper conveyor system that increases unload speed.

Another object of the disclosure is to provide a single drive dual hopper conveyor system that increases unload capacity.

Yet another object of the disclosure is to provide a single drive dual hopper conveyor system that is relatively inexpensive.

Another object of the disclosure is to provide a single drive dual hopper conveyor system that makes it easier for a driver to unload a dual hopper belly dump grain trailer.

Yet another object of the disclosure is to provide a single drive dual hopper conveyor system that is easy to install.

Another object of the disclosure is to provide a single drive dual hopper conveyor system that can be used with practically any grain storage facility.

Yet another object of the disclosure is to provide a single drive dual hopper conveyor system that can be used with practically any grain processing facility.

Another object of the disclosure is to provide a single drive dual hopper conveyor system that has a long useful life.

Yet another object of the disclosure is to provide a single drive dual hopper conveyor system that is durable.

Another object of the disclosure is to provide a single drive dual hopper conveyor system that has a robust design.

Yet another object of the disclosure is to provide a single drive dual hopper conveyor system that is high quality.

Another object of the disclosure is to provide a single drive dual hopper conveyor system that can be used with practically any dual hopper belly dump grain trailer.

Yet another object of the disclosure is to provide a single drive dual hopper conveyor system that is easy to use.

Another object of the disclosure is to provide a single drive dual hopper conveyor system that allows for the simultaneous emptying of both hoppers at the same time.

Yet another object of the disclosure is to provide a single drive dual hopper conveyor system that only requires the use of a single motor.

Another object of the disclosure is to provide a single drive dual hopper conveyor system that is easy to control.

Yet another object of the disclosure is to provide a single drive dual hopper conveyor system that is essentially foolproof to operate.

Another object of the disclosure is to provide a single drive dual hopper conveyor system that requires minimal wiring to install.

Yet another object of the disclosure is to provide a single drive dual hopper conveyor system that prevents the side conveyors from driving at different speeds.

Another object of the disclosure is to provide a single drive dual hopper conveyor system that has a minimal risk of plugging.

Yet another object of the disclosure is to provide a single drive dual hopper conveyor system that it gentle on grain.

Another object of the disclosure is to provide a single drive dual hopper conveyor system that requires a minimal amount of energy to operate.

These and other objects, features, or advantages of the disclosure will become apparent from the specification, figures, and claims.

SUMMARY OF THE DISCLOSURE

A single drive dual hopper conveyor system is presented having a center conveyor system and a pair of side conveyor systems that are connected to one another. A single motor is connected to the center conveyor system and drives movement of a belt within the center conveyor system. The connection of the center conveyor system to the side conveyor system causes the belts of the side conveyor systems to be simultaneously driven as the belt of the center conveyor system is driven. This arrangement eliminates the need for multiple motors as well as eliminates the possibility that any of the belts are not functioning when needed thereby preventing plugging of the system. A guide is placed at the center of the belts that is configured to guide the belts through the center of the housings as well as prevent the buildup of grain within a cut-out section of the flights of the belt that is needed to allow access to the links of the belts to facilitate driving of the belts.

DETAILED DESCRIPTION OF THE DISCLOSURE

Figure 1:
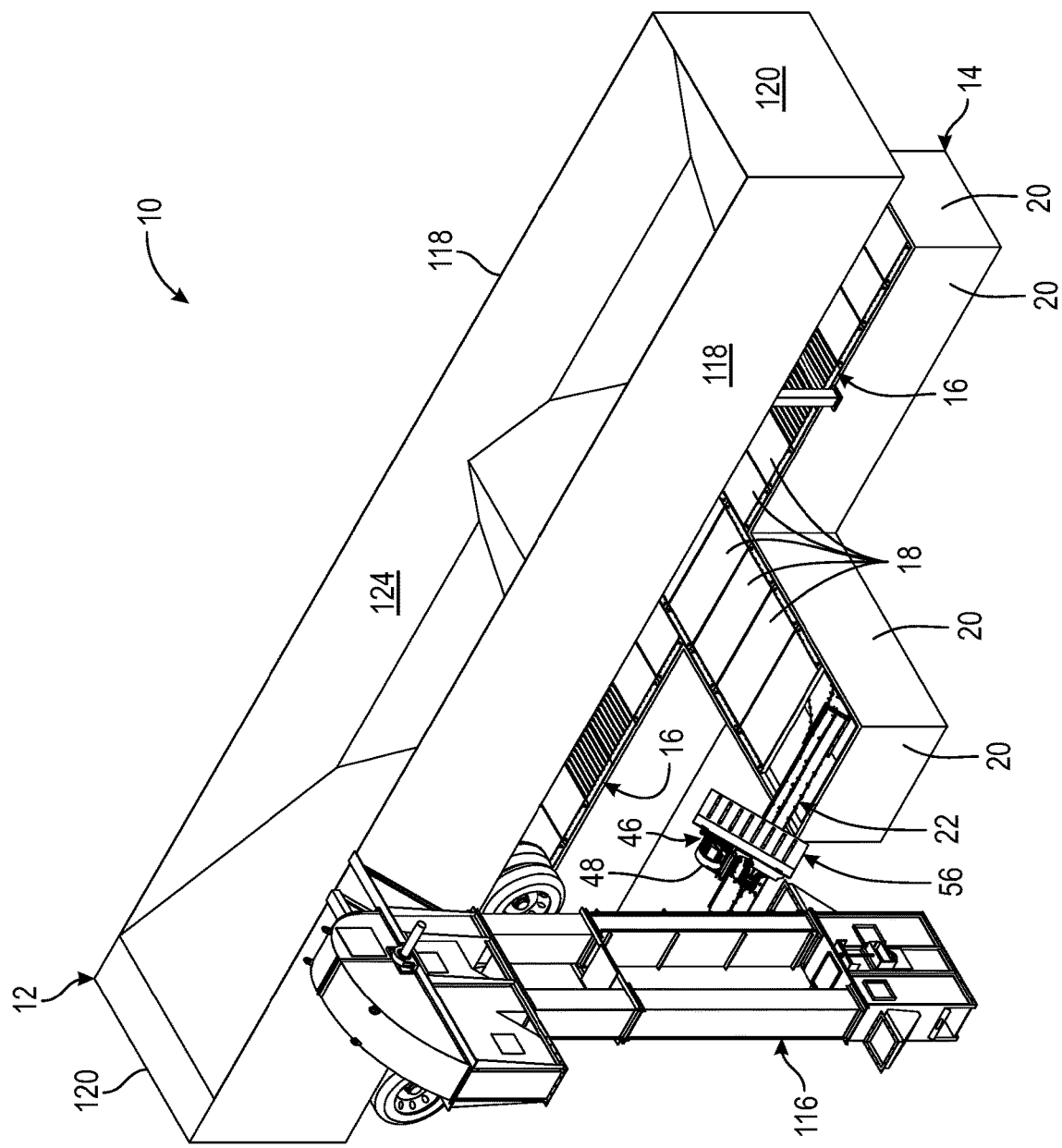
FIG. 1 shows an upper front left perspective view of a single drive dual hopper conveyor system, in accordance with one or more arrangements; the view showing the system configured for use with a dual hopper belly dump trailer; the view showing the system configured with a grain transfer or storage device.
Figure 2:
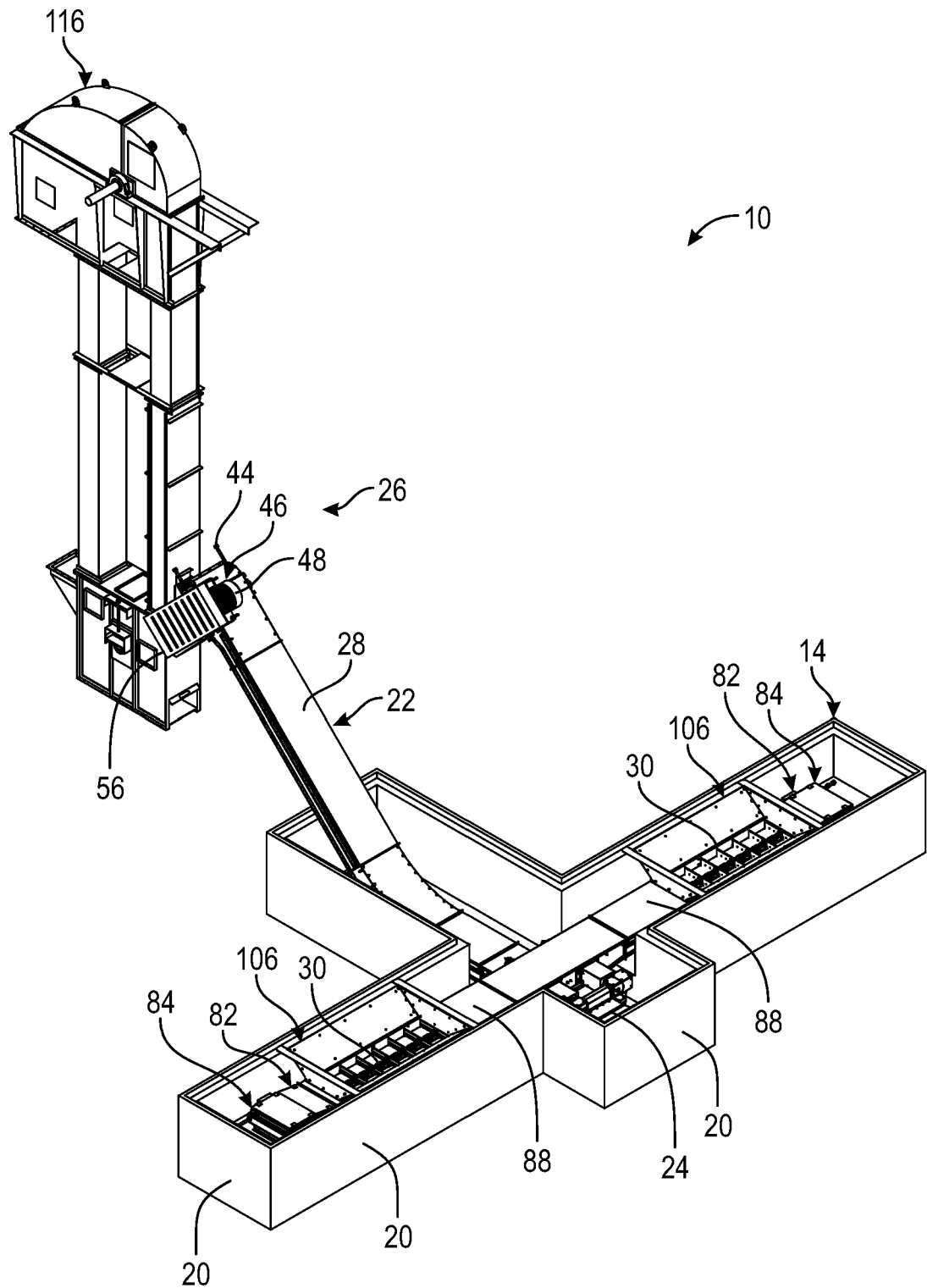
FIG. 2 shows an upper front left perspective view of a single drive dual hopper conveyor system, in accordance with one or more arrangements; the view showing the system with hoppers on side conveyor systems omitted.
Figure 3:
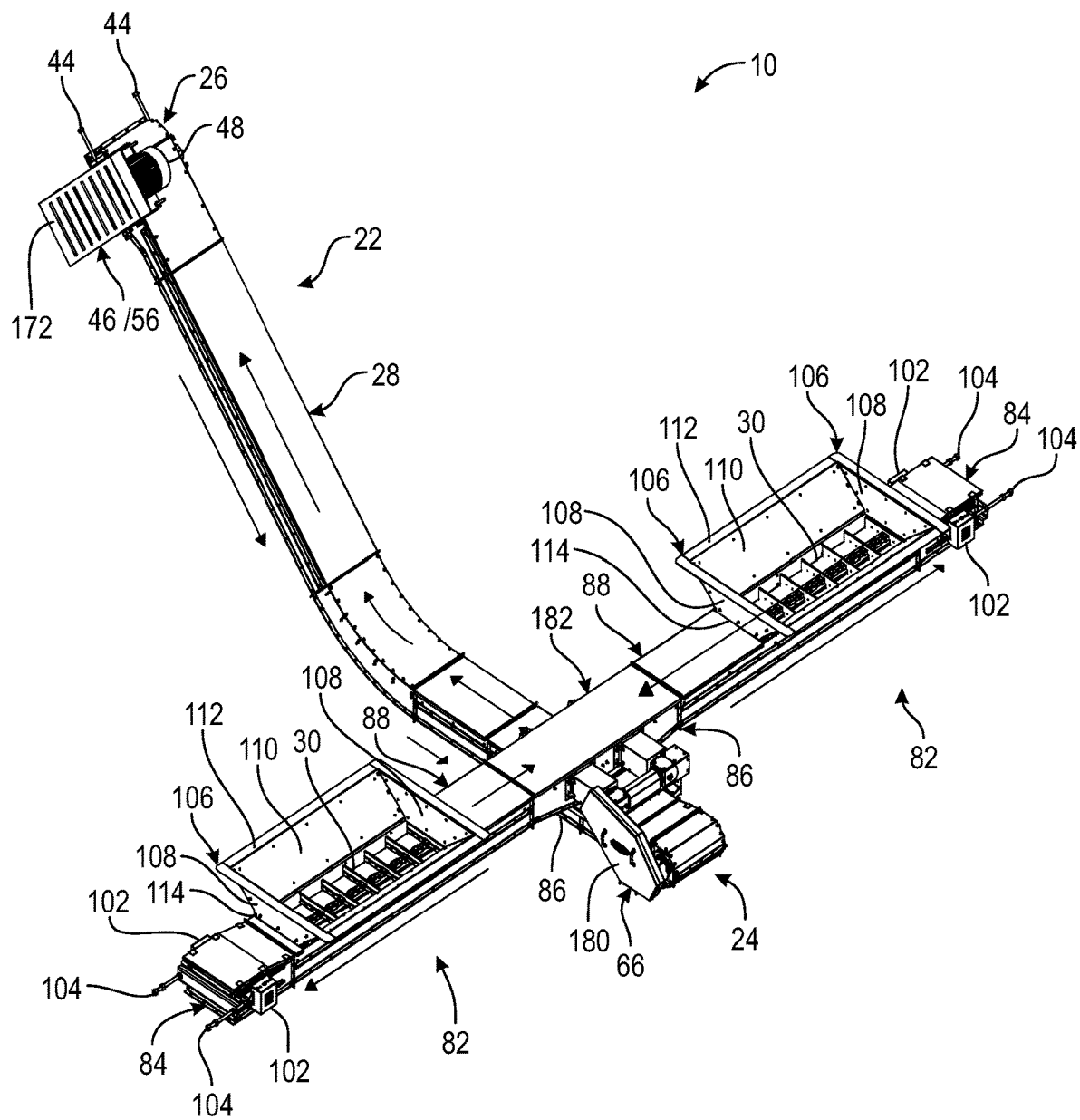
FIG. 3 shows an upper rear left perspective view of a single drive dual hopper conveyor system, in accordance with one or more arrangements; the view showing the system configured with hoppers on side conveyor systems.
Figure 4:
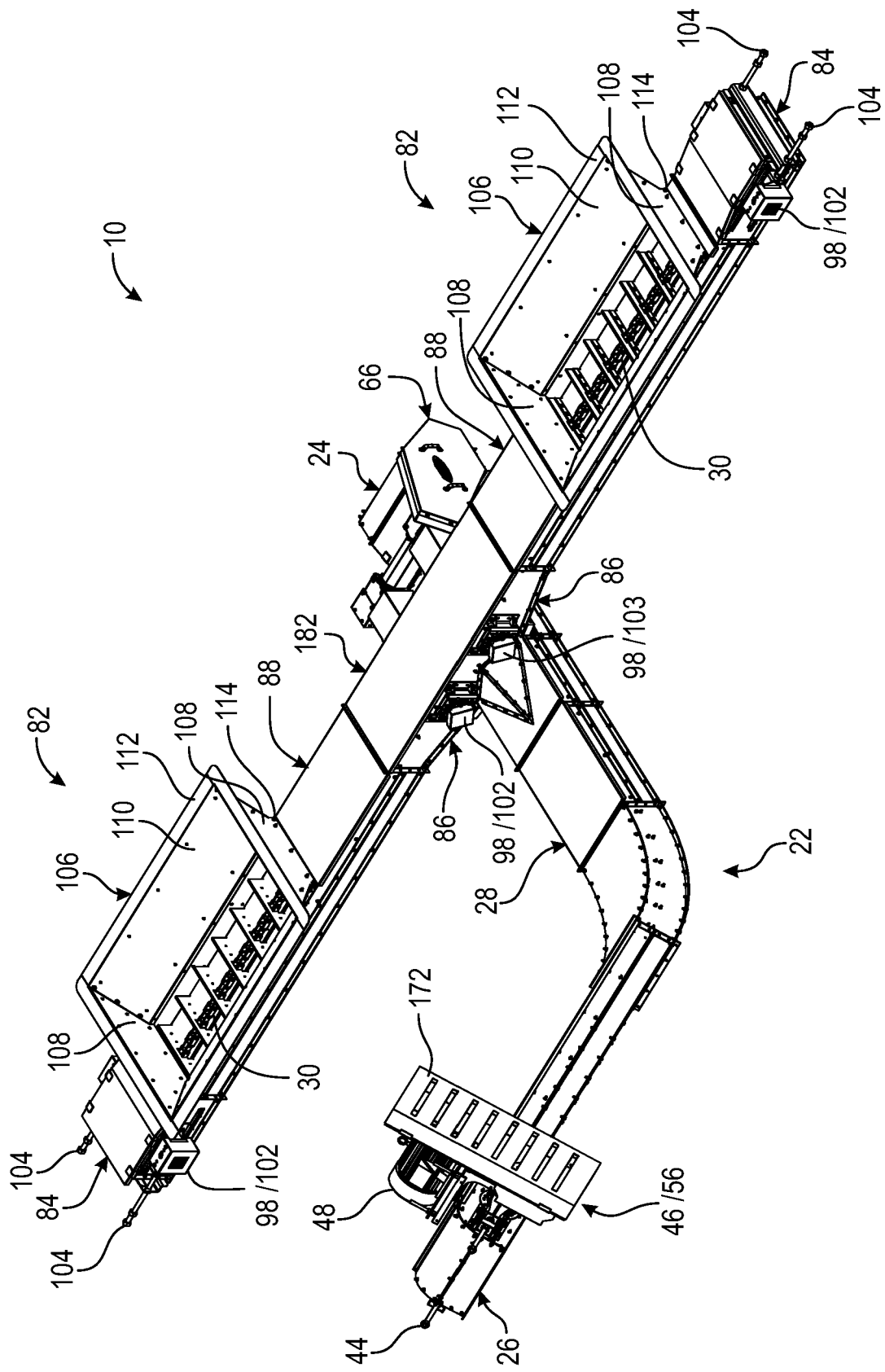
FIG. 4 shows an upper front left perspective view of a single drive dual hopper conveyor system, in accordance with one or more arrangements; the view showing the system configured with hoppers on side conveyor systems.
Figure 5:
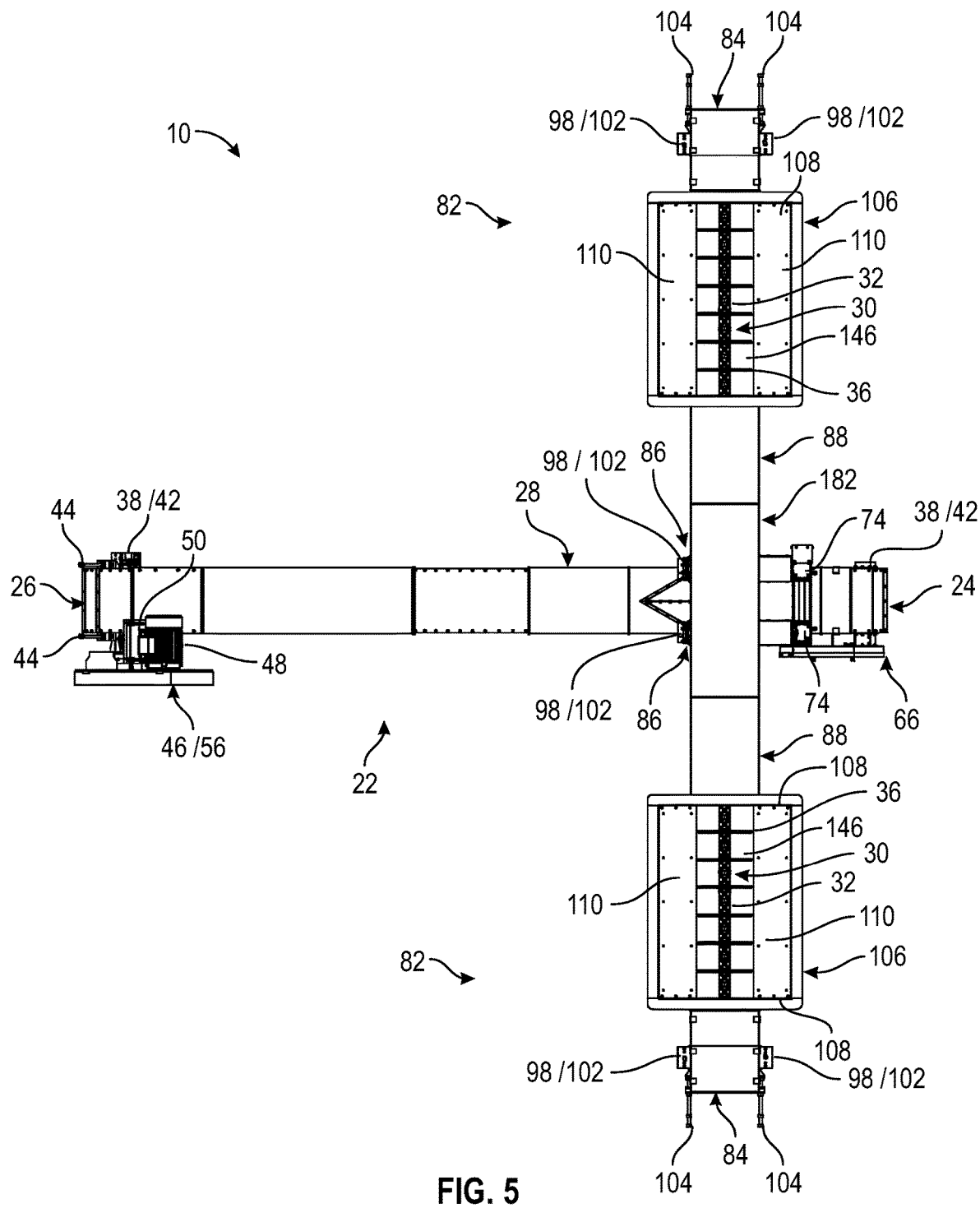
FIG. 5 shows a top view of a single drive dual hopper conveyor system, in accordance with one or more arrangements; the view showing the system configured with hoppers on side conveyor systems.
Figure 6:
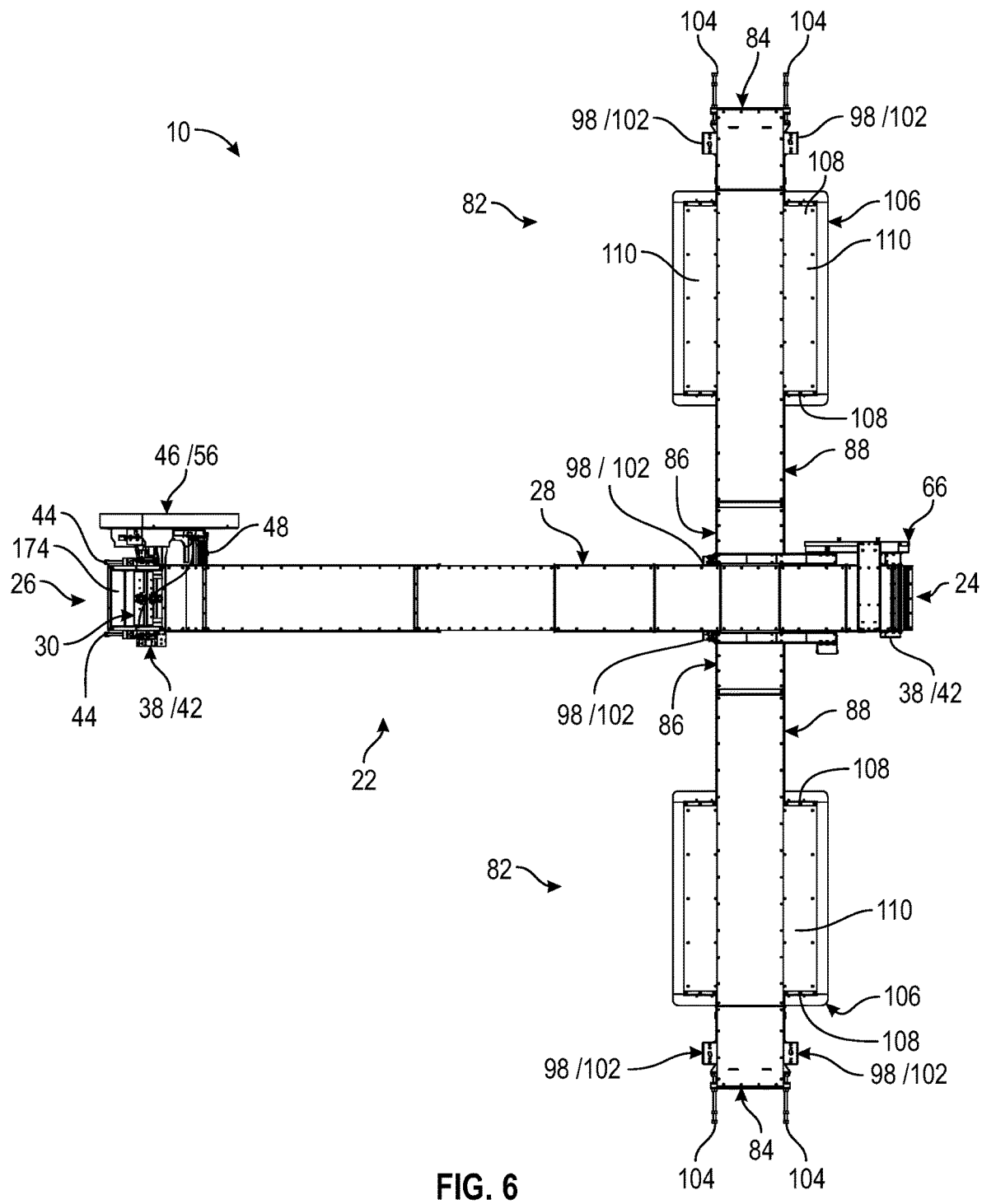
FIG. 6 shows a bottom view of a single drive dual hopper conveyor system, in accordance with one or more arrangements; the view showing the system configured with hoppers on side conveyor systems.
Figure 7:
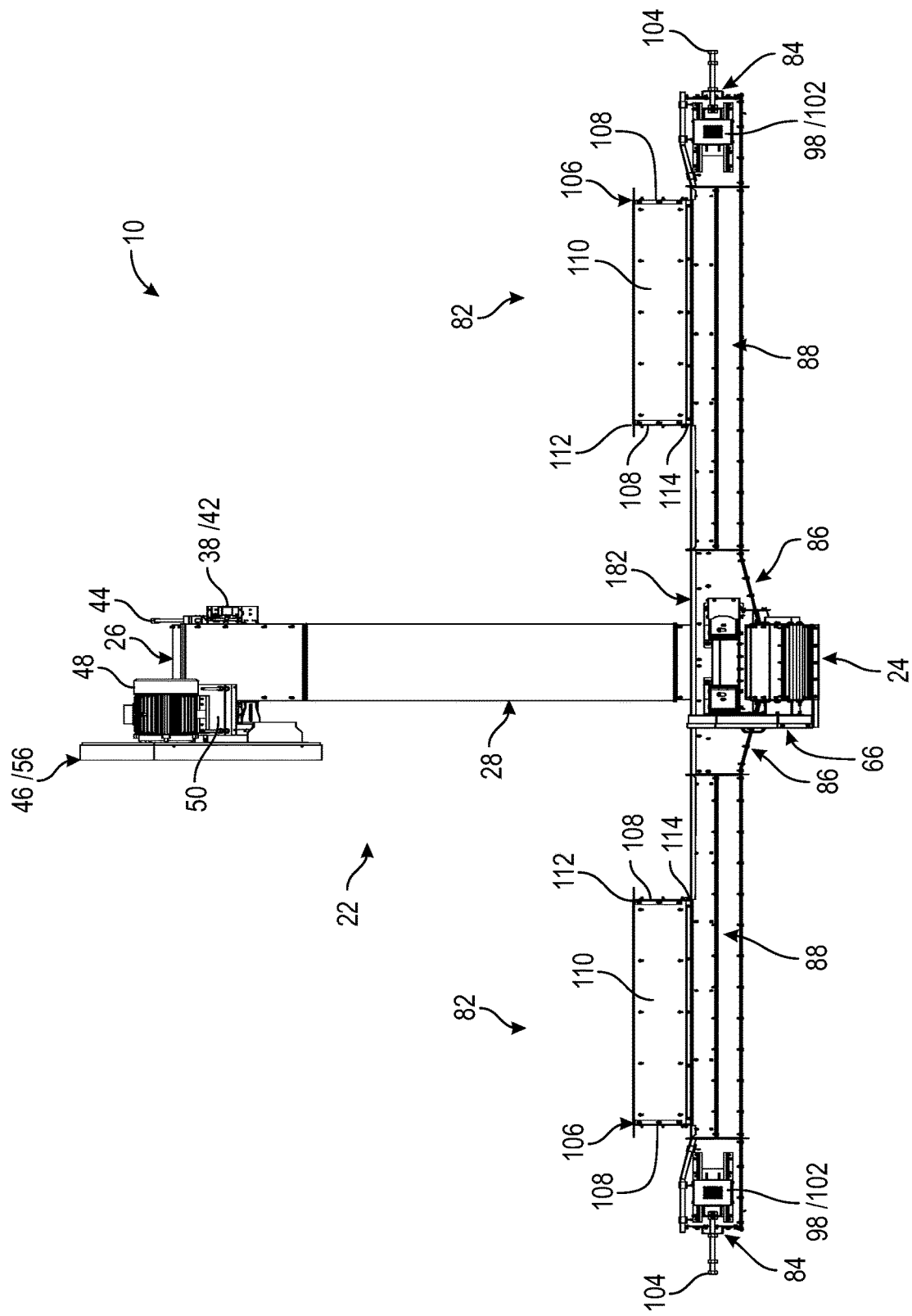
FIG. 7 shows a rear view of a single drive dual hopper conveyor system, in accordance with one or more arrangements; the view showing the system configured with hoppers on side conveyor systems.
Figure 8:
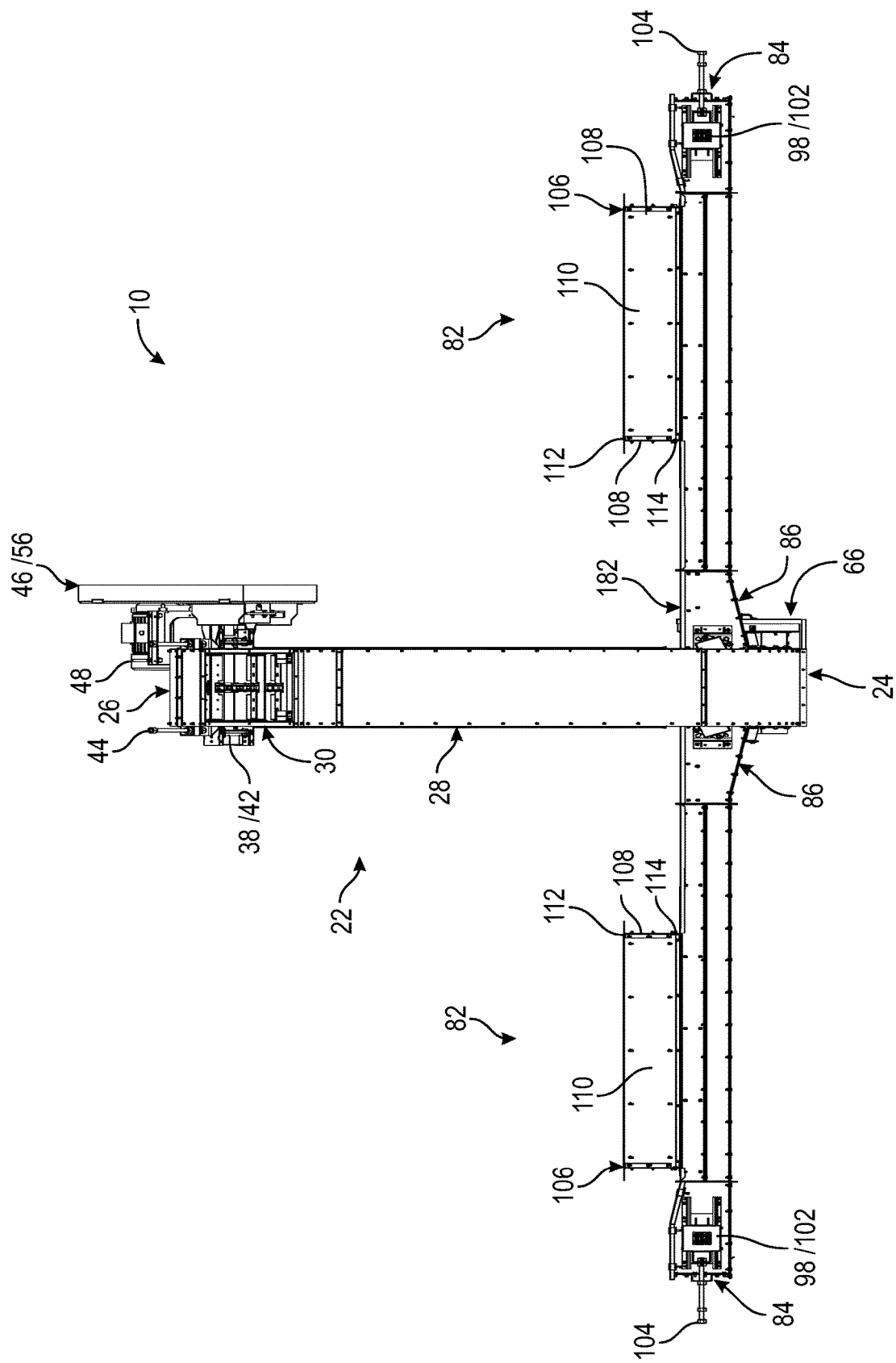
FIG. 8 shows a front view of a single drive dual hopper conveyor system, in accordance with one or more arrangements; the view showing the system configured with hoppers on side conveyor systems.
Figure 9:
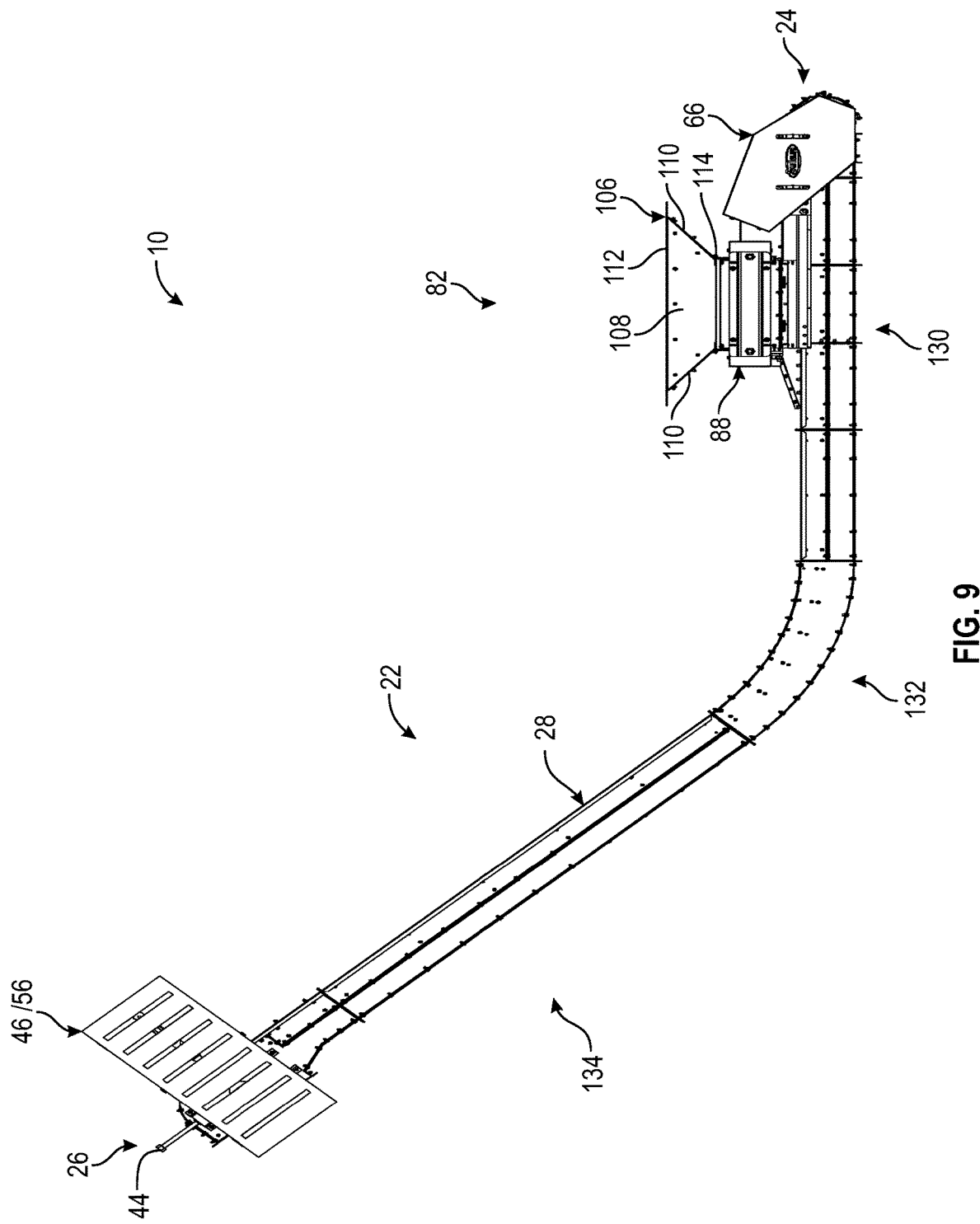
FIG. 9 shows a left side view of a single drive dual hopper conveyor system, in accordance with one or more arrangements; the view showing the system configured with hoppers on side conveyor systems.
Figure 10:
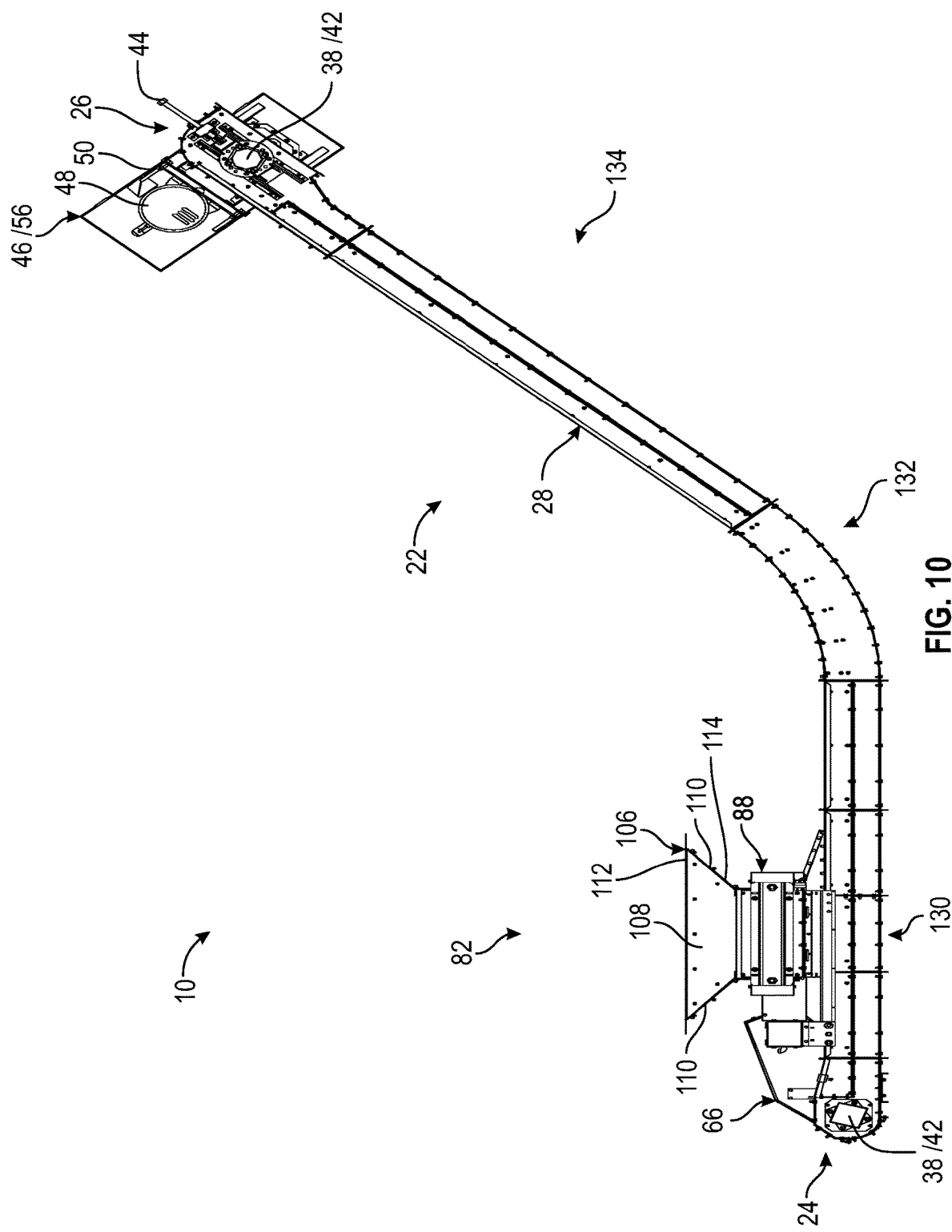
FIG. 10 shows a right side view of a single drive dual hopper conveyor system, in accordance with one or more arrangements; the view showing the system configured with hoppers on side conveyor systems.
Figure 11:
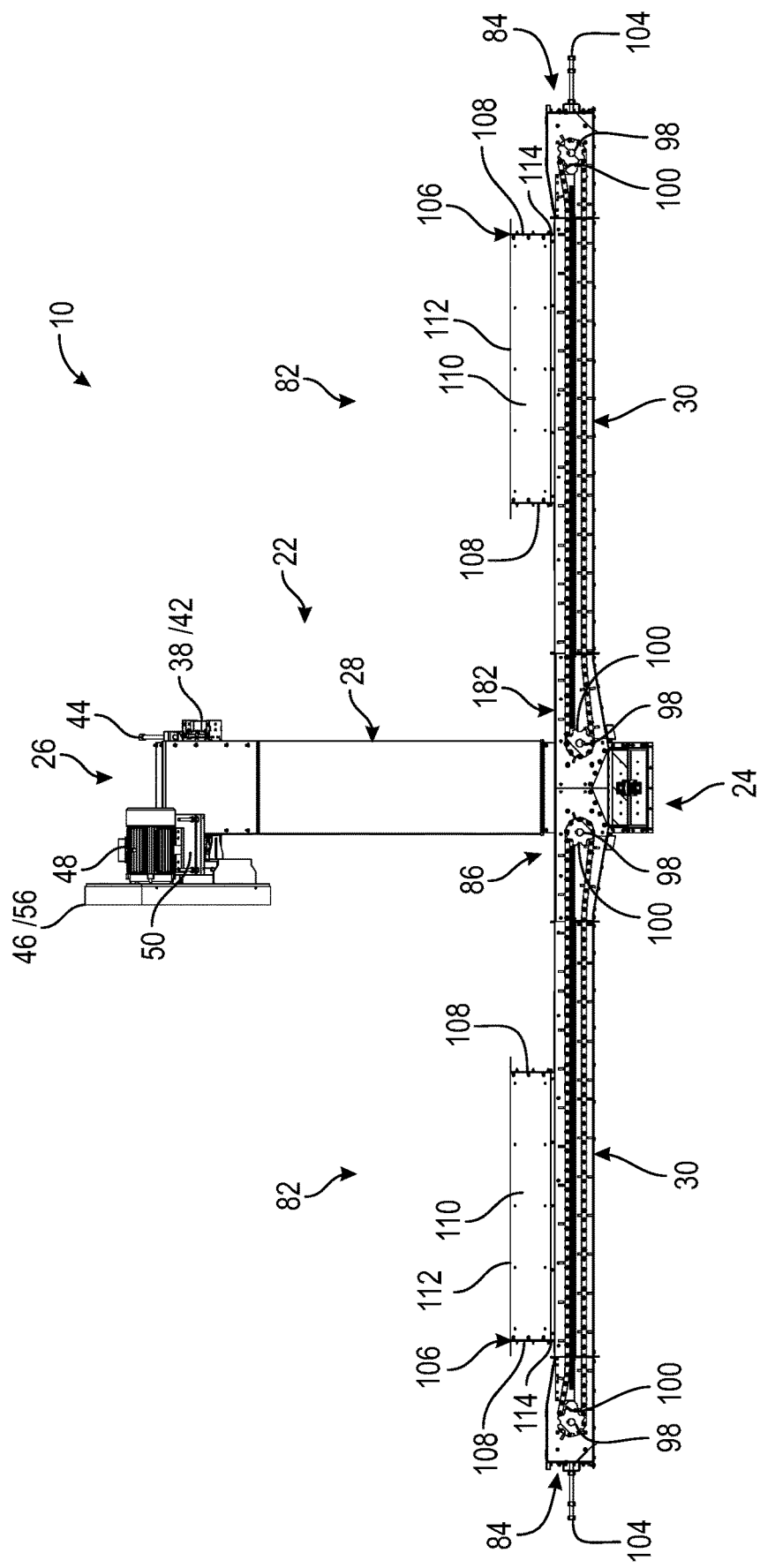
FIG. 11 shows a rear cross sectional view of a single drive dual hopper conveyor system, in accordance with one or more arrangements; the view showing a cross section through side conveyor systems; the view showing the system configured with hoppers on side conveyor systems.
Figure 12:
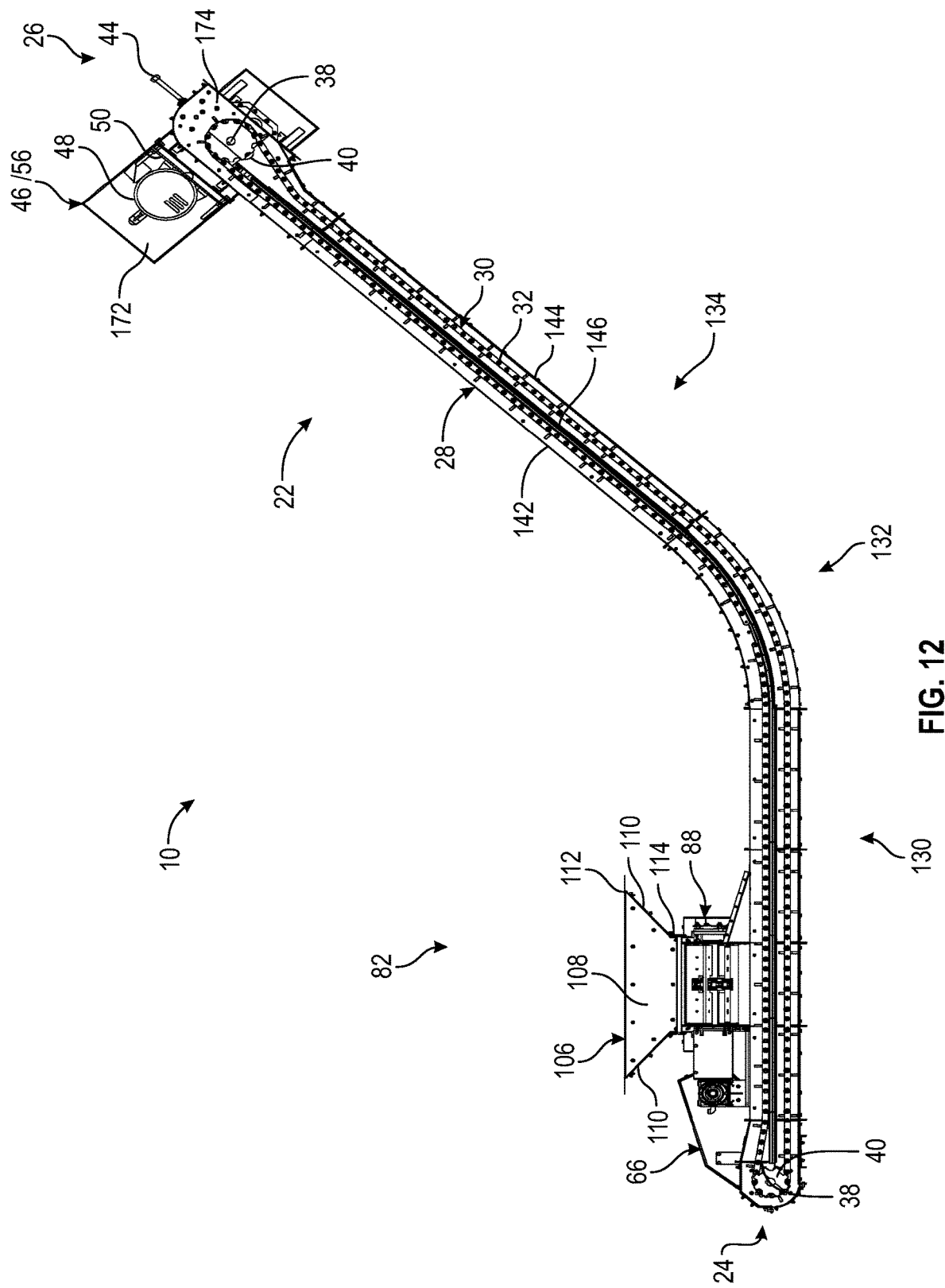
FIG. 12 shows a right side cross sectional view of a single drive dual hopper conveyor system, in accordance with one or more arrangements; the view showing a cross section through the center conveyor system; the view showing the system configured with hoppers on side conveyor systems.
Figure 13:
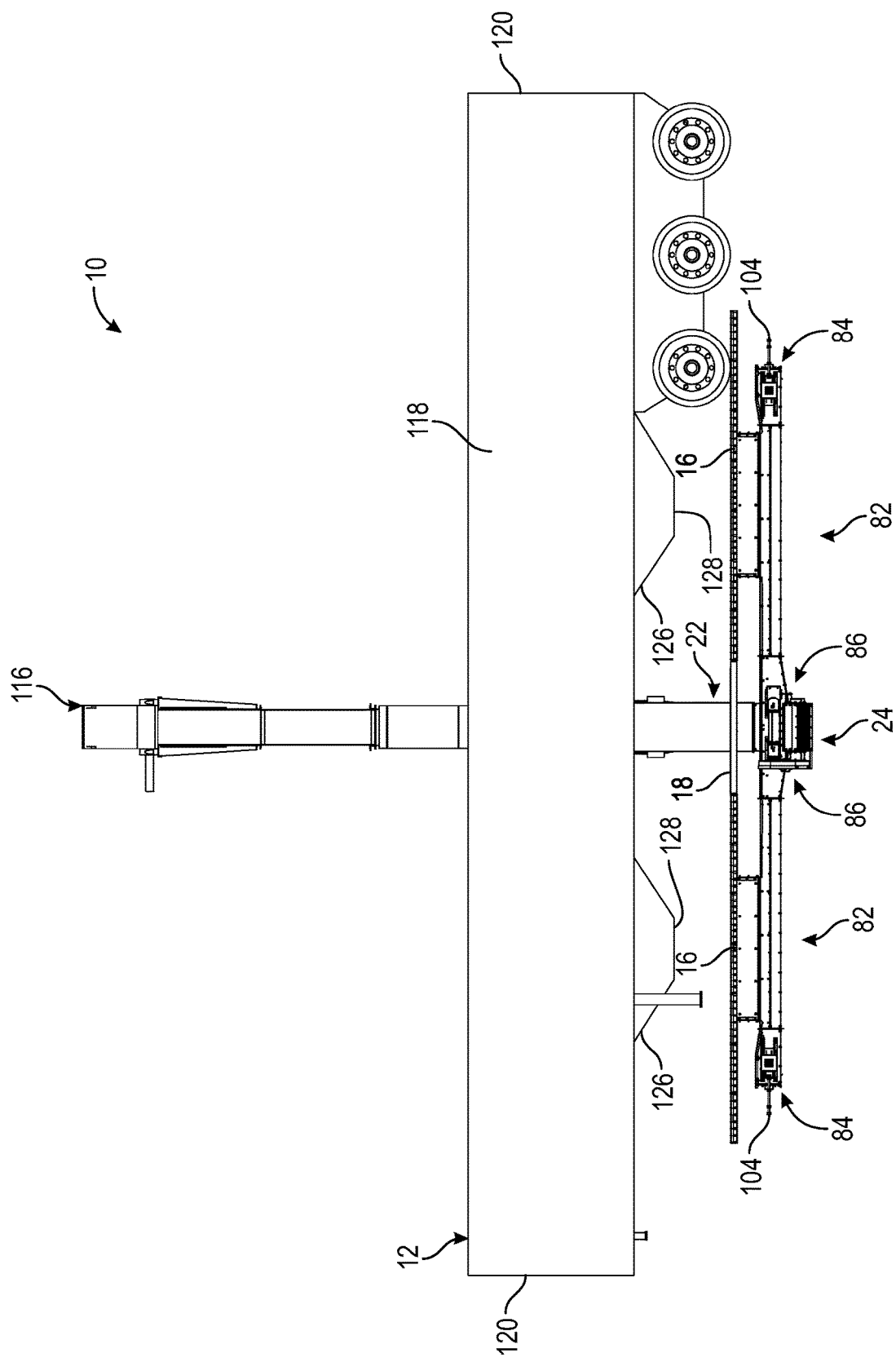
FIG. 13 shows a rear cross sectional view of a single drive dual hopper conveyor system, in accordance with one or more arrangements; the view showing the system configured for use with a dual hopper belly dump trailer.
Figure 14:
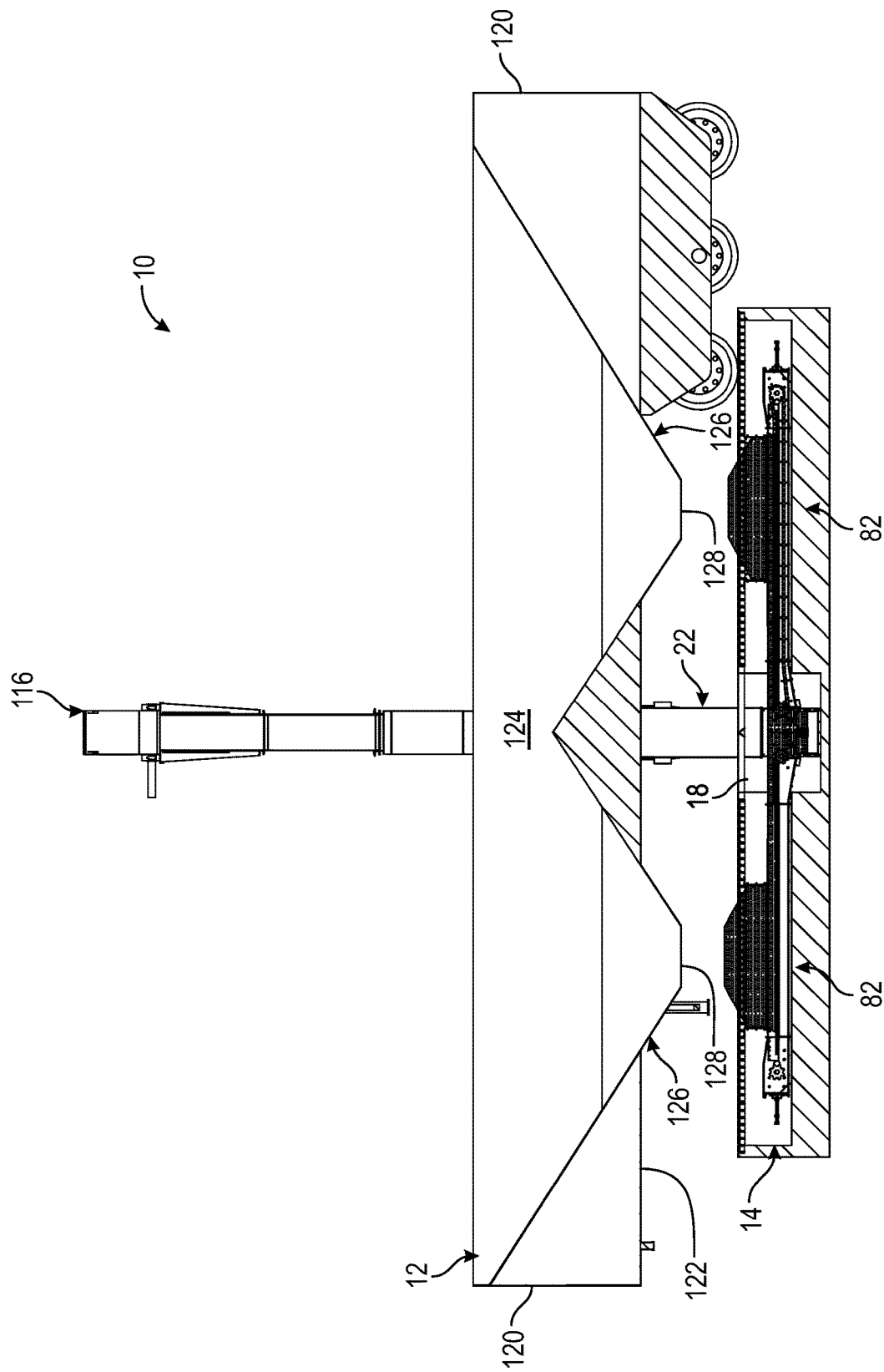
FIG. 14 shows a rear cross sectional view of a single drive dual hopper conveyor system, in accordance with one or more arrangements; the view showing the system configured for use with a dual hopper belly dump trailer; the view showing a cross section through side conveyor systems and dual hopper belly dump trailer.
Figure 15:
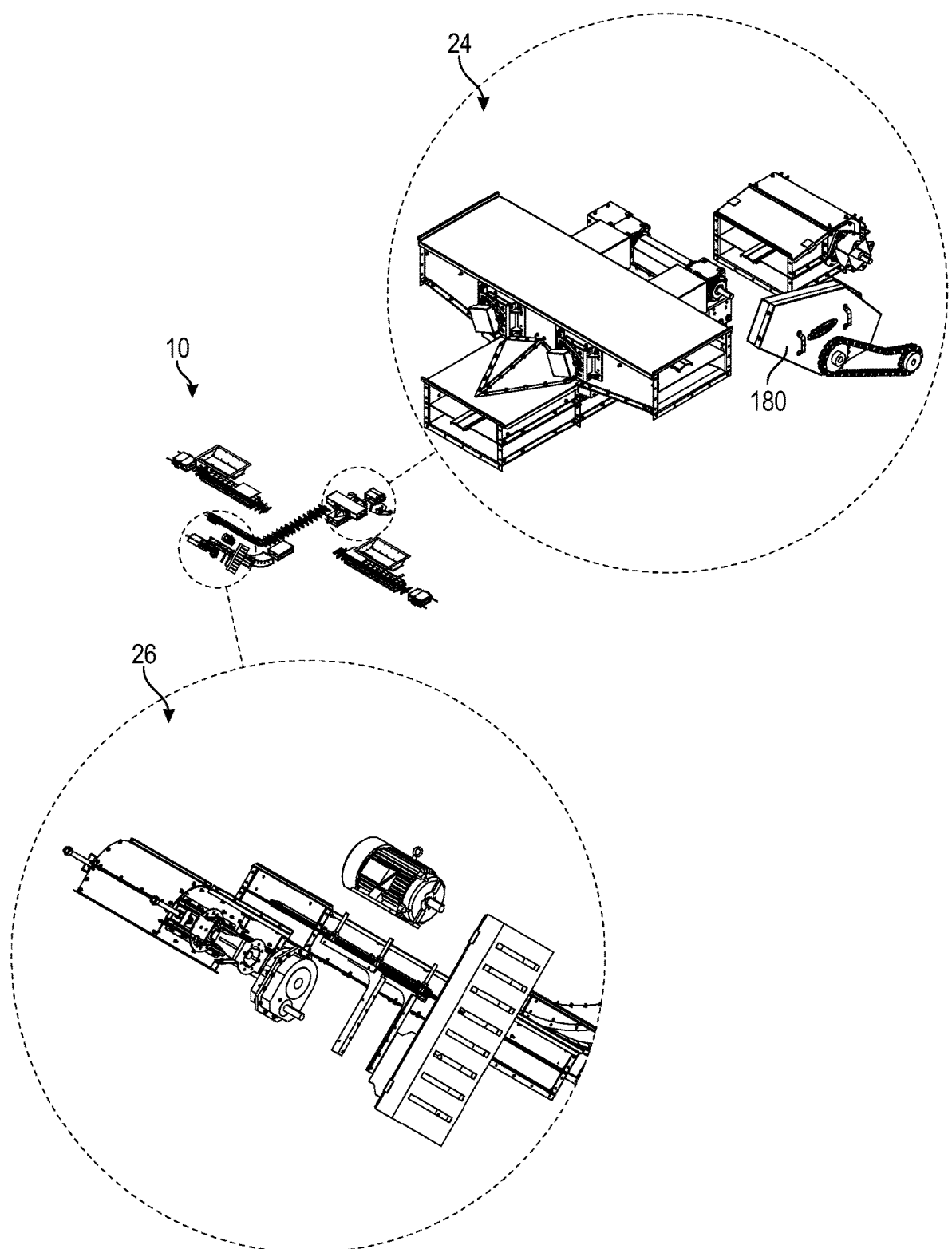
FIG. 15 shows an exploded upper rear left perspective view of a single drive dual hopper conveyor system, in accordance with one or more arrangements; the view showing the enlarged exploded upper rear left perspective view of a tail section of the system; the view showing the enlarged exploded upper rear left perspective view of a head section of the system.
Figure 16:
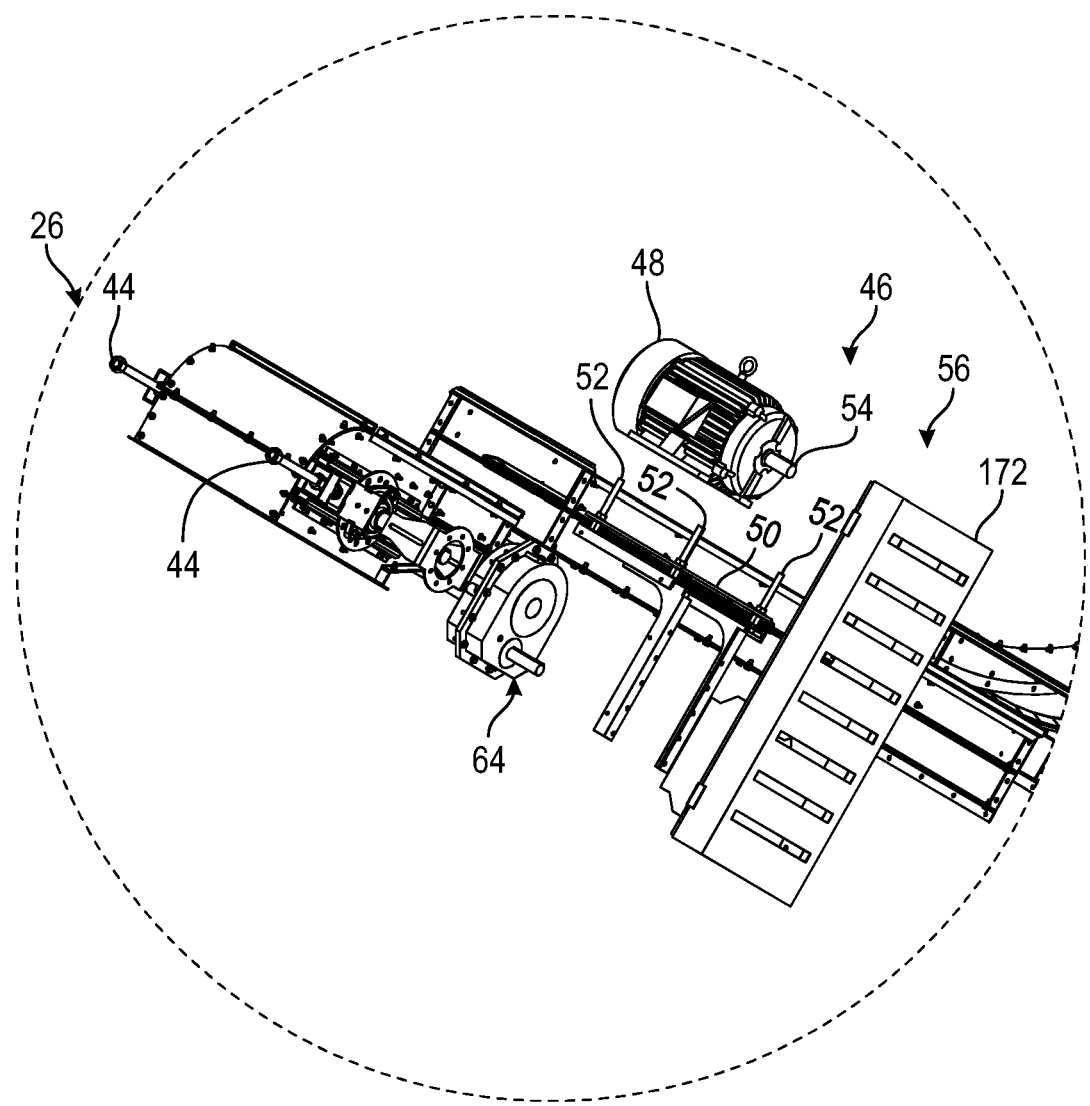
FIG. 16 shows a close up exploded upper rear left perspective view of a head section of the system shown in FIG. 15.
Figure 17:
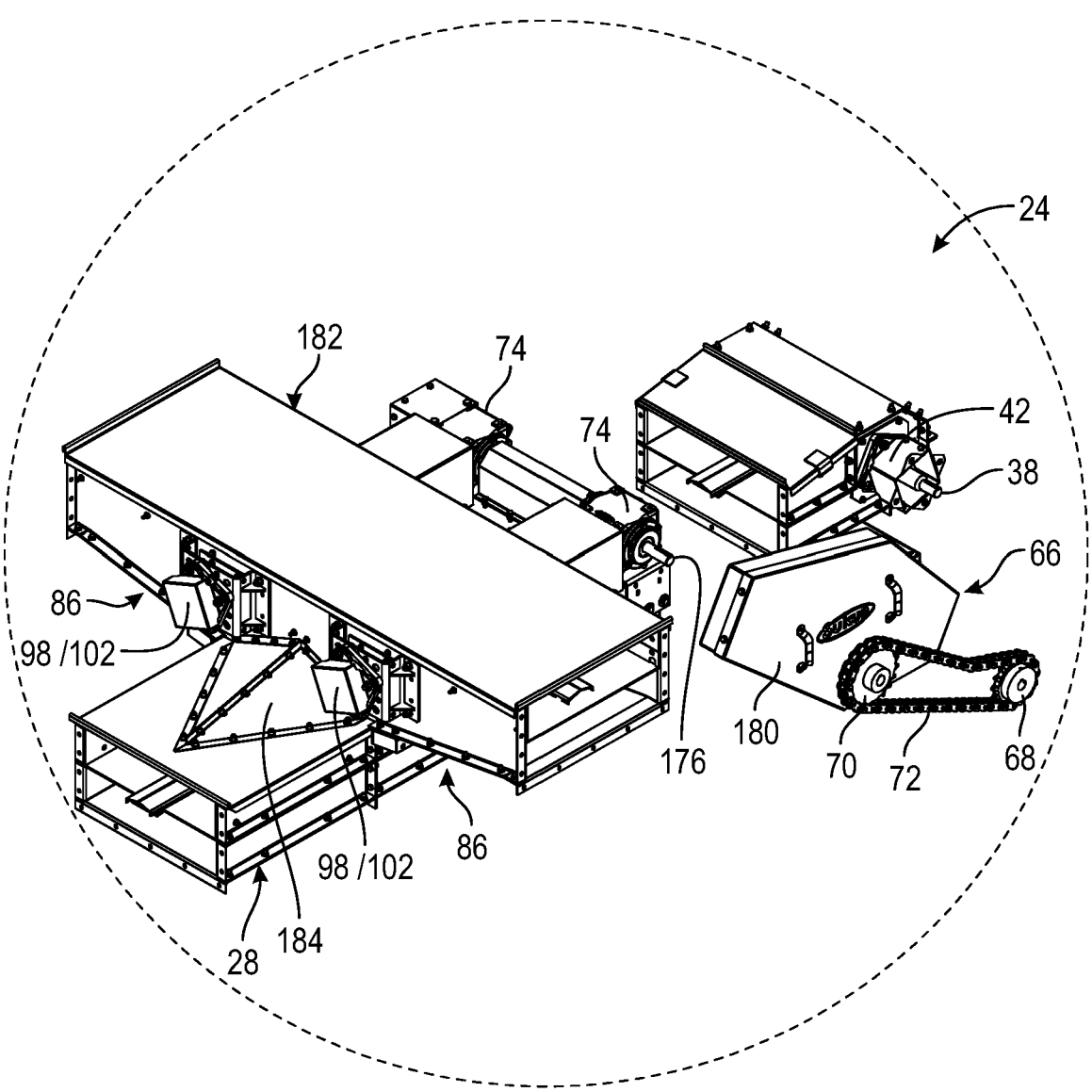
FIG. 17 shows a close up exploded upper rear left perspective view of a tail section of the system shown in FIG. 15.
Figure 18:
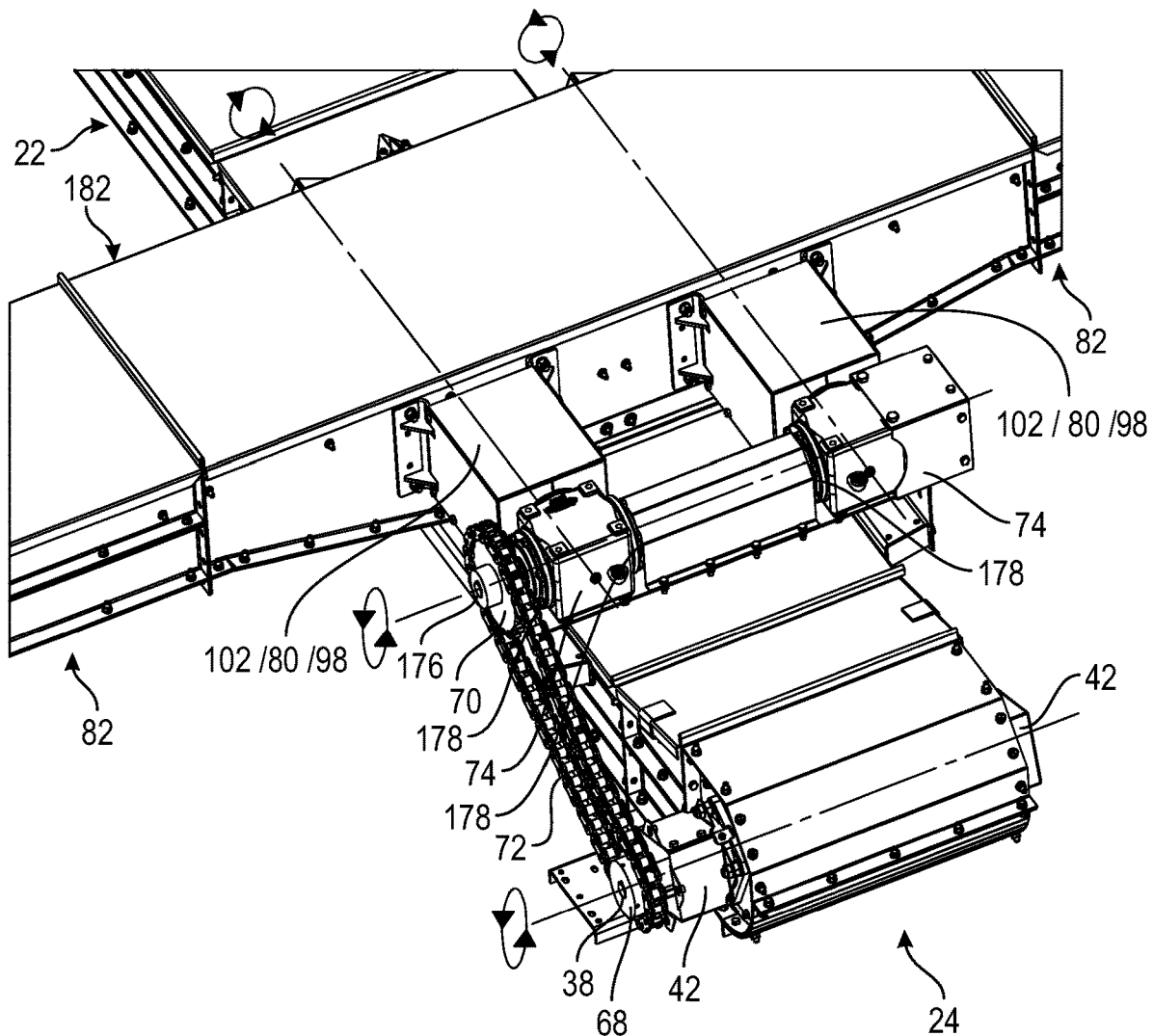
FIG. 18 shows a close up upper rear left perspective view of a tail section of a single drive dual hopper conveyor system, in accordance with one or more arrangements.
Figure 19:
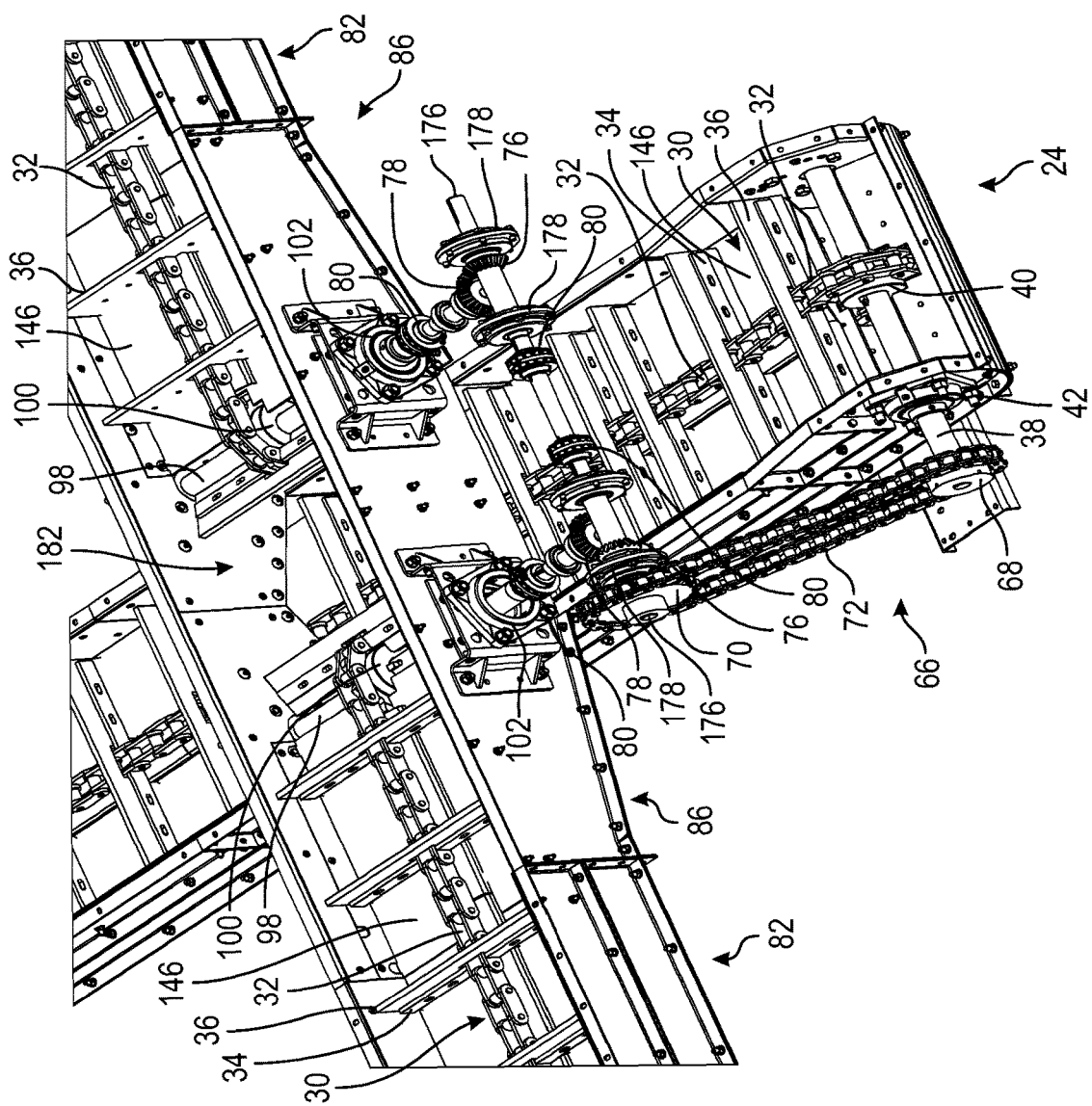
FIG. 19 shows in internal view of the system tail section of a single drive dual hopper conveyor system shown in FIG. 18, in accordance with one or more arrangements.
Figure 20:
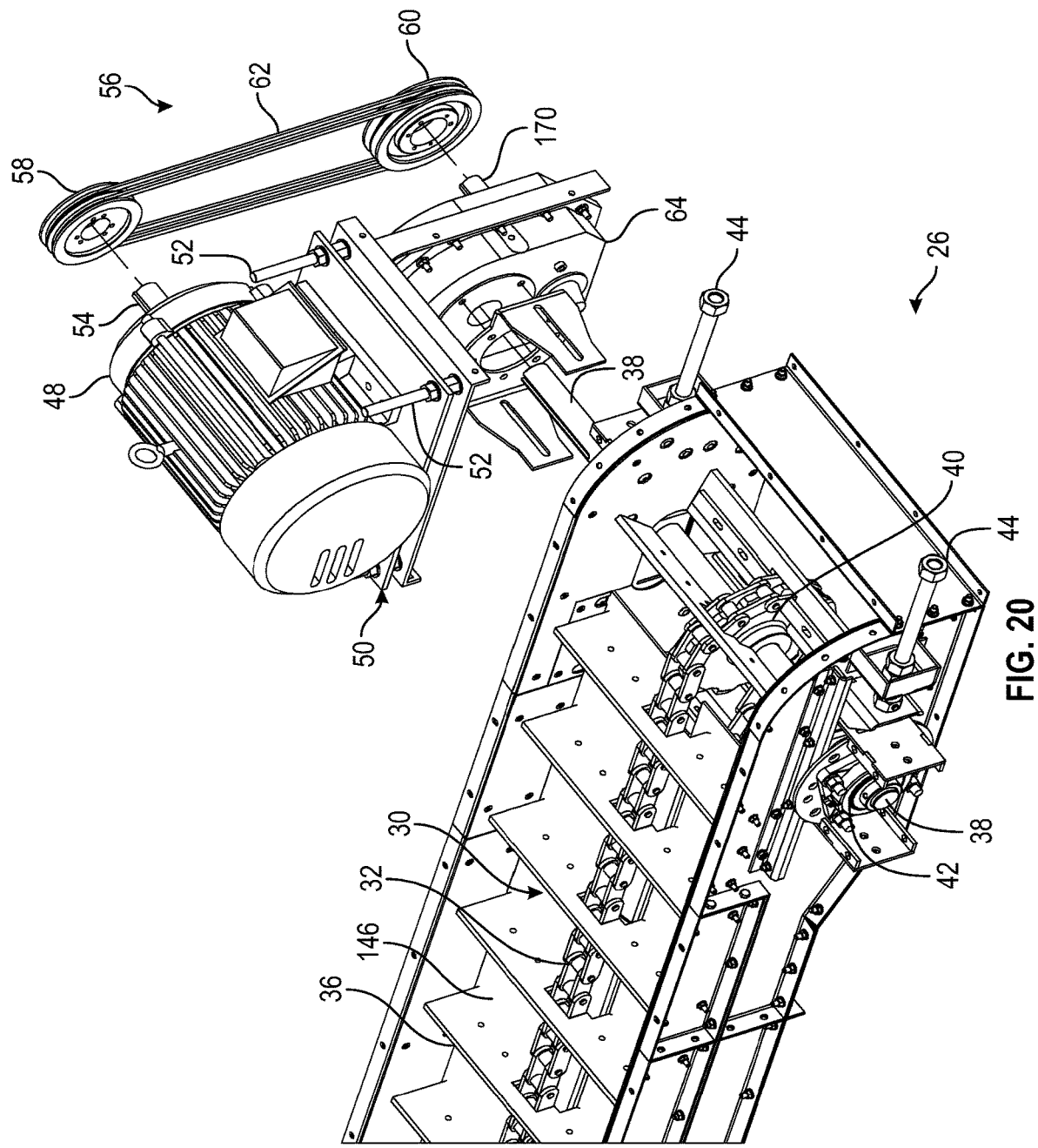
FIG. 20 shows a close up exploded upper front right perspective view of a head section of a single drive dual hopper conveyor system, in accordance with one or more arrangements; the view showing an internal view of the head section with cover omitted.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "either A or B". As used herein, the term "and" includes all combinations of one or more of the associated listed items, such that "A and B" means "A as well as B." The use of "and/or"

includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of a conveyor system. However, the embodiments are not so limited. It is appreciated that the embodiments may be adapted for use in various other applications, which may be improved by the disclosed structures, arrangements and/or methods. The system is merely shown and described as being used in the context of conveyor systems for ease of description and as one of countless examples.

System 10:

With reference to the figures, a single drive dual hopper conveyor system 10 (or conveyor system 10 or simply system 10) is presented that is used in association with a dual hopper belly dump trailer 12. In the arrangement shown, as one example, the single drive dual hopper conveyor system 10 is used in association with a pit 14 having a pair of grates 16, a cover 18 and sidewalls 20. In the arrangement shown, as one example, the single drive dual hopper conveyor system 10 includes a center conveyor system 22 having a tail section 24, a head section 26, a housing 28, a belt 30 having links 32, supports 34 and flights 36, shafts 38, sprockets 40, bearings 42, take-ups 44, a motor assembly 46 having a motor 48, motor bracket 50, take-ups 52, output shaft 54, a power transfer section 56 having a first pulley 58, a second pulley 60 and a connector 62, and a gearbox 64, a power transfer section 66 having a first pulley 68, a second pulley 70 and a connector 72, gearboxes 74 having a first section 76 and second section 78 and couplers 80 among other components, features, systems and configurations as is shown, claimed and/or described herein. In the arrangement shown, as one example, the single drive dual hopper conveyor system 10 includes a pair of side conveyor systems 82 having a tail section 84, a head section 86, a housing 88, a belt 30 having links 32, supports 34 and flights 36, shafts 98, sprockets 100, bearings 102, take-up 104, a hopper 106 having end walls 108 and sidewalls 110 and having an upper end 112 and a lower end 114, among other components, features, systems and configurations as is shown, claimed and/or described herein. In the arrangement shown, as one example, the single drive dual hopper conveyor system 10 conveys grain to an external grain transfer or storage device 116 among other components, features, systems and configurations as is shown, claimed and/or described herein.

Not Limited to Grain:

In the arrangement shown, as one example, single drive dual hopper conveyor system 10 is discussed as being used in association with grain. This grain may be formed of any grains, seeds, nuts, or any other agricultural product such as beans, corn, rice, wheat, canola, sorghum, pistachios, peanuts, popcorn, oats, small grains, or any other organic or agricultural product or material. While the disclosure herein describes use of single drive dual hopper conveyor system 10 used in association with grains or seeds, this is only one of countless potential uses of the single drive dual hopper conveyor system 10. Reference to the use of single drive dual hopper conveyor system 10 in association with grain or seeds is not meant to be limiting. Instead, it is hereby contemplated that single drive dual hopper conveyor system 10 may be used with any flowable or particulate material which may be organic or non-organic.

Dual Hopper Belly Dump Trailer 12:

In the arrangement shown, as one example, single drive dual hopper conveyor system 10 is configured to be used in association with a dual hopper belly dump trailer 12 or simply trailer 12. Dual hopper belly dump trailer 12 may be formed of any suitable size, shape and design and is configured to carry grain to the location of single drive dual hopper conveyor system 10 and dump grain into pit 14 at the location of hoppers 106.

In the arrangement shown, as one example, dual hopper belly dump trailer 12 has opposing sidewalls 118 and opposing end walls 120 and a bottom wall 122 that form a hollow interior 124 there between. Hollow interior 124 is configured to receive and hold grain therein for transportation from the field or another location to the location of single drive dual hopper conveyor system 10 where it is unloaded.

In the arrangement shown, as one example, bottom wall 122 of dual hopper belly dump trailer 12 includes a pair of hoppers 126. Hoppers 126 are formed of any suitable size, shape and design and are configured to direct grain out of the hollow interior 124 of dual hopper belly dump trailer 12 through angled surfaces that directionally funnel grain under the force of gravity. In the arrangement shown, as one example, two hoppers 126 are shown in use with dual hopper belly dump trailer 12. In the arrangement shown, as one example, one hopper 126 is positioned toward the forward end of dual hopper belly dump trailer 12 and one hopper 126 is positioned toward the rearward end of dual hopper belly dump trailer 12. However, any number of hoppers 126 are hereby contemplated for use as is any location.

In the arrangement shown, as one example, a gate 128 covers and closes the opening in the lower end of each hopper 126. Gates 128 are formed of any suitable size, shape and design and are configured to selectively open and close hoppers 126 so as to facilitate the retention of grain within the hollow interior 124 when closed and to allow the dumping of grain from hollow interior 124 when open.

While a conventional dual hopper belly dump trailer 12 is shown and described herein, any other form of a dual hopper belly dump trailer 12 is hereby contemplated for use with the system 10. For that matter, system 10 may be used with any form of a trailer, wagon or other device that carries, moves, transports, or delivers grain or particulate material.

In the arrangement shown, as one example, the location of hoppers 126 and gates is configured to align with the positon of grates 16 in pit 14 that houses single drive dual hopper conveyor system 10. This allows single drive dual hopper conveyor system 10 to simultaneously receive grain from each hopper 126 of dual hopper belly dump trailer 12. Or, said another way, single drive dual hopper conveyor system 10 allows for the simultaneous dumping of grain from both hoppers 126 into single drive dual hopper conveyor system 10 without having to move dual hopper belly dump trailer 12, all while single drive dual hopper conveyor system 10 is powered only by a single motor 48 which simultaneously powers both center conveyor system 22 as well as both side conveyor systems 82, as is further described herein.

Pit 14:

In the arrangement shown, as one example, single drive dual hopper conveyor system 10 is configured to be used in association with pit 14. Pit 14 may be formed of any suitable size, shape and design and is configured to house, hold and protect single drive dual hopper conveyor system 10 and allow trucks and dual hopper belly dump trailers 12 to drive over single drive dual hopper conveyor system 10 to allow gravity dumping of grain from dual hopper belly dump trailer 12 and into single drive dual hopper conveyor system 10.

In the arrangement shown, as one example, pit 14 is a relatively shallow box or housing that forms a hollow interior that is sized and shaped to receive the lower and rearward end of center conveyor system 22 as well as side conveyor systems 82 therein. In the arrangement shown, as one example, pit 14 includes a grate 16 positioned below the location of each hopper 126 in dual hopper belly dump trailer 12. The location of each grate 16 is positioned above the location of a hopper 106 in a side conveyor system 82.

In the arrangement shown, as one example, grates 16 are formed of a plurality of lateral bars that are spaced apart from one another in approximate parallel spaced relation which allows grain to freely pass through the grates 16 while preventing larger objects or debris from falling into the hollow interior of the pit 14 and damaging side conveyor systems 82. Grates 16 are also strong enough to allow a truck and full dual hopper belly dump trailer 12 to drive over the grate 16.

In the arrangement shown, as one example, pit 14 includes a cover 18 or a plurality of cover 18. Cover 18 is formed of any suitable size, shape and design and is configured to cover and enclose the upper end of pit 14 outside of grates 16. In the arrangement shown, as one example, unlike grates 16, cover 18 is formed of a plurality of solid sections that prevent grain, dirt or debris from falling into the hollow interior of pit 14. Like grates 16, cover 18 is strong enough to allow a truck and full dual hopper belly dump trailer 12 to drive over the cover 18. All or portions or sections of cover 18 may be lifted or removed to provide access to the hollow interior of pit 14.

In the arrangement shown, as one example, pit 14 includes a sidewall 20 that defines the outward sides of pit 14. In the arrangement shown, as one example, the upper end of sidewalls 20 receive and engage and support grates 16 and covers 18. In one arrangement, pit 14 is formed of a poured concrete structure.

Center Conveyor System 22:

In the arrangement shown, as one example, single drive dual hopper conveyor system 10 includes a center conveyor system 22. Center conveyor system 22 may be formed of any suitable size, shape and design and is configured to transport or convey grain from side conveyor systems 82 to a grain transfer or storage device 116.

In the arrangement shown, as one example, center conveyor system 22 extends a length from tail section 24, at its lower rearward end, to head section 26, at its upper forward end. In the arrangement shown, as one example, center conveyor system 22 includes a horizontal section 130 that extends from the rearward end of tail section 24 to the rearward end of a corner section 132. This horizontal section 130 extends in a generally flat, straight and horizontal manner and is configured to convey grain received from side conveyor systems 82 under dual hopper belly dump trailer 12 laterally a distance and out from under dual hopper belly dump trailer 12.

In the arrangement shown, as one example, corner section 132 connects to the forward end of horizontal section 130 and curves upward and out of plane with the horizontal section 130. The upward curvature of corner section 132 allows for portions of center conveyor system 22 forward of corner section 132 to rise up and out of pit 14. In the arrangement shown, as one example, the forward end of corner section 132 connects to the rearward end of inclined section 134.

In the arrangement shown, as one example, inclined section 134 connects to the forward end of corner section 132 and extends upward and forward at an angle in a generally straight manner before terminating at head section 26 where the conveyed grain is dispensed into a grain transfer or storage device 116.

Housing 28: In the arrangement shown, as one example, center conveyor system 22 is formed of a housing 28. Housing 28 is formed of any suitable size, shape and design and is configured to house and guide belt 30 as it moves grain. In the arrangement shown, as one example, housing 28 is formed of a plurality of segments 136. Segments 136 connect to one another in end-to-end alignment to form housing 28 which extends from tail section 24 to head section 26 and which extends across horizontal section 130, corner section 132 and inclined section 134.

In the arrangement shown, segments 136 connect to one another in end-to-end alignment at flanges 138 to form the length of housing 28. In the arrangement shown, as one example, flanges 138 extend outward from housing 28, in approximate perpendicular alignment to the length of housing 28, at the outward ends of segments 136 and include holes 140 therein that receive fasteners therein that facilitate the connection of adjacent segments 136 to form housing 28.

In the arrangement shown, as one example, housing 28 and/or segments 136 are formed of a top wall 142 and an opposing bottom wall 144 that extend in approximate parallel spaced relationship to one another. Top wall 142 and opposing bottom wall 144 are generally flat and planar members that include flanges 138 having holes 140 therein at their ends and/or sides that facilitate connection to the other components of housing 28. However, any other shape or configuration is hereby contemplated for use.

In the arrangement shown, as one example a pan 146 or center wall is positioned approximately at the center between top wall 142 and bottom wall 144. In the arrangement shown, as one example, pan 146 is a generally flat and planar member.

In the arrangement shown, as one example, each outward end of pan 146 is captured between a pair of sidewall segments 148 that collectively form a sidewall 150. That is, in the arrangement shown, each side of housing 28 and/or segments 136 are formed of a pair of sidewall segments 148. In the arrangement shown, as one example, sidewalls 150 extend in approximate parallel spaced relation to one another and are generally flat and planar members that include flanges 138 having holes 140 therein at their ends and/or sides that facilitate connection to the other components of housing 28. However, any other shape or configuration is hereby contemplated for use.

As such, in the arrangement shown, the planes formed by generally flat and planar top wall 142, bottom wall 144 and pan 146 extend in approximate parallel spaced relation to one another. In contrast, the planes formed by the generally flat and planar sidewalls 150 extend in approximate perpendicular alignment to the planes formed by generally flat and planar top wall 142, bottom wall 144 and pan 146 extend in approximate parallel spaced relation to one another. In this way, in the connection of top wall 142, bottom wall 144, pan 146 and sidewalls 150 form a generally square or rectangular member when viewed from the end.

In the arrangement shown, as one example, top wall 142, bottom wall 144 and sidewall segments 148 include flanges 138 that extend outward from their sides and/or ends in approximate perpendicular alignment to the length or plane formed of the component and/or to the length of housing 28. These flanges 138 include holes 140 therein that receive fasteners therein that facilitate the connection of adjacent components of housing 28.

In the arrangement shown, as one example housing 28 forms a hollow interior that is separated into an upper chamber 152 and a lower chamber 154. In the arrangement shown, as one example, upper chamber 152 and lower chamber 154 are generally square or rectangular in shape when viewed from an end. Upper chamber 152 is defined by the generally planar lower surface of top wall 142 at its upper end, the generally planar upper surface of pan 146 at its lower end, and the generally planar interior-facing surfaces of opposing upper-positioned sidewall segments 148 of sidewall 150. Similarly, lower chamber 154 is defined by the generally planar upper surface of bottom wall 144 at its lower end, the generally planar lower surface of pan 146 at its upper end, and the generally planar interior-facing surfaces of opposing lower-positioned sidewall segments 148 of sidewall 150.

In the arrangement shown, as one example, upper chamber 152 houses the conveying section of belt 30 therein whereas the lower chamber 154 houses the return section of belt 30 therein. That is, upper chamber 152 houses a portion of belt 30 that is traveling forward while carrying grain. In contrast, lower chamber 154 houses a portion of belt 30 that is traveling rearward while not carrying grain.

Housing 28 may be formed of any other suitable, size, shape and configuration so as to house and facilitate the operation of belt 30.

Belt 30: In the arrangement shown, as one example, center conveyor system 22 is configured to be used in association with a belt 30. Belt 30 may be formed of any suitable size, shape and design and is configured to facilitate the transfer of grain from tail section 24 to head section 26 of center conveyor system 22.

Notably, the term "belt" used herein is not meant to be limiting. Specifically, the term "belt" is not meant to be limited exclusively to what is commonly known as a belt, such as a flexible length of fabric or plastic material. Instead, the term "belt" used herein is to be understood to mean any movable device or object or system that transfers or moves grain from one point, or a starting point, to another point, or an ending point.

In the arrangement shown, as one example, belt 30, which could also be described as a conveyor, a chain, a drag chain, a high-side chain, a high-side conveyor, or the like, includes a plurality of links 32 that connect to one another. Links 32 are formed of any suitable size, shape and design and are configured to connect to one another and facilitate movement around the sprockets 40 positioned in the tail section 24 and head section 26, as well as facilitate movement of grain through upper chamber 152 and the return of belt 30 through lower chamber 154.

In the arrangement shown, as one example, links 32 include a pair of opposing sidewalls that extend in approximate parallel spaced relation to one another and connect at their forward and rearward ends to shafts that extend in approximate perpendicular alignment to the opposing sidewalls and connect opposing sidewalls to one another. Links 32 are configured to receive teeth of sprockets 40 connected to shafts 38 at the tail section 24 and head section 26 thereby driving belt 30 through housing 28.

In the arrangement shown, as one example, some but not all links 32 include supports 34. Supports 34 are formed of any suitable size, shape and design and are configured to extend outward from links 32 and provide support to flights 36. In the arrangement shown, as one example, supports 34 are generally flat and straight bars that extend outward to the sides of links a distance in a generally flat and straight manner. That is, in the arrangement shown, as one example, supports 34 extend in approximate parallel spaced relation to the plane formed by top wall 142, bottom wall 144 and pan 146, and extend in approximate perpendicular alignment to the plane formed by sidewalls 150. In the arrangement shown, as one example, supports 34 connect to and support flights 36.

In the arrangement shown, as one example, supports 34 of links 32 connect to and support flights 36. Flights 36 are formed of any suitable size, shape and design and are configured to increase the surface area of links 32 and supports 34 so as to facilitate the transfer of grain from tail section 24 to head section 26. In the arrangement shown, as one example, flights 36 are generally flat and planar members that when viewed from the front side or rear side are generally square or rectangular and include a cut-out section 156 around links 32. This cut-out section 156 around links 32 provides clearance for the teeth of sprockets 40 of shafts 38 to engage links 32 thereby driving belt 30 through housing 28.

In the arrangement shown, as one example, flights 36 are connected to the forward side or the direction-of-travel side of supports 34. In this way, supports 34 push flights 36 forward. In the arrangement shown, as one example, a plurality of fasteners 158 extend through flights 36 and supports 34 thereby connecting flights 36 to supports 34 and links 32. Fasteners 158 may be formed of any fastening device such as screws, bolts, snap-fit features, friction-fit features, or the like or any combination thereof.

In the arrangement shown, as one example, while most of the components of housing 28 are made of metal, such as top wall 142, bottom wall 144, pan 146, sidewalls 150, links 32 and supports 34, among other components, in one arrangement flights 36 are formed of a plastic or composite or non-metallic material, such as an ultra-high molecular weight polyethylene (UHMW) or other UHMW or similar material. In some embodiments, using a non-metallic material may provide a number of benefits including, for example, being easier or softer on the grain, being easier on the other components of the system, being more-durable than metal, being self-lubricating, being lighter than metal, being lower friction, being impact resistant, and/or eliminating metal on metal contact among many other benefits.

In the arrangement shown, as one example, when upper chamber 152 is viewed from an end, the upper surface of flights 36 are generally flat and straight and extend in approximate parallel spaced relation to the lower surface of the top wall 142. In the arrangement shown, as one example, when viewed from an end, the lower surface of flights 36 are generally flat and straight, with cut-out section 156 therein, and extend in approximate parallel relation to the upper surface of the pan 146. In one arrangement, under the force of gravity, the lower surface of flights 36 engage and/or slide over the upper surface of pan 146. One of the benefits of using a composite or non-metallic material for flights 36 is that this reduces wear on the upper surface of pan 146 as flights 36 slide over pan 146. In addition, the self-lubricating characteristics of the material of flights 36 reduce friction. In the arrangement shown, as one example, when viewed from an end, the side surfaces of flights 36 are generally flat and straight and extend in approximate parallel spaced relation to the interior surface of sidewall segments 148. In this way, flights 36 increase the surface area of links 32 and fill a larger portion of the hollow interior of upper chamber 152 thereby helping to facilitate the movement of grain through upper chamber 152.

In the arrangement shown, as one example, when lower chamber 154 is viewed from an end, belt 30 is inverted as compared to upper chamber 152 due to looping around head section 26. In this arrangement, the upper surface of flights 36 are generally flat and straight, with cut-out section 156 therein, and extend in approximate parallel spaced relation to the lower surface of the pan 146. In the arrangement shown, as one example, when viewed from an end, the lower surface of flights 36 are generally flat and straight and extend in approximate parallel relation to the upper surface of the bottom wall 144. In one arrangement, under the force of gravity, the lower surface of flights 36 engage and/or slide over the upper surface of bottom wall 144. One of the benefits of using a composite or non-metallic material for flights 36 is that this reduces wear on the upper surface of bottom wall 144 as flights 36 slide over pan 146. In addition, the self-lubricating characteristics of the material of flights 36 reduce friction. In the arrangement shown, as one example, when viewed from an end, the side surfaces of flights 36 are generally flat and straight and extend in approximate parallel spaced relation to the interior surface of sidewall segments 148. In this way, flights 36 increase the surface area of links 32 and fill a larger portion of the hollow interior of lower chamber 154.

Guides 160: In the arrangement shown, as one example, in both upper chamber 152 and lower chamber 154, flights 36 are relatively closely matched to the size and shape of the hollow interior of the chamber 152, 154. As such, belt 30 cannot drift too much in any direction as outward edges of flights 36 will engage the interior surface of the chamber 152, 154 thereby maintaining the generally centered position of belt 30 within chamber 152, 154. However, it is desirable to provide some clearance so as to minimize contact and minimize friction and minimize wear and tear on the components of the system 10.

To drive belt 30 through housing 28 the teeth of sprockets 40 of shafts 38 at the tail section 24 and head section 26 engage links 32. Providing cut-out section 156 in flights 36 facilitates this accessibility of links 32 by teeth of sprockets 40 of shafts 38 at the tail section 24 and head section 26. If cut-out section 156 was not present in flights 36 at and around the lower side or interior side of links 32 the flights 36 would block engagement of the teeth of sprockets 40 of shafts 38 at the tail section 24 and head section 26 thereby preventing driving of belt 30 through housing 28.

However, providing cut-out section 156 in flights 36 leaves an area below links 32 where grain can accumulate. This accumulated grain is inaccessible by flights 36 or any other component of the system 10. As such, this accumulated grain can remain in the void or space formed by cut-out sections 156 when belt 30 operates which is undesirable. Over time this accumulated grain can rot and can cause damage to the housing 28 as well as contribute to plugs.

In the arrangement shown, as one example, a guide 160 is placed within the void formed by cut-out sections 156. Guide 160 is formed of any suitable size, shape and design and is configured to facilitate numerous purposes. Guide 160 is configured to fill much of the void formed by cut-out sections 156 between the sprockets 40 positioned at the head section 26 and tail section 24 thereby preventing the accumulation of inaccessible grain in this space. Guide 160 is configured to shed grain to the sides of the void formed by cut-out sections 156 so that the grain is accessible by flights 36 so that the grain can be moved through housing 28. Guide 160 is also configured to provide guidance and alignment to belt 30 within housing 28 thereby maintaining a generally centrally positioned alignment of belt 30 within housing 28.

In the arrangement shown, as one example, guide 160 is connected to the upper surface of pan 146 in a generally centrally positioned location. In the arrangement shown, as one example, guide 160 extends most if not all of the length of housing 28 from just inward of sprocket 40 at tail section 24 to just inward of sprocket 40 at head section 26. The termination of guide 160 just inward of sprocket 40 at tail section 24 and just inward of sprocket 40 at head section 26 allows the sprockets 40 to engage links 32 of belt 30.

Guide 160 is connected to the upper surface of pan 146 by any manner, method or means. In one arrangement, guide 160 is a separate component from pan 146 and is connected to the upper surface of pan 146 by any manner, method or means such as being screwed, bolted, welded, adhered, or any combination thereof, or connected in any other way. In one arrangement, guide 160 may be formed as part of pan 146 bending, pressing, crimping, molding, machining or otherwise forming the features of guide 160 into or out of pan 146.

In the arrangement shown, as one example, when viewed from an end, guide 160 includes a pair of opposing sidewalls 162. In the arrangement shown, as one example, sidewalls 162 are generally flat and straight members that extend in approximate parallels paced relation to one another. In the arrangement shown, as one example, sidewalls 162 connect at their lower end to the upper surface of pan 146 and extend upward in approximate perpendicular alignment to the plane formed by the upper surface of pan 146. In the arrangement shown, as one example, sidewalls 162 connect at their upper end to the lower edge of end walls 164. In the arrangement shown, as one example, end walls 164 are generally flat and straight members that connect at their lower end to the upper end of sidewalls 162 and angle upward and inward toward one another until they connect to one another at their upper end at a peak 166 or point.

By guide 160 having peak 166 with end walls 164 that angle downward and outward therefrom, guide 160 helps to shed or direct grain that enters the void formed by cut-out sections 156 of flights 36 downward and outward such that this grain is then engaged by flights 36 and moved through housing 28. That is, guide 160 serves the purpose of both filling the void formed by cut-out sections 156 of flights 36 as well as shedding or directing grain out of the void formed by cut-out sections 156 of flights 36. In this way, guide 160 helps to prevent the build-up of stagnant grain within the void formed by cut-out sections 156 of flights 36.

In the arrangement shown, as one example, peak 166 of guide 160 is generally centrally positioned below links 32. In the arrangement shown, as one example, a small space is positioned between the lower surface of links 32 and the upper surface of peak 166 and/or end walls 164. This small space minimizes the amount of grain that can build up in this space. In an alternative arrangement, the lower surface of links 32 engages the upper surface of peak 166 and/or end walls 164 which allows guide 160 to provide guidance and alignment to belt 30.

In the arrangement shown, as one example, the exterior surface of sidewalls 162 of guide 160 terminate just inward of the inward facing opposing sides of cut-out section 156 of flights 36. In the arrangement shown, as one example, a small space is positioned between the inward facing opposing sides of cut-out section 156 of flights 36 and the outward facing opposing sides of sidewalls 162. This small space minimizes the amount of grain that can build up in this space. In an alternative arrangement, the exterior surface of sidewalls 162 of guide 160 engage the inward facing opposing sides of cut-out section 156 of flights 36 which allows guide 160 to provide guidance and alignment to belt 30.

In the arrangement shown, as one example, the space formed by cut-out section 156 is slightly oversized to the exterior peripheral shape of guide 160. This slight-oversizing minimizes contact between guide 160 and the flights 36 and/or links 32 which reduces friction and reduces wear and tear on the components. However, this tolerance or clearance also allows belt 30 to drift slightly within upper chamber 152. If belt 30 drifts too far to one side or the other, the exterior surface of sidewalls 162 of guide 160 engage the inward facing opposing sides of cut-out section 156 of flights 36 thereby causing guide 160 to provide guidance and alignment to belt 30 thereby maintaining the generally centrally positioned alignment of belt 30 within upper chamber 152.

Figure 26:
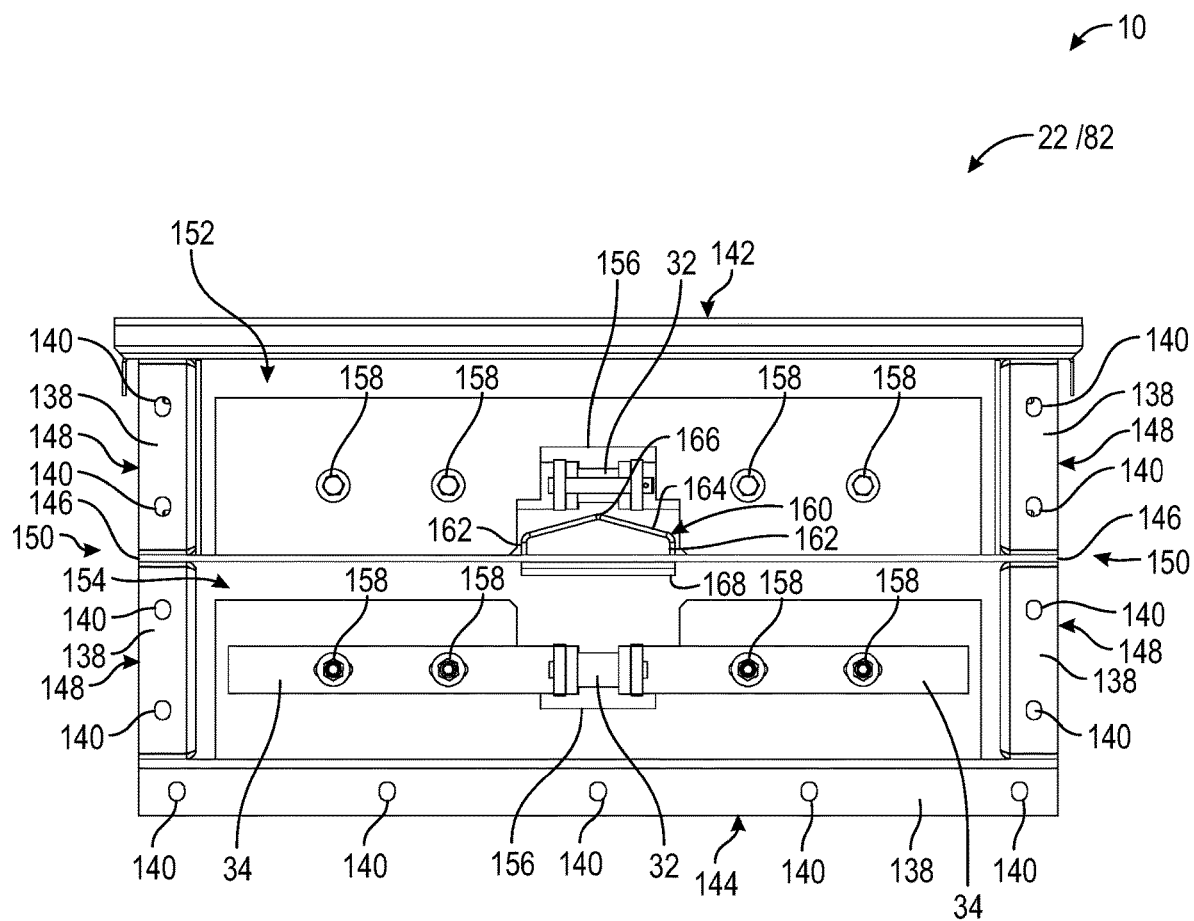
FIG. 26 shows a forward cross sectional view of a central conveyer of a single drive dual hopper conveyor system, in accordance with one or more arrangements; the view showing a belt centrally positioned over and around guide of housing of the central conveyer; the view showing flights of attached to belt by supports; the view showing the flight having a cut-out section.
Figure 27:
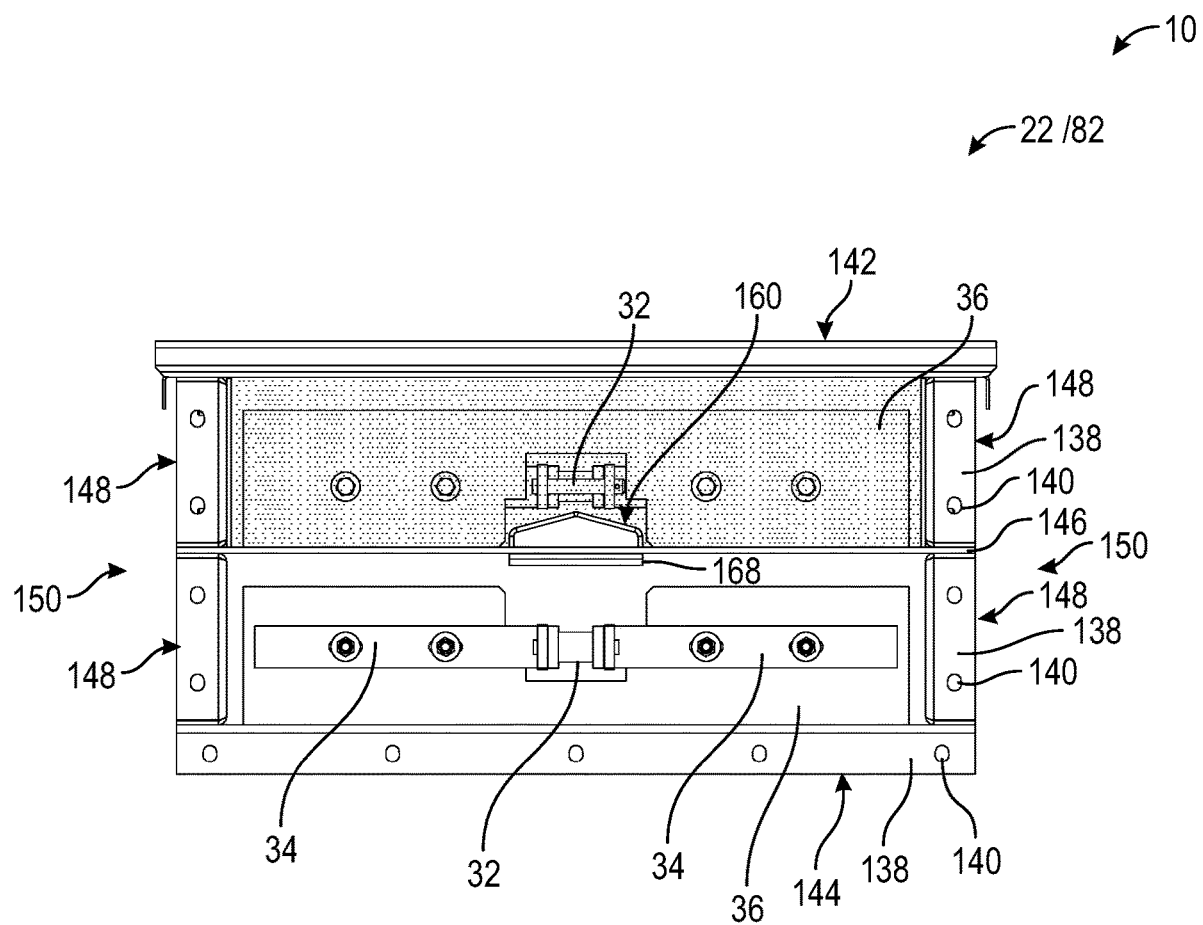
FIG. 27 shows a forward cross sectional view of a central conveyer of a single drive dual hopper conveyor system shown in FIG. 26, in accordance with one or more arrangements; the view showing grain being transported in an upper chamber of the central conveyor.

As one example, with reference to FIG. 26 and FIG. 27, belt 30 is generally centrally positioned over and around guide 160. In this example, the lower surface of links 32 are free from engagement with the upper surface of peak 166 and/or end walls 164. In this example, the inward facing opposing sides of cut-out section 156 of flights 36 are free from engagement with the exterior surface of sidewalls 162 of guide 160. As such, in this example, belt 30 is essentially free-floating around guide 160 without contact between belt 30 and guide 160.

Figure 28A:
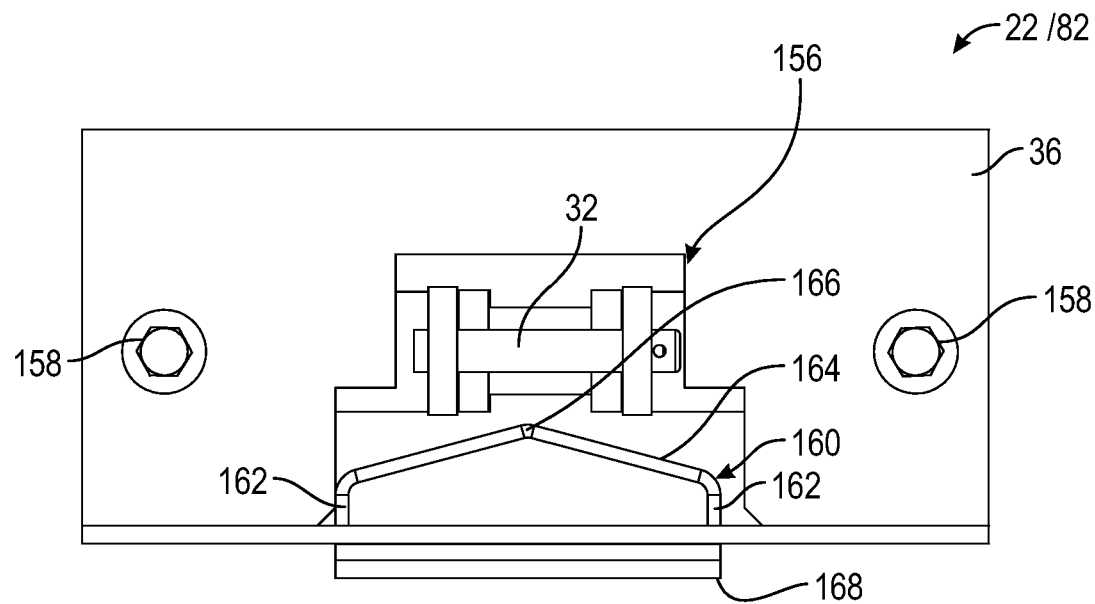
FIG. 28A shows a forward view of a belt, flight, and guide of a central conveyer of a single drive dual hopper conveyor system, in accordance with one or more arrangements; the view showing the guide positioned in a cut-out section of the flight to facilitate guiding of the belt and flights in the central conveyor; the view showing belt shifted slightly to the right withing the central conveyor.

As one example, with reference to FIG. 28A, belt 30 has shifted slightly to the right. In this example, the lower surface of links 32 are free from engagement with the upper surface of peak 166 and/or end walls 164. In this example, the left-positioned inward facing opposing side of cut-out section 156 of flights 36 is in engagement with the left-positioned exterior surface of sidewall 162 of guide 160. As such, in this example, belt 30 is in engagement with and guided by guide 160 which prevents belt 30 from drifting farther to the right.

Figure 28B:
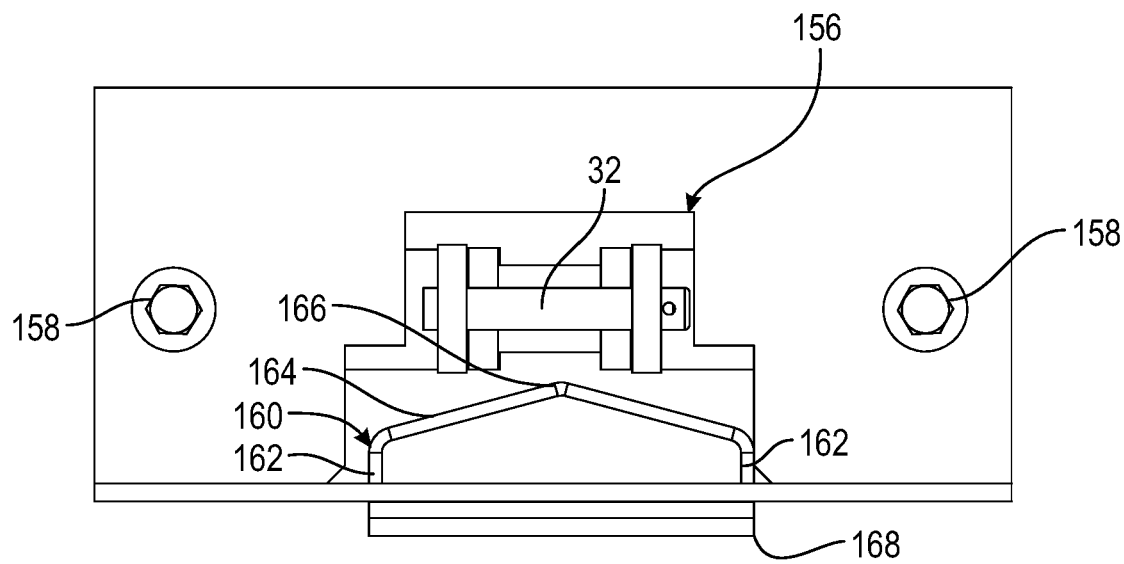
FIG. 28B shows a forward view of a belt, flight, and guide of a central conveyer of a single drive dual hopper conveyor system, in accordance with one or more arrangements; the view showing the guide positioned in a cut-out section of the flight to facilitate guiding of the belt and flights in the central conveyor; the view showing belt shifted slightly to the left withing the central conveyor.
Figure 29:
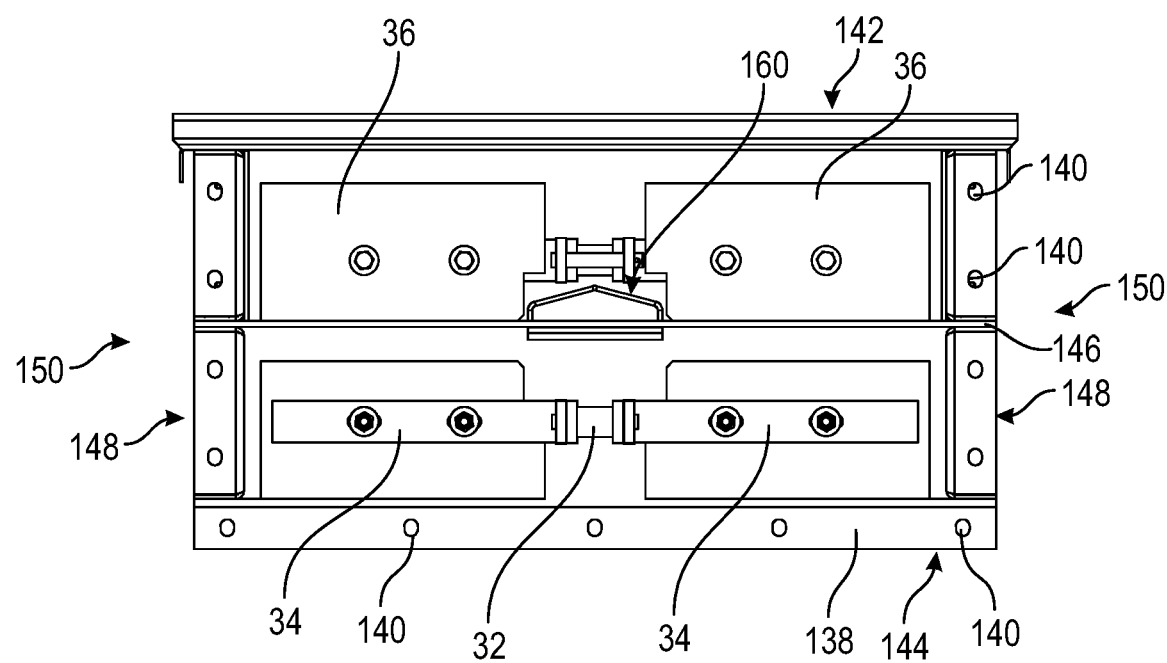
FIG. 29 shows a forward cross sectional view of a central conveyer of a single drive dual hopper conveyor system, in accordance with one or more arrangements; the view showing a belt centrally positioned over and around guide of housing of the central conveyer; the view showing flights of attached to belt by supports; the view showing the a pair of flights attached to opposing ends of each support.
Figure 30:
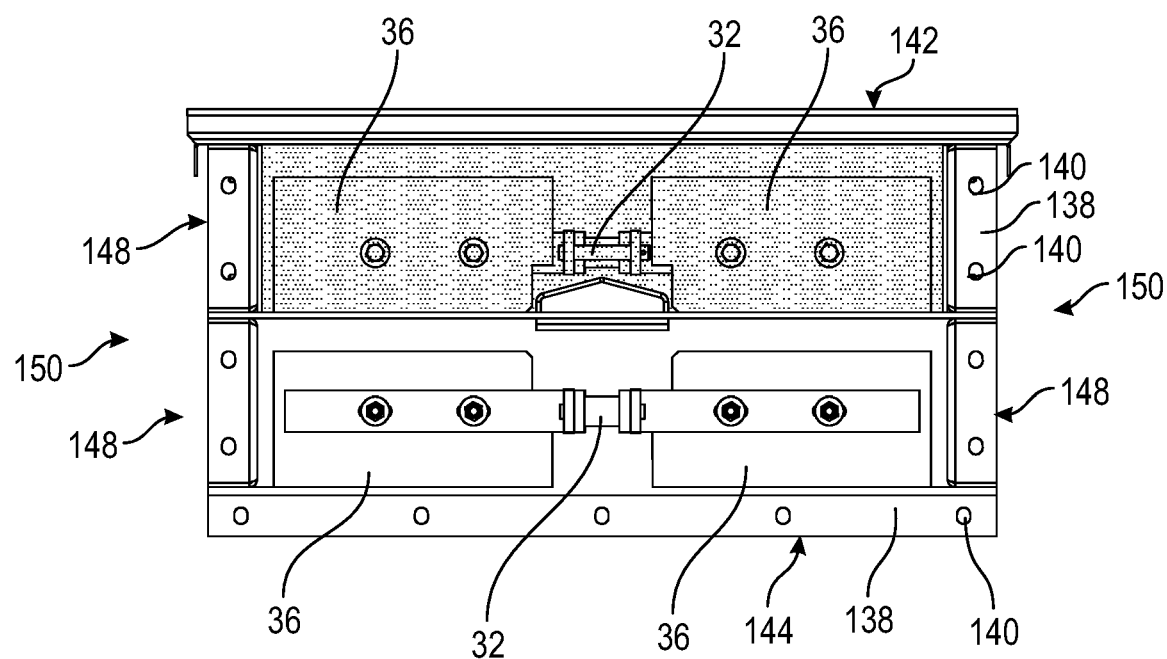
FIG. 30 shows a forward cross sectional view of a central conveyer of a single drive dual hopper conveyor system shown in FIG. 29, in accordance with one or more arrangements; the view showing the a pair of flights attached to opposing ends of each support; the view showing grain being transported in a, upper chamber of the central conveyor.
Figure 31A:
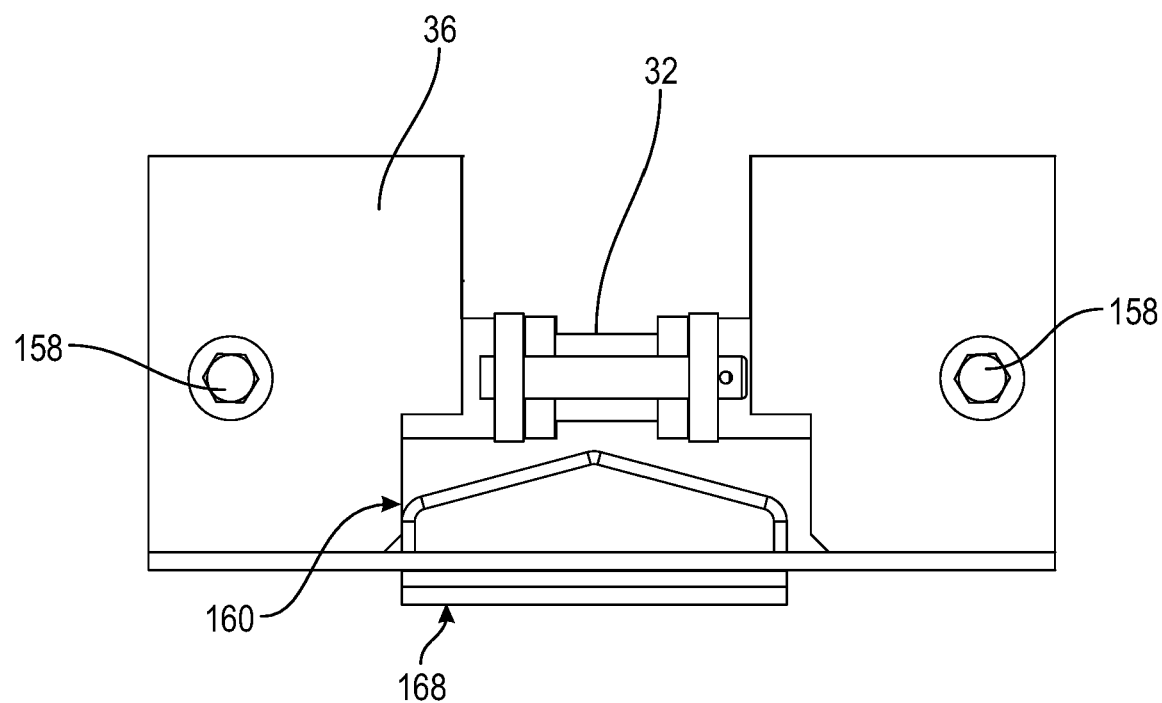
FIG. 31A shows a forward view of a belt, flight, and guide of a central conveyer of a single drive dual hopper conveyor system, in accordance with one or more arrangements; the view showing the a pair of flights attached to opposing ends of each support; the view showing the guide positioned between the pair of flights to facilitate guiding of the belt and flights in the central conveyor; the view showing belt shifted slightly to the right withing the central conveyor.
Figure 31B:
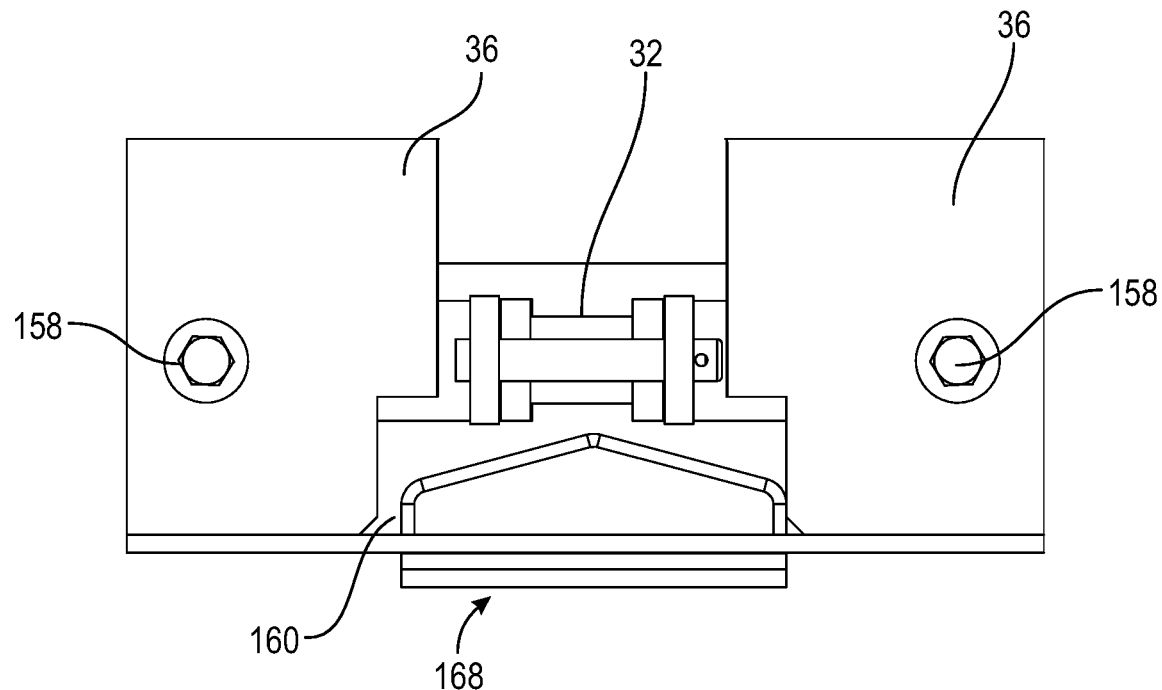
FIG. 31B shows a forward view of a belt, flight, and guide of a central conveyer of a single drive dual hopper conveyor system, in accordance with one or more arrangements; the view showing the a pair of flights attached to opposing ends of each support; the view showing the guide positioned between the pair of flights to facilitate guiding of the belt and flights in the central conveyor; the view showing belt shifted slightly to the left withing the central conveyor.
Figure 32:
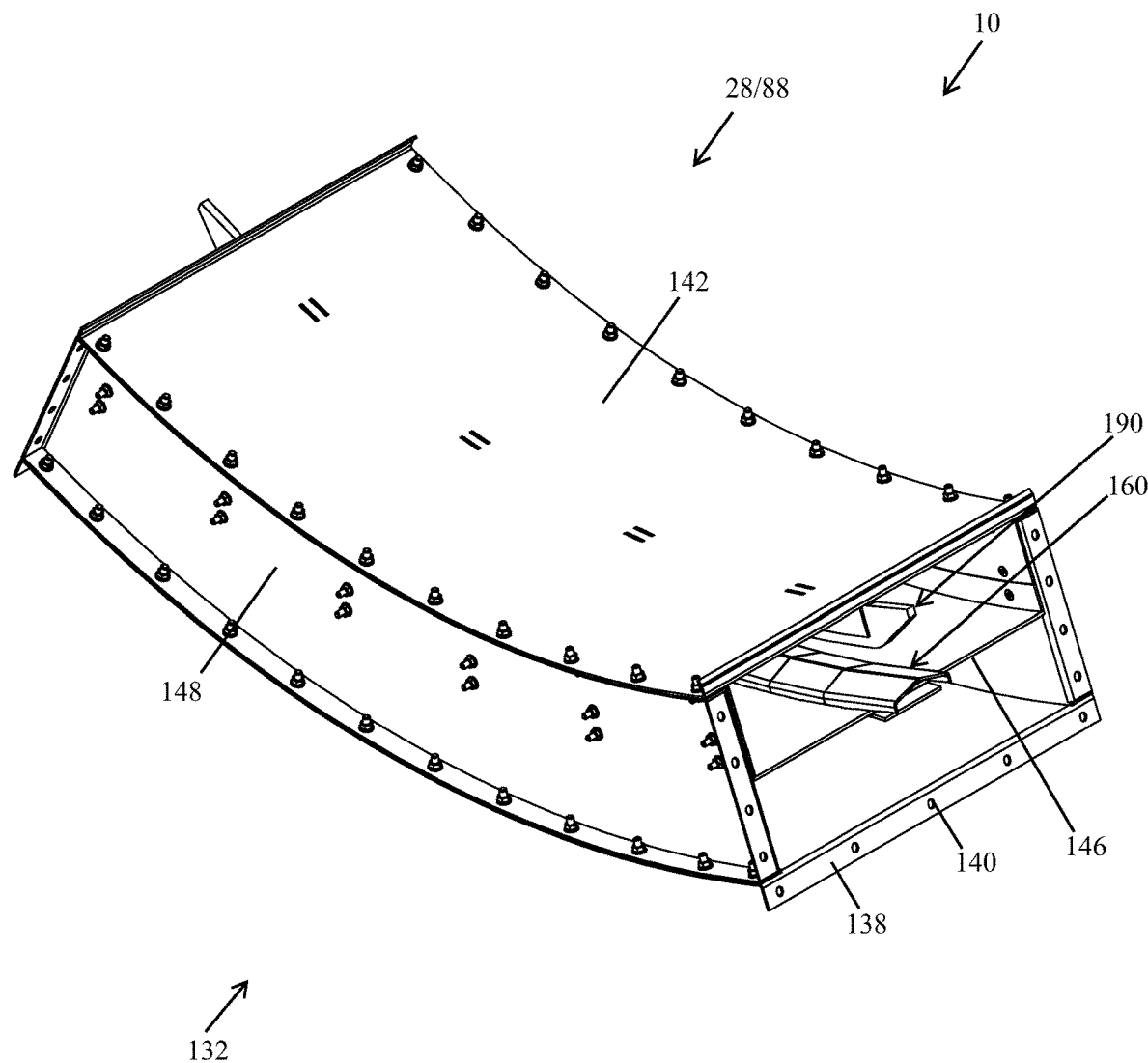
FIG. 32 shows an upper rear left perspective view of a corner section of a center conveyor system of a single drive dual hopper conveyor system, in accordance with one or more arrangements.
Figure 33:
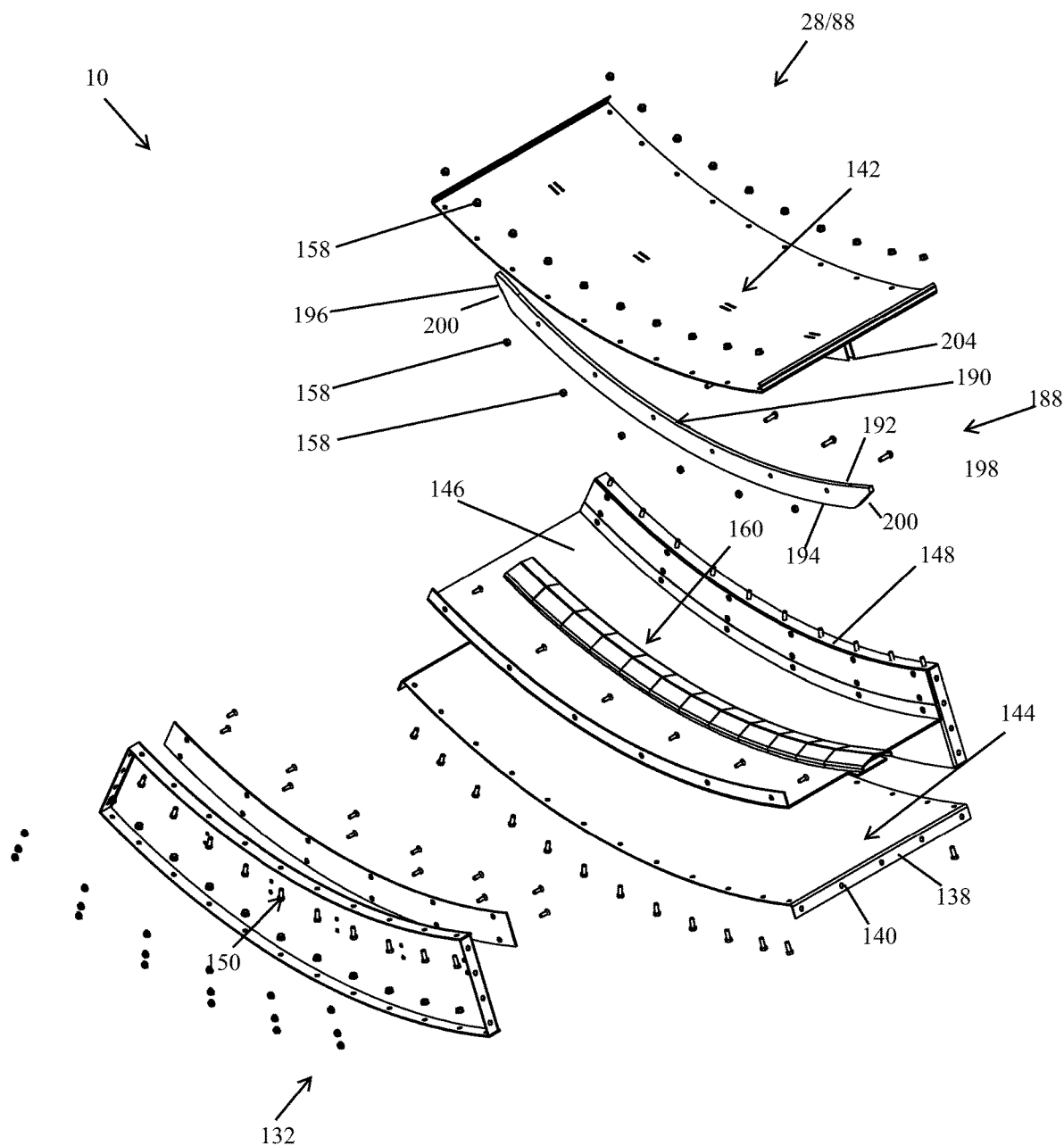
FIG. 33 shows an upper rear left perspective exploded view of a corner section of a center conveyor system of a single drive dual hopper conveyor system, in accordance with one or more arrangements.
Figure 34:
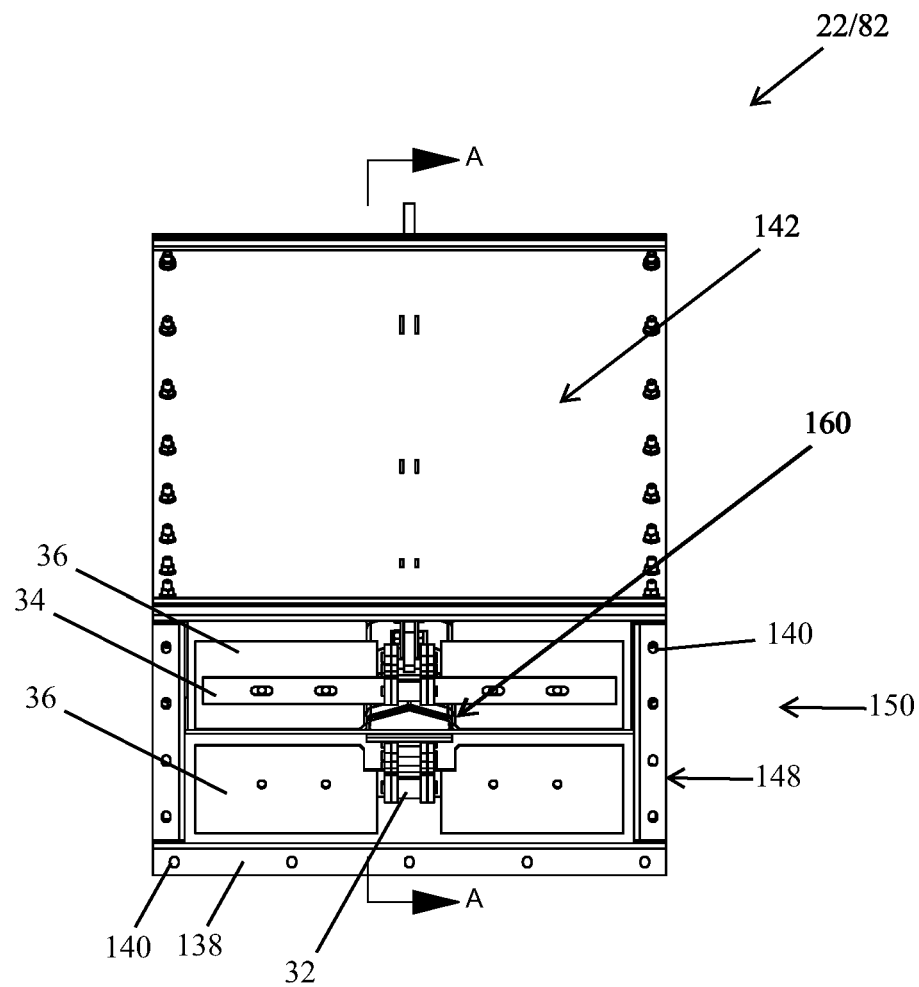
FIG. 34 shows a rear view of a corner section of a center conveyor system of a single drive dual hopper conveyor system, in accordance with one or more arrangements.
Figure 35:
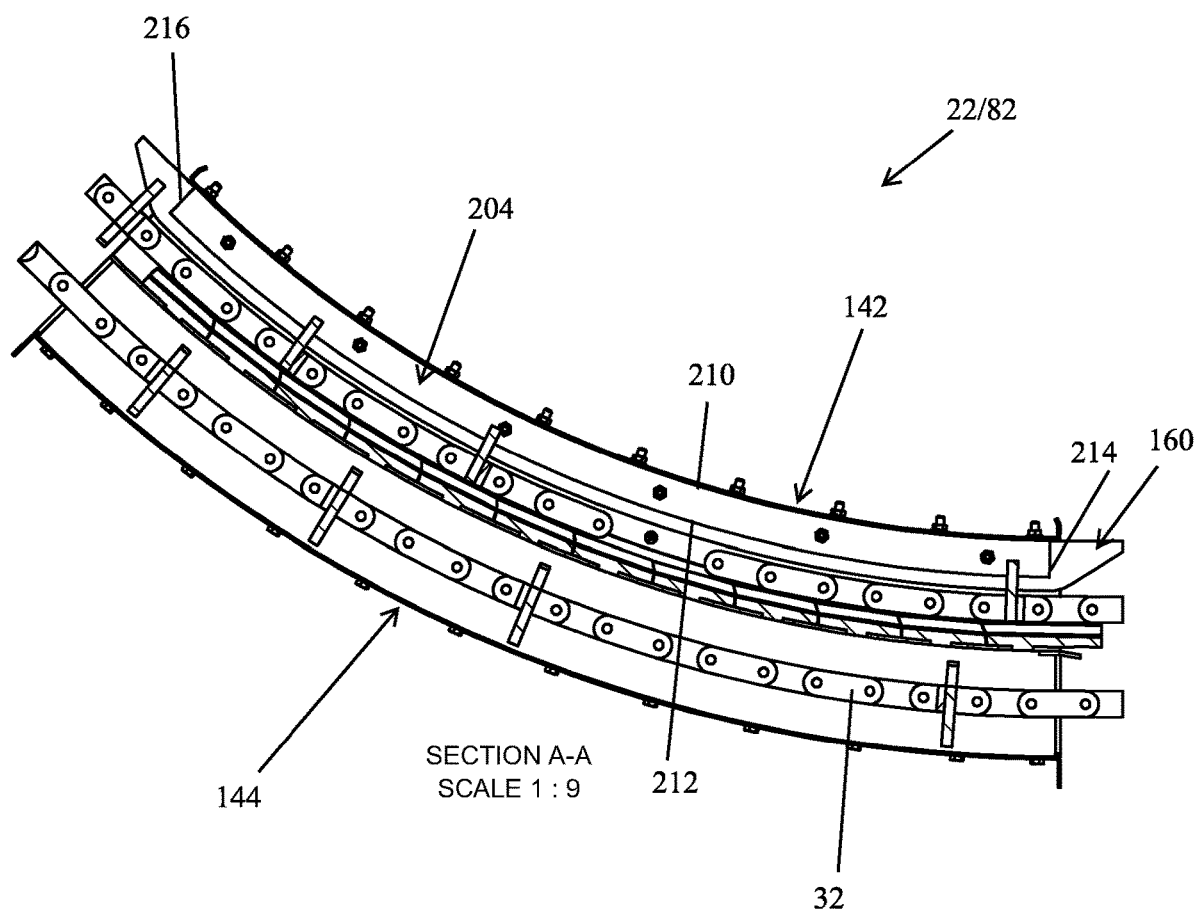
FIG. 35 shows a left cross section view of the corner section of a center conveyor system shown in FIG. 34, in accordance with one or more arrangements.

As one example, with reference to FIG. 28B, belt 30 has shifted slightly to the left. In this example, the lower surface of links 32 are free from engagement with the upper surface of peak 166 and/or end walls 164. In this example, the right-positioned inward facing opposing side of cut-out section 156 of flights 36 is in engagement with the right-positioned exterior surface of sidewall 162 of guide 160. As such, in this example, belt 30 is in engagement with and guided by guide 160 which prevents belt 30 from drifting farther to the left.

Guide 160 may be formed of any other size, shape and design. As grain is not carried in lower chamber 154, and belt 30 is inverted in lower chamber 154, no guide 160 is present in lower chamber 154.

Figure 21:
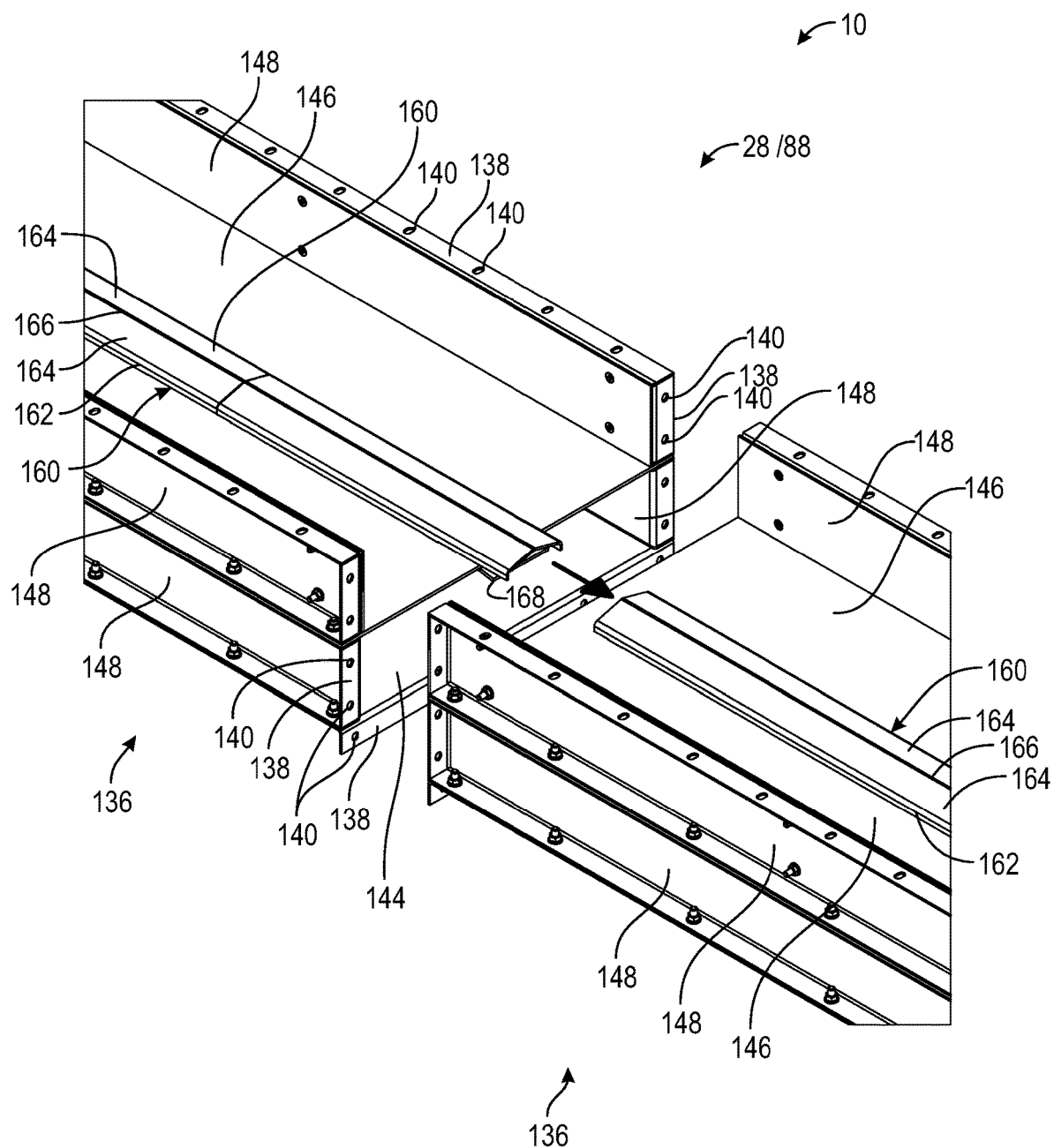
FIG. 21 shows exploded upper rear right perspective view of a housing of a conveyer system of a single drive dual hopper conveyor system, in accordance with one or more arrangements; the view showing two segments of the housing; the view showing a guide of one segment being offset with respect to the end of segments to facilitate overlapping of the other segment.
Figure 22:
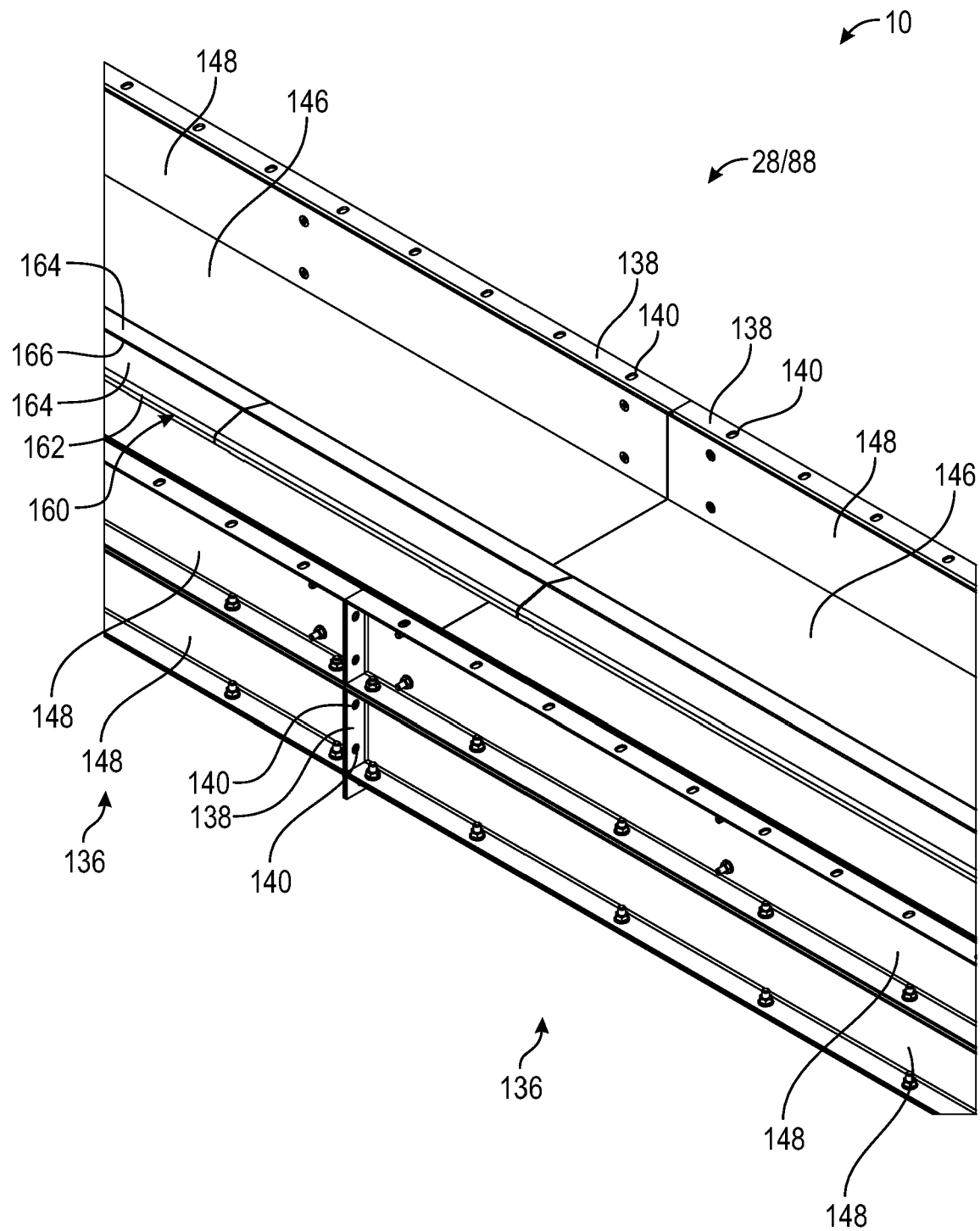
FIG. 22 shows an upper rear right perspective view of the housing shown in FIG. 21, in accordance with one or more arrangements; the view showing the two segments of the housing connected together.
Figure 23:
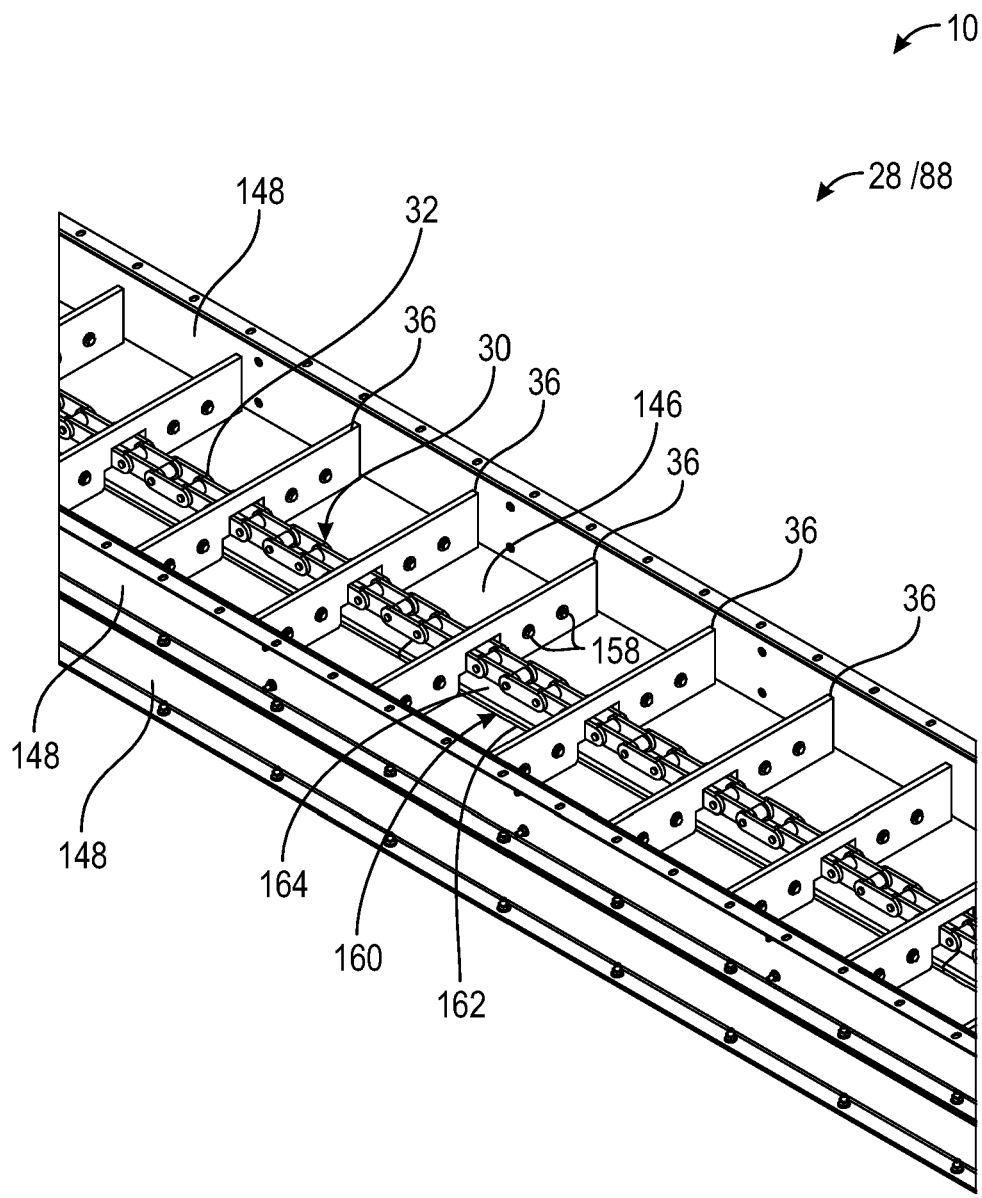
FIG. 23 shows an upper rear right perspective view of a housing of a conveyer system of a single drive dual hopper conveyor system, in accordance with one or more arrangements; the view showing a belt and flights of the conveyor system in the housing.

In the arrangement shown, as one example, with reference to FIG. 21, the length of guide 160 is offset with respect to the ends of segments 136. That is, guide 160 extends past one end of pan 146 so as to facilitate overlapping of the guide 160 attached to the pan 146 of one segment 136 with the pan 146 of an adjacent segment 136. This staggered alignment helps to ease assembly of housing 28, strengthens housing 28 once assembled, and helps to provide alignment of guide 160 across multiple segments 136.

Figure 24:
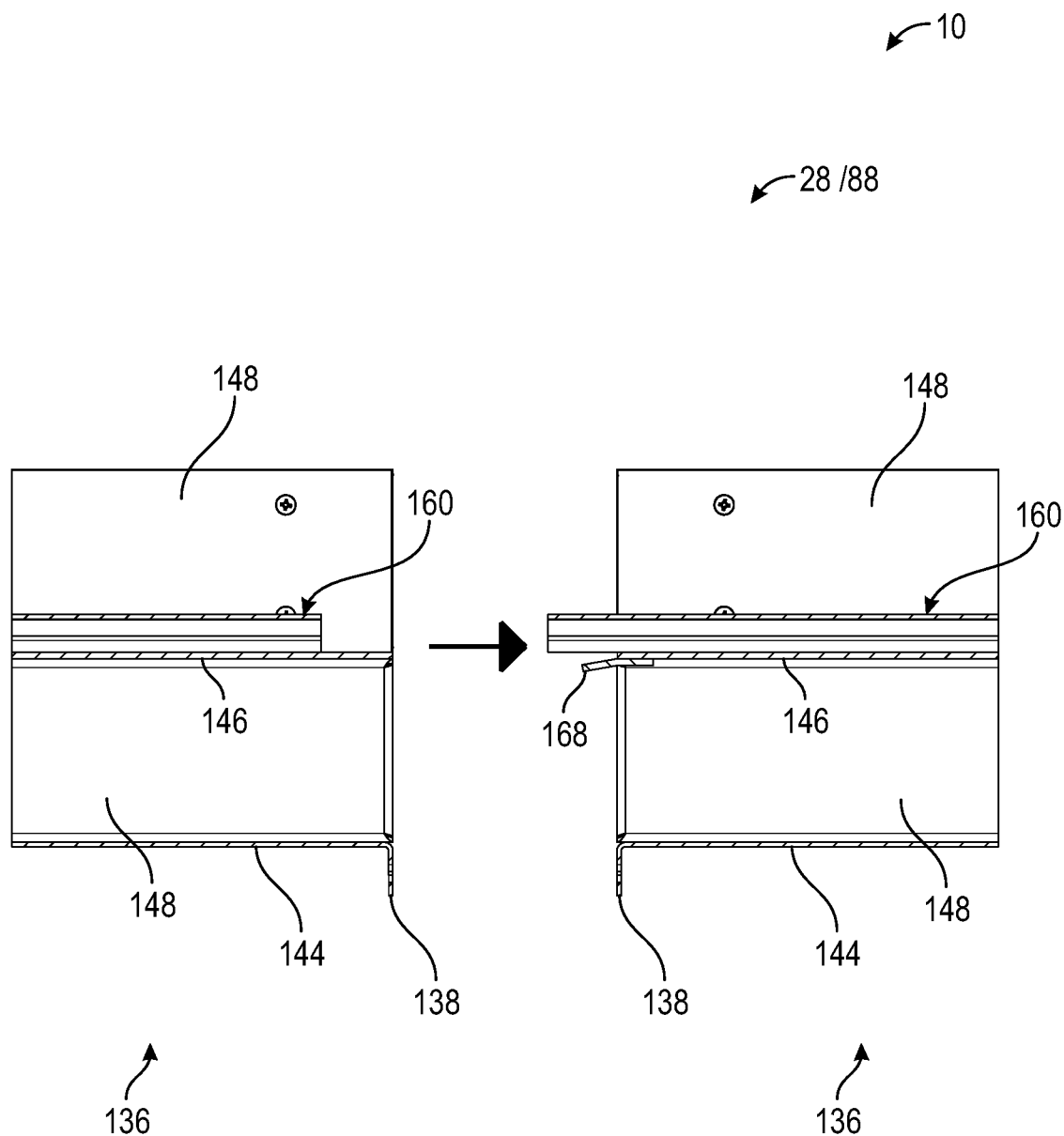
FIG. 24 shows exploded side view of a housing of a conveyer system of a single drive dual hopper conveyor system, in accordance with one or more arrangements; the view showing two segments of the housing; the view showing one of the segments having an outward end of splice plate angled slightly downward as it extends outward to facilitate joining with the other segment.
Figure 25:
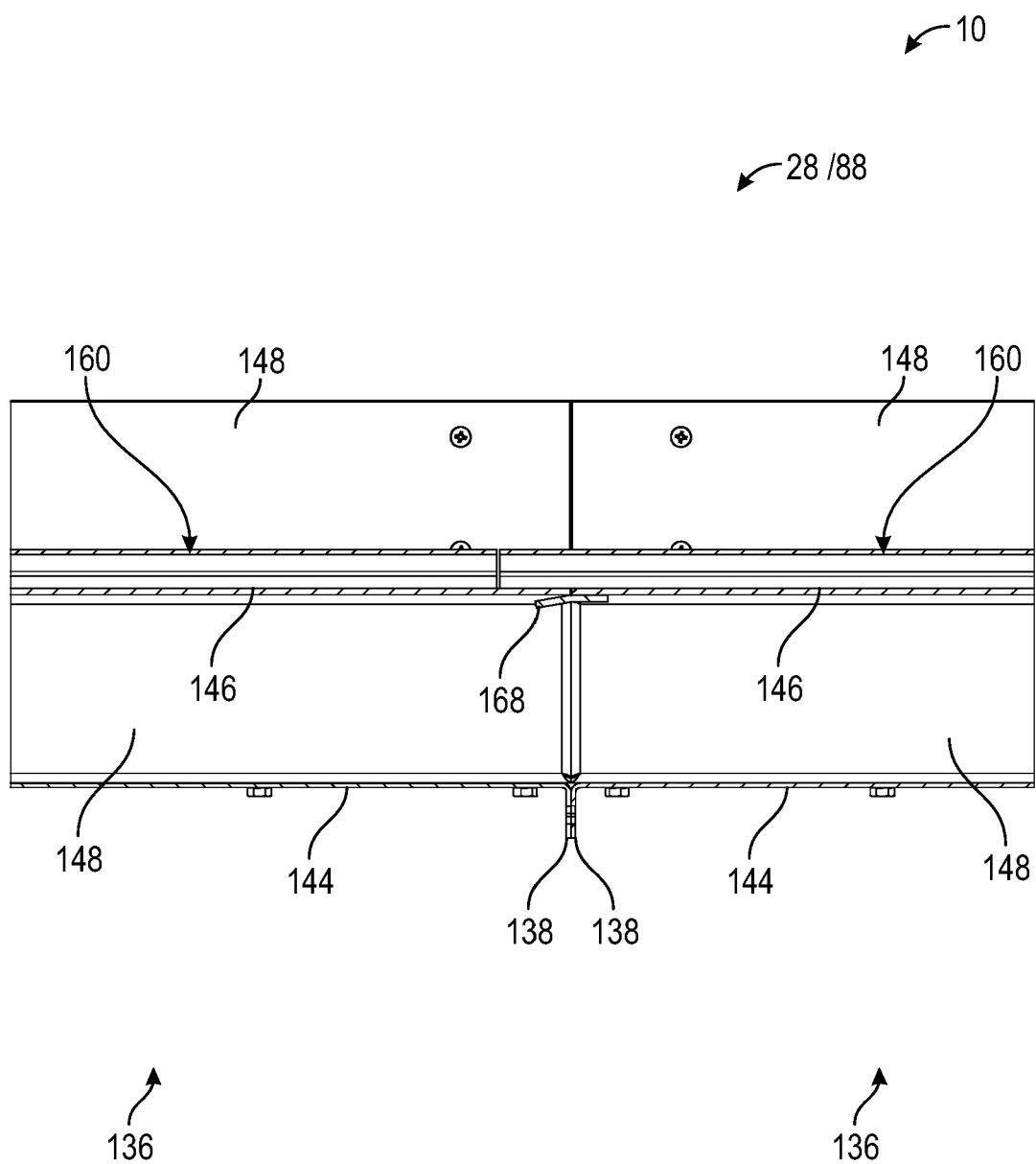
FIG. 25 shows a side view of a housing of the conveyer system shown in FIG. 24, the view showing the two segments of the housing connected together.

In addition, in the arrangement shown, as one example, a splice plate 168 is positioned on the lower side of pan 146 below the overlapping portion of guide 160. Like the end of guide 160, splice plate 168 extends past the end of pan 146 a distance. In the arrangement shown, as one example, when viewed from the side, such as that shown in FIG. 24, the outward end of splice plate 168 angles slightly downward as it extends outward. This downward angle provides a funnel or angular guide that assists with alignment of the ends of adjacent pans 146. Once assembled, splice plate 168 helps to maintain the ends of adjacent pans at the seam between two connected segments 136 in precise alignment so as to minimize any offset at the seam. The presence of the overlapping portion of guide 160 on the upper side of pan 146 with the overlapping portion of splice plate 168 on the lower side of pan 146 strengthens the connection between adjacent segments 136 and facilitates a smoother upper surface of pan 146 along the length of housing 28.

In the arrangement shown, as one example, belt 30 travels through housing 28 driven by a shaft 38 and sprocket 40 at the tail section 24 and the head section 26.

Shaft 38 and Sprocket 40: In the arrangement shown, as one example, center conveyor system 22 is configured to be used in association with a shaft 38 and sprocket 40. Shaft 38 and sprocket 40 may be formed of any suitable size, shape and design and are configured to facilitate the driving of belt 30 through housing 28.

In the arrangement shown, as one example, a shaft 38 and sprocket 40 are positioned in the tail section 24 as well as the head section 26 of center conveyor system 22. The following description applies to both tail section 24 as well as the head section 26 unless specifically stated otherwise.

In the arrangement shown, as one example, shaft 38 is a generally cylindrical elongated shaft that extends across center conveyor system 22 from sidewall 150 to sidewall 150 at both tail section 24 as well as the head section 26. In the arrangement shown, as one example, shaft 38 extends through and outward from sidewall 150 a distance.

In the arrangement shown, a bearing 42 is positioned adjacent to the intersection of sidewall 150 and shaft 38 on each side of housing 28 at both tail section 24 as well as the head section 26. Bearings 42 are formed of any suitable size, shape and design and are configured to facilitate rotation of shaft 38. In the arrangement shown, as one example, bearings 42 are what are known as self-contained bearings or sealed bearings and are positioned on the outside of housing 28. It is well known that grain dust can be explosive, in addition grain is flammable. By using sealed or self-contained bearings 42 and placing these bearings 42 on the exterior of housing 28, or more specifically on the exterior of sidewalls 150, this reduces the potential for explosion or fire.

In the arrangement shown, as one example, bearings 42 of head section 26 are connected to a take up 44. Take-up 44 is formed of any suitable size, shape and design and facilitates tightening and loosening of belt 30 by moving the position of bearings 42 and/or shaft 38. In the arrangement shown, as one example, take-up 44 at head section 26 is formed of a threaded shaft having a hex-head member that facilitates rotation of the threaded shaft. The threaded shaft is connected to a housing that holds bearing 42 and shaft 38. As the shaft of take-up 44 is rotated the position of bearing 42 and shaft 38 is adjusted, thereby tightening or loosening the tension on belt 30.

In the arrangement shown, as one example, shafts 38 of tail section 24 as well as the head section 26 include a sprocket 40. Sprocket 40 is formed of any suitable size, shape and design and is configured to rotate with shaft 38 and transfer this rotation to belt 30. In the arrangement shown, as one example, sprocket 40 is generally centrally positioned between the ends of shaft 38. In the arrangement shown, as one example, sprocket 40 is positioned to align with links 32 of belt 30. In the arrangement shown, as one example, sprocket 40 is generally centrally positioned within cut-out section 156 of flights 36. In the arrangement shown, as one example, sprocket 40 is a generally circular member having a plurality of teeth extending around its exterior circumference. These teeth are configured to engage links 32 of belt 30 thereby driving belt 30 through housing 28.

In the arrangement shown, as one example, shaft 38 and sprocket 40 are positioned adjacent the end of pan 146 of housing 28. In the arrangement shown, as one example, belt 30 wraps around shaft 38 and sprocket 40 at tail section 24 which transitions belt 30 from traveling rearward through lower chamber 154 to traveling forward in upper chamber 152. Similarly, in the arrangement shown, as one example, belt 30 wraps around shaft 38 and sprocket 40 at head section 26 which transitions belt 30 from traveling forward through upper chamber 152 to traveling rearward in lower chamber 154.

In the arrangement shown, grain is received by belt 30 adjacent tail section 24 in upper chamber 152 and above the upper surface of pan 146. This grain is transported along center conveyor system 22 along the upper surface of pan 146 by the links 32, supports 34 and flights 36 of belt 30. As this grain is transported, belt 30 is guided by guide 160 positioned within the cut-out section 156 of flights 36 while guide 160 simultaneously prevents grain from filling the void formed by cut-out section 156 of flights 36 between tail section 24 and head section 26. This grain that would have filled the void formed by cut-out section 156 is shed to the sides of cut-out section 156 by the angled upper end walls 164 and peak 166 of guide 160 causing this grain to be engaged by flights 36 and transported by belt 30.

Similarities Between Center Conveyor System 22 and Side Conveyor Systems 82: Center conveyor system 22 and side conveyor systems 82 have their differences. However, center conveyor system 22 and side conveyor systems 82 have substantial similarities. As such, to reduce redundancy, unless stated specifically herein, the above disclosure, as well as other disclosure herein, related to center conveyor system 22 applies equally to side conveyor systems 82. That is, teaching related to housing 28 of center conveyor system 22 applies to housing 88 of side conveyor systems 82 and include the common components of belt 30, links 32, supports 34, flights 36, segments 136, flanges 138, holes 140, top wall 142, bottom wall 144, pan 146, sidewalls segments 148, sidewalls 150, upper chamber 152, lower chamber 154, cut-out section 156, fasteners 158, guide 160 having sidewalls 162, end walls 164 and peak 166 and splice plate 168 among other features, components and systems.

Motor Assembly 48:

In the arrangement shown, as one example, single drive dual hopper conveyor system 10 is configured to be used in association with motor assembly 46. Motor assembly 46 may be formed of any suitable size, shape and design and is configured to convert electrical power into rotation thereby driving center conveyor system 22 as well as side conveyor systems 82.

In the arrangement shown, as one example, motor assembly 46 is connected to shaft 38 adjacent head section 26 of center conveyor system 22. However it is hereby contemplated to connect motor assembly 46 to any other portion of system 10 such as to tail section 24 of center conveyor system 22, tail section 84 or head section 86 of either of the side conveyor systems 82, to power transfer section 66 between center conveyor system 22 and side conveyor systems 82, or to any other portion or component of system 10.

One of the benefits of connecting motor assembly 46 to head section 26 of center conveyor system 22 is that this places motor 48 and the other components of motor assembly 46 outside of pit 14 and above ground in an easily accessible area free of the space constraints associated with placing motor assembly 46 in pit 14 and free of the possibility that motor 48 could be submerged in water if pit 14 ever filled up with water. This positioning allows for easy repair and replacement of motor 48 and the other components of motor assembly 46. Positioning motor assembly 46 and motor 48 up in the air and not in pit 14 also allows for the free movement of air around motor 48 which helps to cool and/or moderate the temperature of motor 48 thereby extending the life of motor 48.

One of the benefits of the single drive dual hopper conveyor system 10 is that the system 10 only utilizes a single motor 48. Using only a single motor 48 reduces the cost of the system 10 by eliminating extra motors 48 and motor assemblies 46 that are required to connect the motor 48 to the system 10 as well as the electronics that are required to control operation of the motor 48. Using only a single motor 48 reduces the cost and complexity of wiring the system 10 as only a single motor 48 needs to be wired, powered, and controlled. Using only a single motor 48 reduces the cost and complexity of maintenance of the system 10 as only a single motor 48 and motor assembly 46 must be serviced, repaired and/or replaced. Using only a single motor 48 ensures the system 10 runs optimally as all moving components move from the motion provided by motor 48 all moving components move in unison and simultaneously. This eliminates the possibility that one motor runs faster than another thereby causing balancing and/or plugging problems. This also eliminates the possibility that one motor is on while the other motor is off thereby causing plugging problems. This also eliminates the complexity and cost associated with wiring and powering and precisely controlling multiple motors 48. As such, using only a single motor 48 and therefor using only a single motor assembly 46 provides many benefits.

However, using only a single motor 48 and motor assembly 46 causes a number of complexities. One substantial complexity is how to cause each of the movable members, such as center conveyor system 22 and side conveyor systems 82, to move based on movement of a single motor 48. Another substantial complexity is how to cause each of the movable members, such as center conveyor system 22 and side conveyor systems 82, to move at the desired speed based on movement of a single motor 48. That is, it may be desirable to have center conveyor system 22 and side conveyor systems 82 to move at different speeds relative to one another. Another substantial complexity is how to cause provide enough power from a single motor 48 to power all of the movable members, such as center conveyor system 22 and side conveyor systems 82, without breaking parts, wearing out parts, and/or requiring excessive maintenance or repair. That is, there are substantial complexities in making the system 10 strong and robust enough while not making the system 10 cost-prohibitive. These and countless other complexities are associated with using only a single motor 48 to operate system 10.

In the arrangement shown, as one example, motor assembly 46 includes a motor 48, motor bracket 50, take-ups 52, output shaft 54, a power transfer section 56 having a first pulley 58, a second pulley 60 and a connector 62, and a gearbox 64 among other features, components and systems as is described herein.

In the arrangement shown, as one example, motor assembly 46 includes a motor 48. Motor 48 may be formed of any suitable size shape and design and is configured to convert electrical energy into rotational energy that powers system 10. In the arrangement shown, as one example, motor 48 is formed of a conventional electrical motor, such as a three-phase electric motor or the like. However, any other form of a motor or engine is hereby contemplated for use such as an internal combustion motor or engine, a hydraulic motor, a pneumatic motor, or any other device that facilitates rotation or the delivery of power to the system 10.

In the arrangement shown, as one example, motor 48 is connected to motor bracket 50. Motor bracket 50 is formed of any suitable size, shape and design and is configured to connect motor 48 adjacent head section 26 of center conveyor system 22. Placing motor assembly 46 adjacent head section 26 of center conveyor system 22 is convenient as it is outside of the pit 14 which reduces the cost and complexity of forming pit 14 in a manner to house motor 48 as well as the other components of motor assembly 46. Placing motor assembly 46 adjacent head section 26 also provides the benefit of making motor 48 and motor assembly 46 easily assessable for maintenance and repair purposes. In addition, placing motor assembly 46 adjacent head section 26 also provides the benefit of having free flowing air around the motor 48 and motor assembly 46 which cools the motor 48 and motor assembly 46. This is among many other benefits.

In the arrangement shown, as one example, motor bracket 50 includes one or more take-ups 52. Take-ups 52 are formed of any suitable size, shape and design and facilitate tightening and loosening and adjustment of motor assembly 46 by moving the location of motor 48 and/or output shaft 54 of motor 48. In the arrangement shown, as one example, take-ups 52 are formed of threaded shafts having a hex-head member that facilitates rotation of the threaded shaft. The threaded shafts are connected to a pair of movable members of motor bracket 50. As the shafts of take-up 52 are rotated the position of motor 48 and output shaft 54 is adjusted, thereby tightening or loosening the tension on connector 62.

In the arrangement shown, as one example, motor 48, or more specifically output shaft 54 of motor 48, is connected to power transfer section 56 of motor assembly 46. Power transfer section 56 is formed of any suitable size, shape and design and is configured to transfer rotation of output shaft 54 of motor 48 to center conveyor system 22. In the arrangement shown, as one example, power transfer section 56 includes a first pulley 58 that is connected to output shaft 54 of motor 48. First pulley 58 is connected to second pulley 60 by connector 62, which in the arrangement shown, is a plurality of belts. One of the benefits of the system 10 is that essentially the gear ratio can be changed by changing the diameter of first pulley 58 and/or second pulley 60. As such, as motor 48 rotates, so rotates first pulley 58 which moves connector 62 which causes rotation of second pulley 60. It is hereby contemplated that additional or intermediary pulleys could be used. In addition, it is hereby contemplated that gears and chains may be used to replace first pulley 58, second pulley 60 and connector 62.

In the arrangement shown, as one example, second pulley 60 connects to shaft 170 of gearbox 64. Gearbox 64 is formed of any suitable size, shape and design and is configured to transfer rotation of second pulley 60 to rotation of shaft 38 at the head section 26. In the arrangement shown, as one example, gearbox 64 connects to shaft 38 at head section 26 of center conveyor system 22.

Notably, a guard 172 is placed around first pulley 58, second pulley 60 and connector 62 so as to prevent access to these moving components so as to increase safety and reduce accidents.

As such, in the arrangement shown, when motor 48 is powered, the internal components of motor 48 rotate which causes output shaft 54 of motor 48 to rotate. As the output shaft 54 of motor 48 rotates, this causes first pulley 58 to rotate. As first pulley 58 rotates, this causes connector 62 to move. As connector 62 moves, this causes second pulley 60 to rotate. As second pulley 60 rotates, this causes shaft 170 of gearbox 64 to rotate. As shaft 170 rotates, this causes the internal components of gearbox 64 to rotate, which causes shaft 38 of head section 26 to rotate. As shaft 38 of head section 26 rotates, this causes sprocket 40 to rotate. As sprocket 40 rotates, the teeth of sprocket 40 mesh with the links 32 of belt 30 which causes belt 30 to rotate around shaft 38 and sprocket 40.

As shaft 38 and sprocket 40 of head section 26 rotate, and teeth of sprocket 40 mesh with the links 32 of belt 30 in cut-out section 156 of flights 36. As shaft 38 and sprocket 40 of head section 26 rotate, and teeth of sprocket 40 mesh with the links 32 of belt 30, this causes belt 30 to be pulled along the upper surface of pan 146 within upper chamber 152. As shaft 38 and sprocket 40 of head section 26 rotate, and teeth of sprocket 40 mesh with the links 32 of belt 30, this causes belt 30 to be returned through lower chamber 154.

When belt 30 reaches tail section 24, shaft 38 and sprocket 40 of tail section 24 rotate, and teeth of sprocket 40 mesh with the links 32 of belt 30 in cut-out section 156 of flights 36. As shaft 38 and sprocket 40 of tail section 24 rotate, and teeth of sprocket 40 mesh with the links 32 of belt 30, this causes belt 30 to move through lower chamber 154.

When belt 30 travels over shaft 38 and sprocket 40 of head section 26 belt 30 transitions from moving forward (from tail section 24 to head section 26) through upper chamber 152 to moving rearward (from head section 26 to tail section 24) through lower chamber 154.

When belt 30 travels over shaft 38 and sprocket 40 of tail section 24 belt 30 transitions from moving rearward (from head section 26 to tail section 24) through lower chamber 154 to moving forward (from tail section 24 to head section 26) through upper chamber 152.

In the arrangement shown, as one example, when belt 30 moves through upper chamber 152, the bottom surface of flights 36 slide over the upper surface of pan 146 as the belt moves over guide 160 which is positioned within cut-out sections 156 of flights 36. When grain is poured into center conveyor system 22 adjacent tail section 24, the grain lands on the upper surface of pan 146 and is urged forward by flights 36 as the grain slides along the upper surface of pan 146. Once the grain reaches the head section 26, the grain is dumped out of opening 174 in head section 26 and into grain transfer or storage device 116. Opening 174 is positioned in the lower and forward side of head section 26 just past the outward end of pan 146. Once the grain moves past the outward end of pan 146 the grain falls by way of gravity, along with the urging of forward moving flights 36, through opening 174.

In the arrangement shown, as one example, the rotation and movement of belt 30 of center conveyor system 22 is transferred to movement of belts 30 of side conveyor systems 82 by power transfer section 66 of tail section 24.

Power Transfer Section 66 of Tail Section 24:

In the arrangement shown, as one example, tail section 24 includes a power transfer section 66. Power transfer section 66 is formed of any suitable size, shape and design and is configured to transfer rotation of center conveyor system 22 to simultaneous rotation of side conveyor systems 82.

Power transfer section 56 is formed of any suitable size, shape and design and is configured to transfer rotation of shaft 38 of tail section 24 of center conveyor system 22 to rotation of shafts 98 and sprockets 100 of tail section 84 of side conveyor systems 82. In the arrangement shown, as one example, power transfer section 66 includes a first pulley 68 that is connected to shaft 38 of tail section 24 of center conveyor system 22. First pulley 68 is connected to second pulley 70 by connector 72. In the arrangement shown, first pulley 68 and second pulley 70 are pulleys with teeth therein and connector 72 is a chain that meshes with the teeth of first pulley 68 and second pulley 70 thereby driving simultaneous rotation of one another.

One of the benefits of the system 10 is that essentially the gear ratio can be changed by changing the diameter of first pulley 68 and/or second pulley 70. As such, as shaft 38 of tail section 24 of center conveyor system 22 rotates, so rotates first pulley 68 which moves connector 72 which causes rotation of second pulley 70. It is hereby contemplated that additional or intermediary pulleys could be used. In addition, it is hereby contemplated that a belt and pulley arrangement may be used instead of gears and chains for first pulley 68, second pulley 70 and connector 72.

In the arrangement shown, as one example, second pulley 70 connects to shaft 176. Shaft 176 extends across tail section 24 of center conveyor system 22 adjacent the upper side of top wall 142 of housing 28. Shaft 176 connects to the shaft 98 of tail sections 84 of both side conveyor systems 82.

In the arrangement shown, as one example, shaft 176 connects to a pair of gearboxes 74. Each gearbox 74 connects to a shaft 98 of a tail section 84 of a side conveyor systems 82.

Gearboxes 74 are formed of any suitable size, shape and design and is configured to transfer rotation of second pulley 70 and shaft 176 to rotation of shaft 98 at the tail section 84 of both side conveyor systems 82. In the arrangement shown, as one example, gearboxes 74 are what are known as 90° gearboxes in that they transfer rotation from one plane or axis of rotation to rotation in a second plane or axis of rotation wherein the plane or axis of rotation is approximately perpendicular to one another. Gears of this nature are also often referred to as bevel gears. In the arrangement shown, as one example, gearboxes 74 include a first section 76 that is connected to shaft 176 and rotates with rotation of shaft 176. The gears of first section 76 mesh with gears of a second section 78. Second section 78 is connected to the rearward end of shafts 98 of tail section 84 of side conveyor systems 82.

In this way, rotation of shaft 176 of power transfer section 66 of tail section 24 of center conveyor system 22 causes rotation of shafts 98 positioned in tail section 84 of both side conveyor systems 82. Notably, rotation of shaft 176 of power transfer section 66 of tail section 24 of center conveyor system 22 is in an approximate perpendicular alignment to rotation of shafts 98 positioned in tail section 84 of both side conveyor systems 82 which is accomplished by the translation of rotation by a gearbox 74 associated with each shaft 98 positioned in tail section 84 of side conveyor systems 82.

In the arrangement shown, as one example, to facilitate this rotation, a bearing 178 is positioned on each outward side of gearboxes 74. Bearings 178 are formed of any suitable size, shape and design and facilitate rotation of one component with respect to another component.

In addition, to facilitate assembly and disassembly of this complex power transfer section 66 a plurality of couplers 80 are located throughout power transfer section 66. Couplers 80 are formed of any suitable size, shape and design and facilitate the connection of shafts and the rotation of shafts also allow for the disassembly or separation of components. The presence of couplers 80 allows for a user to take apart portions of power transfer section 66 while leaving other portions of power transfer section 66. In the arrangement shown, as one example, a pair of couplers 80 are positioned along the length of shaft 176 between gearboxes 74. Another coupler 80 is positioned between gearboxes 74 and shaft 98 of tail section 84 of side conveyor systems 82. These couplers 80 allow a gearbox 74 to be removed and replaced when necessary without having to disturb the other gearbox 74 or other components of power transfer section 66, or side conveyor systems 82 or center conveyor system 22. The presence of couplers 80 provide substantial time savings when repairs are needed.

Notably, a guard 180 is placed around first pulley 68, second pulley 70 and connector 72 so as to prevent access to these moving components so as to increase safety and reduce accidents.

As such, in the arrangement shown, when motor 48 is powered, this causes rotation of belt 30 of center conveyor system 22 through housing 28. As belt 30 rotates, shaft 38 and sprocket 40 of tail section 24 of center conveyor system 22 rotate, and teeth of sprocket 40 mesh with the links 32 of belt 30 in cut-out section 156 of flights 36. When belt 30 travels over shaft 38 and sprocket 40 of tail section 24 belt 30 transitions from moving rearward (from head section 26 to tail section 24) through lower chamber 154 to moving forward (from tail section 24 to head section 26) through upper chamber 152.

As shaft 38 and sprocket 40 of tail section 24 of center conveyor system 22 rotate this causes first pulley 68 to rotate. As first pulley 68 rotates, this causes connector 72 to move. As connector 72 moves, this causes second pulley 70 to rotate. As second pulley 70 rotates, this causes shaft 176 to rotate. As shaft 176 rotates, this causes gearboxes 74 to rotate. More specifically, as shaft 176 rotates, this causes the first section 76 of gearboxes 64, which are affixed to shaft 176, to rotate. As the first section 76 of gearboxes 64 rotate with shaft 176, the meshing engagement of the teeth of first section 76 with second section 78 causes the second section 78 of gearboxes 74 to rotate. As the second section 78 of gearboxes 64 rotate this causes shafts 98 of tail sections 84 of side conveyor systems 82 to rotate. As shafts 98 of tail sections 84 of side conveyor systems 82 rotate, this causes sprockets 100 to rotate. As sprockets 100 rotates, the teeth of sprocket 100 mesh with the links 32 of belt 30 of side conveyor systems 82 which causes belt 30 to rotate around shaft 98 and sprocket 100 thereby driving the motion of belts 30 of side conveyor systems 82 simultaneous with the driving the motion of belts 30 of center conveyor system 22.

Side Conveyor System 82:

In the arrangement shown, as one example, single drive dual hopper conveyor system 10 includes a pair of side conveyor systems 82. Side conveyor systems 82 may be formed of any suitable size, shape and design and is configured to receive grain from dual hopper belly dump trailer 12 and convey it to the center conveyor system 22.

In the arrangement shown, as one example, two side conveyor systems 82 are positioned in approximate linear alignment with one another at the tail section 24 of center conveyor system 22. In the arrangement shown, as one example, each side conveyor system 82 is approximately identical but a mirror image of one another. As such, unless stated otherwise, reference to a side conveyor system 82 applies to both side conveyor systems 82.

In addition, as is stated herein, while center conveyor system 22 and side conveyor systems 82 have their differences, they have substantial similarities. As such, to reduce redundancy, unless stated specifically herein, disclosure related to center conveyor system 22 applies equally to side conveyor systems 82. That is, teaching related to housing 28 of center conveyor system 22 applies to housing 88 of side conveyor systems 82 and center conveyor system 22 and side conveyor systems 82 include the common components of belt 30, links 32, supports 34, flights 36, segments 136, flanges 138, holes 140, top wall 142, bottom wall 144, pan 146, sidewalls segments 148, sidewalls 150, upper chamber 152, lower chamber 154, cut-out section 156, fasteners 158, guide 160 having sidewalls 162, end walls 164 and peak 166 and splice plate 168 among other features, components and systems.

In the arrangement shown, as one example, side conveyor systems 82 extend a length from tail section 84, at their outward end, to head section 86, at their inward end. In the arrangement shown, as one example, side conveyor systems 82 extend in approximate straight, horizontal and level manner from tail section 84 to head section 86. In the arrangement shown, as one example, side conveyor systems 82 are aligned with one another in a generally straight and linear manner with their head sections 86 positioned away from one another and their tail sections 84 positioned toward one another.

In the arrangement shown, as one example, side conveyor systems 82 include a shaft 98 that extends across housing 88 at tail section 84 as well as at head section 86 and includes sprocket 100 thereon that engages and drives belt 30 through housing 88. Shaft 98 connects to bearings 102 positioned on the outside of housing 88 that facilitate rotation of shaft 98. Side conveyor systems 82 include take-ups 104 at their tail section 84 that facilitate selective tensioning of side conveyor systems 82. Housing 88 of side conveyor systems 82 is similar to housing 28 of center conveyor system 22. Shaft 98 and sprocket 100 of side conveyor systems 82 is similar to shaft 38 and sprocket 40 of center conveyor system 22. Bearings 102 of side conveyor systems 82 are similar to bearings 42 of center conveyor system 22. Take-ups 104 of side conveyor systems 82 is similar to take-ups 44 of center conveyor system 22.

Hopper 106: In the arrangement shown, a hopper 106 is connected to the top wall 142 of housing 88 adjacent the outward end or head section 86 of each side conveyor system 82. Hopper 106 is formed of any suitable size, shape and design and is configured to catch grain falling out of a hopper 126 of dual hopper belly dump trailer 12 and funnel it to land on the upper surface of pan 146 of side conveyor systems 82 adjacent tail section 84.

In the arrangement shown, as one example, hopper 106 includes a pair of end walls 108 and a pair of sidewalls 110 that extend from an upper end 112 to a lower end 114. In the arrangement shown, as one example, hopper 106 connects at its lower end 114 to an opening in top wall 142 of housing 88. In this way, hopper 106 provides access or a passageway for grain to reach pan 146 of upper chamber 152 of side conveyor systems 82 so that the grain can be moved toward center conveyor system 22 by belt 30.

In the arrangement shown, as one example, end walls 108 extend vertically upward from top wall 142 at the tail section 84 side and head section 86 side of hopper 106. In the arrangement shown, as one example, end walls 108 extend in approximate perpendicular alignment to the length of side conveyor systems 82. The upper end 112 of end walls 108 widens as it extends upward so as to match the outward angling of sidewalls 110

In the arrangement shown, as one example, sidewalls 110 extend vertically upward from top wall 142 at the sides of hopper 106. Sidewalls 110 also angle outward as they extend upward from lower end 114 to upper end 112. In the arrangement shown, as one example, sidewalls 110 extend in approximate parallel alignment to the length of side conveyor systems 82.

In this way, the upper end 112 of hoppers 106 are substantially wider than the lower end 114 of hopper 106. This wider upper end 112 of hopper 106 is configured to catch grain as it falls out of hopper 126 of dual hopper belly dump trailer 12. This narrower lower end 114 of hopper 106 is configured to funnel this caught grain to land on the upper surface of pan 146 of upper chamber 152 of side conveyor system 82 so that it can be carried to center conveyor system 22.

Hoppers 106 are sized and shaped and spaced apart from one another to match the spacing of hoppers 126 of conventional dual hopper belly dump trailers 12. In the arrangement shown, as one example, the upper end 112 of hoppers 106 connect to, or terminate just before, the lower end of grates 16 of pit 14. As such, in this way, grain falls from hopper 126 of dual hopper belly dump trailer 12 through grates 16 and into the wide open mouth of hopper 106 just below grate 16 and then into side conveyor system 82. Additional length and width to grates 16 and hoppers 106 provide variability for parking of trailer 12 over pit 14 as well as variability in the location of hoppers 126 in the bottom wall 122 of dual hopper belly dump trailers 12 between makes and models of trailers 12.

Transition Section 182: In the arrangement shown, as one example, the tail section 84 of side conveyor systems 82 connect to a transition section 182 and transition section 182 connects to tail section 24 of center conveyor system 22. Transition section 182 is formed of any suitable size, shape and design and is configured to connect adjacent tail sections 84 of side conveyor systems 82 and allow for grain conveyed by side conveyor systems 82 to be deposited upon the upper surface of pan 146 of upper chamber 152 of tail section 24 of center conveyor system 22.

In the arrangement shown, as one example, transition section 182, and the length of side conveyor systems 82, are positioned above the tail section 24 of center conveyor system 22. In this way, grain conveyed by belts 30 of side conveyor systems 82 may be deposited by gravity onto the upper surface of pan 146 of tail section 24 of center conveyor system 22.

In the arrangement shown, as one example, transition section 182 generally continues the size and shape of housing 88 of side conveyor system 82 past tail sections 84 a distance. However, transition section 182 leaves a space or hollow interior between the shafts 98 of tail sections 84 of adjacent side conveyor systems 82. In this way, when the belts 30 of side conveyor systems 82 reach transition section 182, the belts 30 pass the inward end of pan 146 and wrap around the rotating shaft 98 and sprocket 100 at tail section 84. In doing so, the grain carried by side conveyor system 82 is deposited upon the upper surface of pan 146 of tail section 24 of center conveyor system 22. This grain is then engaged by rotating belt 30 of center conveyor system 22 and conveyed along center conveyor system 22 until deposited out of head section 26 and into grain transfer or storage device 116.

In the arrangement shown, as one example, a funnel 184 is positioned at the forward end of transition section 182 above center conveyor system 22. In the arrangement shown, as one example, funnel 184 angles downward and inward as it extends forward from transition section 182 with the rearward end of funnel 184 connecting to the forward side of transition section 182 and the forward end of funnel 184 connecting to the top wall 142 of housing 28 of center conveyor system 22. In this way, funnel 184 provides additional clearance and room for grain moved by side conveyor systems 82 to settle onto center conveyor system 22. In addition, the downward and forward angling of funnel 184 provides alignment and guidance to the grain to settle upon center conveyor system 22.

In Operation: In one arrangement, single drive dual hopper conveyor system 10 operates in the following manner: A dual hopper belly dump trailer 12 is pulled up and over pit 14. The driver aligns the hoppers 126 of the dual hopper belly dump trailer 12 with the grates 16 of pit 14.

Once the dual hopper belly dump trailer 12 is aligned with the grates 16 of pit 14, the motor 48 is powered. When motor 48 is powered, output shaft 54 of motor 48 rotates. As output shaft 54 rotates this causes first pulley 58 to rotate. As first pulley 58 rotates this causes connector 62 to move. As connector 62 moves this causes second pulley 60 to rotate. The rotation of second pulley 60 is transferred through gearbox 64 to shaft 38 thereby causing shaft 38 and the attached sprocket 40 at head section 26 of center conveyor system 22 to rotate.

As shaft 38 and sprocket 40 at the head section 26 of center conveyor system 22 rotates the teeth of sprocket 40 mesh with the links 32 of belt 30 of center conveyor system 22 thereby causing belt 30 to transition from moving forward through upper chamber 152 to moving rearward through lower chamber 154 at head section 26. Simultaneously, this movement of belt 30 causes belt 30 to rotate around shaft 38 and sprocket 40 at the tail section 24 of center conveyor system 22 thereby causing belt 30 to transition from moving rearward through lower chamber 154 to moving forward through upper chamber 152 at tail section 24.

As belt 30 is driven through housing 28 this causes shaft 38 and sprocket 40 at the tail section 24 to rotate. This rotation of shaft 38 of tail section 24 causes first pulley 68 to rotate. As first pulley 68 rotates this causes connector 72 to move. As connector 72 moves this causes second pulley 70 to rotate. The rotation of second pulley 70 causes shaft 176 to rotate. As shaft 176 rotates this causes gearboxes 74 to transition rotation of shaft 176 to rotation of shafts 98 of head sections 86 of side conveyor systems 82.

As shaft 98 and sprocket 100 at the head section 86 of side conveyor systems 82 rotate the teeth of sprockets 100 mesh with the links 32 of belts 30 of side conveyor systems 82 thereby causing belt 30 to transition from moving forward through upper chamber 152 to moving rearward through lower chamber 154 at head section 86. Simultaneously, this movement of belt 30 causes belt 30 to rotate around shaft 98 and sprocket 100 at the tail section 84 of side conveyor systems 82 thereby causing belt 30 to transition from moving rearward through lower chamber 154 to moving forward through upper chamber 152 at tail section 84.

Notably, because two side conveyor systems 82 are supplying grain to a single center conveyor system 22, in one arrangement, center conveyor system 22 has approximately twice the carrying capacity as side conveyor systems 82. This may be accomplished in one arrangement, by gearing system 10 to cause side conveyor systems 82 to move half as fast as center conveyor system 22. This may be accomplished by appropriately sizing first pulley 68 and/or second pulley 70 and/or the gearing of gearboxes 74. Alternatively, center conveyor system 22 may have a higher carrying capacity by having a deeper or wider belt 30. Or, this may be accomplished by varying any number of variables of the system.

In this way a single motor 48 powers and causes the simultaneous rotation of center conveyor systems 22 as well as two side conveyor systems 82 to rotate with the belts 30 of each of the center conveyor system 22 and side conveyor systems 82 moving from tail section 24/84 to head section 26/86 in upper chamber 152 and moving from head section 26/86 to tail section 24/84 in lower chamber 154.

Now that the belts 30 of each of the center conveyor system 22 and side conveyor systems 82 are rotating through their respective housings 28/88, grain can be deposited into single drive dual hopper conveyor system 10. To do this the gates 128 of the forward and rearward hopper 126 of dual hopper belly dump trailer 12 are opened. As the gates 128 are opened grain drains from the hollow interior 124 of dual hopper belly dump trailer 12 under the force of gravity. This grain falls through grates 16 of pit 14 and is funneled by the end walls 108 and sidewalls 110 of hoppers 106 of side conveyor systems 82 and onto the upper surface of pan 146 adjacent tail sections 84.

As the grain falls into the upper chamber 152 of side conveyor systems 82 adjacent tail section 84 the grain is urged forward by the flights 36 of belt 30 which slide over the upper surface of pan 146. As flights 36 and belt 30 move from tail section 84 to head section 86, the cut-out section 156 of flights 36 fit around guide 160 which provides alignment and guidance to flights 36 and belt 30. In addition, as grain falls through and around the links 32 of belt 30 and into the void caused by cut-out sections 156, guide 160 sheds the grain to the sides and into the path of flights 36.

Flights 36 and belt 30 continue to push grain forward from tail section 84 to head section 86 until belt 30 rotates around shaft 98 and sprocket 100 at head section 86. At this point the carried grain falls in the hollow interior of transition section 182 and onto the upper surface of pan 146 adjacent tail section 24 of center conveyor system 22.

As the grain falls into the upper chamber 152 of center conveyor system 22 adjacent tail section 24 the grain is urged forward by the flights 36 of belt 30 which slide over the upper surface of pan 146. As flights 36 and belt 30 move from tail section 24 to head section 26, the cut-out section 156 of flights 36 fit around guide 160 which provides alignment and guidance to flights 36 and belt 30. In addition, as grain falls through and around the links 32 of belt 30 and into the void caused by cut-out sections 156, guide 160 sheds the grain to the sides and into the path of flights 36.

Flights 36 and belt 30 continue to push grain forward from tail section 84, through horizontal section 130, through corner section 132, through inclined section 134 to head section 26 until belt 30 rotates around shaft 38 and sprocket 40 at head section 26. At this point the carried grain falls through opening 174 of head section 26 and into grain transfer or storage device 116.

In this way a single drive dual hopper conveyor system 10 is presented that operates using only a single motor 48. This provides significant advantages while also causing substantial complexities. One of the benefits is that all three belts 30 rotate simultaneously, thereby preventing the possibility that one or more of the belts 30 fail to operate thereby causing a plug.

Alternative Arrangements:

With reference to FIGS. 29-35, various alternative arrangements of single drive dual hopper conveyor system 10 are presented. Some components of single drive dual hopper conveyor system 10 presented in FIGS. 29-35 are similar to those of single drive dual hopper conveyor system 10 presented in FIGS. 1-28 and therefore the teaching presented herein with respect to FIGS. 1-28 may be applied to and is incorporated into the teaching presented in FIGS. 29-35 unless specifically stated otherwise.

Through careful observation, it has been observed that in corner section 132 of center conveyor system 22, frictional engagement between top wall 142 of housing 28 and belt 30 and/or flights 36 can create buildup of excessive heat. Such buildup of heat may cause excessive wear or may damage grain that is transported though center conveyor system 22. Such frictional engagement may occur, for example due to tension on belt 30 pulling belt 30 and flights 36 toward top wall 142 of housing 28 in corner section 132. In one or more arrangement, system 10 center conveyor system 22 includes a belt support arrangement 188 to reduce frictional engagement between top wall 142 of housing 28 and belt 30 and/or flights 36.

Belt Support Arrangement 188: Belt support arrangement 188 is formed of any suitable size, shape, or design, and is configured to maintain separation between top wall 142 of housing 28 and belt 30. In the arrangement shown, belt support arrangement 188 includes a rail 190 connected to top wall 142 of housing 28 by a bracket 204. In this example arrangement, rail 190 is positioned directly above belt 30 in the center of housing 28. In this example arrangement, when belt 30 is pulled upward, rail 190 will engage belt 30 and maintain a minimum separation between the upper edge of belt 30 and the bottom interior surface of top wall 142 of housing 28. Because flights 36 are connected to belt 30, separation between belt 30 and flights 36 is also maintained. In this manner, frictional engagement with top wall 142 of housing 28 is reduced.

While belt support arrangement 188 is primarily described with reference to an implementation such as rail 190, embodiments are not so limited. Rather, it is contemplated that belt support arrangement 188 may be implemented using various other structures, mechanisms, and/or methods. For example, in one or more embodiments, belt support arrangement 188 may include one or more chain sprockets or pulleys connected to or adjacent top wall 142 of housing 28 and configured to engage belt 30.

One of the benefits of using one or more sprockets or pulleys is that this arrangement may reduce friction and the generation of heat, by having the sprockets or pulleys rotate on low-friction bearings. Another benefit of using one or more sprockets or pulleys is that this arrangement may allow for increased guidance of belt 30 by having engagement between the teeth of the sprockets or pulleys and links 32 of belt 30.

However, the use of sprockets or pulleys in this arrangement may have undesirable drawbacks, such as the potential to create sparks and start fires within center conveyor system 22. Another potential undesirable drawback to using sprockets or pulleys in this arrangement includes the potential to crush grain between the points of contact between the sprockets and pulleys and belt 30.

Rail 190: Rail 190 is formed of any suitable size, shape, or design, and is configured to facilitate low friction engagement with belt 30 and maintain separation between top wall 142 of housing 28 and belt 30. In the arrangement shown, as one example, rail 190 has a generally planar shape extending between a top edge 192, a bottom edge 194, a front end 196, and a rear end 198. In this example arrangement, top edge 192 and bottom edge 194 are generally parallel edges having a curve that matches a curve of top wall 142 in corner section 132 of center conveyor system 22. In this example arrangement, rail 190 includes angled sections 200 at front end 196 and rear end 198, where bottom edge 192 of rail 190 angles toward top edge 192. Angled sections assist to smoothly guide belt 30 onto and off of rail 190. In this example arrangement, rail 190 includes a set of holes 202 to facilitate s attachment with bracket(s) 204 by fasteners 158.

In the arrangement shown, as one example, in FIGS. 29-31B, a gap is placed in flights 36 above links 32 of belt 30. This gap provides access for rail 190 to engage links 32 of belt 30 such that rail 190 may ride directly upon the upper surface of links 32 of belt 30.

In various different arrangements, rail 190 may be formed from various materials having lower coefficient of friction than the material used to form to top wall 142 to reduce friction in corner section 132 including but not limited to, for example, metals, plastics, ceramics, or any other material. In one or more arrangements, rail 190 are formed of a plastic or composite or non-metallic material, such as an ultra-high molecular weight polyethylene (UHMW) or other UHMW or similar material. In some embodiments, using a non-metallic material may provide a number of benefits including, for example, being easier or softer on the grain, being easier on the other components of the system, being more-durable than metal, being self-lubricating, being lighter than metal, being lower friction, being impact resistant, being quieter, having less potential for sparking or starting a fire, and/or eliminating metal on metal contact among many other benefits.

Bracket 204: Bracket 204 is formed of any suitable size, shape, or design, and is configured to facilitate attachment of rail 190 to top wall 142. In this example arrangement, in corner section 132 of center conveyor system 22 includes two brackets 204 that are positioned in parallel and configured to receive and hold rail 190 therebetween. In this example arrangement, each bracket 204 has a generally planar shape extending between a top edge 210, a bottom edge 212, a front end 214, and a rear end 216. In this example arrangement, top edge 210 and bottom edge 212 are generally parallel edges having a curve that matches a curve of top wall 142.

In this example arrangement, each bracket 204 has holes 202 that align with holes 202 of rail 190 when rail 190 is held between the brackets 204. In this example arrangement, rail 190 is attached to brackets 204 by fasteners 158, which are inserted through holes 202 in brackets 204 and rail 190. However, embodiments are not so limited. Rather, it is contemplated that rail 190 may be connected to bracket by any manner, method or means including but not limited to, for example, being screwed, bolted, welded, adhered, or any combination thereof, or connected in any other way. Alternatively, in some arrangements, rail 190 may be connected directly to top edge 190 and bracket(s) 204 may be omitted.

In this example arrangement, top edge 210 of each bracket 204 is welded to top wall 142, or formed as part of top wall 142. However, embodiments are not so limited. Rather, it is contemplated that bracket 204 may be connected to top wall 142 by any manner, method or means including but not limited to, for example, being screwed, bolted, welded, adhered, or any combination thereof, or connected in any other way.

From the above discussion it will be appreciated that one or more embodiment provide a single drive dual hopper conveyor system: that improves upon the state of the art and meets all of its objectives; that improves efficiencies; that reduces unload time; that eliminates the need to move a grain trailer during the unload process; that increases unload speed; that increases unload capacity; that is relatively inexpensive; that makes it easier for a driver to unload a dual hopper belly dump grain trailer; that is easy to install; that can be used with practically any grain storage facility; that can be used with practically any grain processing facility; that has a long useful life; that is durable; that has a robust design; that is high quality; that can be used with practically any dual hopper belly dump grain trailer; that is easy to use; that allows for the simultaneous emptying of both hoppers at the same time; that only requires the use of a single motor; that is easy to control; that is essentially foolproof to operate; that requires minimal wiring to install; that prevents the side conveyors from driving at different speeds; that has a minimal risk of plugging; that it gentle on grain; and/or that requires a minimal amount of energy to operate. These and other objects, features, or advantages of the disclosure will become apparent from the specification, figures, and claims.

Exemplary Embodiments

In one or more embodiments, a single drive dual hopper conveyor system is provided. The system comprises: a center conveyor system; the center conveyor system extending from a tail section to a head section; a pair of side conveyor systems; the side conveyor systems extending from a tail section to a head section; a motor operatively connected to the center conveyor system; the side conveyor systems operatively connected to the center conveyor system; wherein operation of the motor simultaneously drives operation of the center conveyor system and drives operation of the side conveyor systems.

In one or more implementations, the system further comprises: a hopper associated with each of the side conveyor systems, wherein each side conveyor systems is configured to receive grain through the associated hopper, wherein each side conveyor system is configured to convey the received grain to the center conveyor system.

In one or more implementations, the side conveyor systems are configured to convey grain toward the center conveyor system.

In one or more implementations, the head section of the side conveyor systems is positioned adjacent and above the tail section of the center conveyor system such that grain conveyed from the side conveyor systems is dispensed onto the center conveyor system.

In one or more implementations, the side conveyor systems are positioned in approximate linear alignment with one another and wherein the center conveyor system is positioned in approximate perpendicular alignment to the side conveyor systems.

In one or more implementations, the side conveyor systems include a belt, wherein the side conveyor systems are configured to carry grain on an upper side of the belt.

In one or more implementations, the center conveyor system includes a belt, wherein the center conveyor system is configured to carry grain on an upper side of the belt.

In one or more implementations, the side conveyor systems include a belt having a plurality of links, pans, and flights.

In one or more implementations, the center conveyor system includes a belt having a plurality of links, pans, and flights.

In one or more implementations, the motor is configured to rotate a shaft connected to the head section of the center conveyor system.

In one or more implementations, the motor is operatively connected to a gearbox that is operatively connected to a shaft connected to the head section of the center conveyor system.

In one or more implementations, the tail section of the center conveyor system is operatively connected to the head section of the side conveyor systems such that rotation of the center conveyor system causes rotation of the side conveyor systems.

In one or more implementations, the system further comprises: a gearbox positioned between each side conveyor systems and the center conveyor system.

In one or more embodiments, a single drive dual hopper conveyor system is provided. The system comprises: a center conveyor system; the center conveyor system extending from a tail section to a head section; a pair of side conveyor systems; the side conveyor systems extending from a tail section to a head section; a motor operatively connected to the head section of the center conveyor system; the tail section of the center conveyor system operatively connected to the head section of the side conveyor systems; wherein operation of the motor simultaneously drives operation of the center conveyor system and drives operation of the side conveyor systems.

In one or more implementations, the system further comprises: a hopper associated with each of the side conveyor systems, wherein each side conveyor system is configured to receive grain through the associated hopper, wherein each side conveyor system is configured to convey the received grain to the center conveyor system.

In one or more implementations, the side conveyor systems are configured to convey grain toward the center conveyor system.

In one or more implementations, the head section of the side conveyor systems is positioned adjacent and above the tail section of the center conveyor system such that grain conveyed from the side conveyor systems is dispensed onto the center conveyor system.

In one or more implementations, the side conveyor systems are positioned in approximate linear alignment with one another and wherein the center conveyor system is positioned in approximate perpendicular alignment to the side conveyor systems.

In one or more implementations, the side conveyor systems include a belt, wherein the side conveyor systems are configured to carry grain on an upper side of the belt.

In one or more implementations, the center conveyor system includes a belt, wherein the center conveyor system is configured to carry grain on an upper side of the belt.

In one or more implementations, the side conveyor systems include a belt having a plurality of links, pans, and flights.

In one or more implementations, the center conveyor system includes a belt having a plurality of links, pans, and flights.

In one or more implementations, the motor is configured to rotate a shaft connected to the head section of the center conveyor system.

In one or more implementations, the motor is operatively connected to a gearbox that is operatively connected to a shaft connected to the head section of the center conveyor system.

In one or more implementations, the tail section of the center conveyor system is operatively connected to the head section of the side conveyor systems such that rotation of the center conveyor system causes rotation of the side conveyor systems.

In one or more implementations, further comprising a gearbox positioned between each side conveyor system and the center conveyor system.

In one or more embodiments, a single drive dual hopper conveyor system is provided. The system comprises: a pair of side conveyor systems; the side conveyor systems extending from a tail section to a head section; a hopper associated with each side conveyor system that is configured to direct grain to the associated side conveyor system; the pair of side conveyor systems operatively connected to a center conveyor system; the center conveyor system extending from a tail section to a head section; a motor operatively connected to the center conveyor system; the tail section of the center conveyor system operatively connected to the head section of the side conveyor systems; wherein operation of the motor simultaneously drives operation of the center conveyor system and drives operation of the side conveyor systems.

In one or more implementations, each side conveyor systems is configured to receive grain through the associated hopper, wherein each side conveyor system is configured to convey the received grain to the center conveyor system.

In one or more implementations, the side conveyor systems are configured to convey grain toward the center conveyor system.

In one or more implementations, the head section of the side conveyor systems is positioned adjacent and above the tail section of the center conveyor system such that grain conveyed from the side conveyor systems is dispensed onto the center conveyor system.

In one or more implementations, the side conveyor systems are positioned in approximate linear alignment with one another and wherein the center conveyor system is positioned in approximate perpendicular alignment to the side conveyor systems.

In one or more implementations, the side conveyor systems include a belt, wherein the side conveyor systems are configured to carry grain on an upper side of the belt.

In one or more implementations, the center conveyor system includes a belt, wherein the center conveyor system is configured to carry grain on an upper side of the belt.

In one or more implementations, the side conveyor systems include a belt having a plurality of links, pans, and flights.

In one or more implementations, the center conveyor system includes a belt having a plurality of links, pans, and flights.

In one or more implementations, the motor is configured to rotate a shaft connected to the head section of the center conveyor system.

In one or more implementations, the motor is operatively connected to a gearbox that is operatively connected to a shaft connected to the head section of the center conveyor system.

In one or more implementations, the tail section of the center conveyor system is operatively connected to the head section of the side conveyor systems such that rotation of the center conveyor system causes rotation of the side conveyor systems.

In one or more implementations, the system further comprises: a gearbox positioned between each side conveyor system and the center conveyor system.

In one or more embodiments, a single drive dual hopper conveyor system is provided. The system comprises: a first hopper; a first side conveyor system; wherein the first hopper provides a path for grain to the first side conveyor system; a second hopper; a second side conveyor system; wherein the second hopper provides a path for grain to the second side conveyor system; a center conveyor system; a motor; wherein the motor is operably connected to the first side conveyor system, the second side conveyor system and the center conveyor system; wherein the motor is configured to simultaneously operate the first side conveyor system, the second side conveyor system and the center conveyor system.

In one or more implementations, the first side conveyor system is a conveyor.

In one or more implementations, the first conveyor system is a drag chain.

In one or more implementations, the first conveyor system is an auger.

In one or more implementations, the first conveyor system is a belt.

In one or more implementations, the first conveyor system, the second conveyor system and the center conveyor system are selected from the group consisting of a conveyor, a drag chain, an auger, and a belt.

In one or more implementations, the first conveyor system and the second conveyor system are configured to carry grain toward the center conveyor system positioned approximately at the center between the first conveyor system and the second conveyor system.

In one or more implementations, the first conveyor system and the second conveyor system are housed within a housing.

In one or more implementations, the first hopper and second hopper are connected to a housing.

In one or more implementations, the center conveyor system has a head section and a tail section, wherein the tail section is positioned between the first side conveyor system and the second side conveyor system.

In one or more implementations, the center conveyor system has a tail section and a head section, wherein the head section feeds grain to an exterior grain transfer or storage device.

In one or more implementations, the motor is operably connected to the center conveyor system, the first conveyor system and the second conveyor system by a chain drive system or a belt drive system.

In one or more implementations, the first hopper of the first side conveyor system is configured to receive grain from a first hopper of a grain trailer and the second hopper of the second side conveyor system is configured to receive grain from a second hopper of the grain trailer simultaneous with the motor operating the first conveyor system, the second conveyor system and the center conveyor system.

In one or more embodiments, a high side conveyor system is provided. The system comprises: a housing; the housing having an upper chamber; the housing having a lower chamber; the housing having a pan; the pan having an upper surface; the pan having a lower surface; the pan positioned between the upper chamber and the lower chamber; a belt; the belt positioned within the housing such that the belt travels forward in the upper chamber; the belt positioned within the housing such that the belt travels rearward in the lower chamber; the belt having a plurality of links; the belt having a plurality of flights; the flights having a cut-out section; a guide; the guide positioned within the cut-out section; the guide configured to prevent the buildup of grain within the area of the cut-out section.

In one or more implementations, the guide is connected to the upper surface of the pan.

In one or more implementations, the guide has a peaked upper surface that is configured to shed grain to the sides of the guide.

In one or more implementations, the guide has a pair of opposing sidewalls that extend upward from the upper surface of the pan, wherein the guide has a pair of end walls that extend upward from the sidewalls that connect to one another at an angled peak.

In one or more implementations, the guide provides guidance and alignment to the belt as the belt travels through the housing.

In one or more implementations, the links of the belt are engaged by a sprocket at ends of the housing.

In one or more implementations, the pan, the guide and the links are formed of a metallic material, and wherein the flights are formed of a non-metallic material.

In one or more embodiments, a high side conveyor system is provided. The system comprises: a housing; the housing having a chamber; the housing having a pan; the pan having an upper surface; a belt; the belt positioned within the housing such that the belt travels over the pan; the belt having a plurality of links; the belt having a plurality of flights; the flights having a cut-out section; a guide; the guide positioned within the cut-out section; the guide configured to prevent the buildup of grain within the area of the cut-out section.

In one or more implementations, the pan, the guide, and the links are formed of a metallic material, and wherein the flights are formed of a non-metallic material.

In one or more implementations, the belt travels forward in an upper chamber of the housing.

In one or more implementations, the belt travels rearward in a lower chamber of the housing.

It will be appreciated by those skilled in the art that other various modifications could be made to the device without parting from the spirit and scope of this disclosure. All such modifications and changes fall within the scope of the claims and are intended to be covered thereby.

What is claimed:

1. A conveyor system, comprising:
   a first conveyor system;
   the first conveyor system extending from a tail section to a head section;
   a motor operatively connected to the first conveyor system;
   wherein the first conveyor system includes an upward curved section positioned between the tail section and the head section;
   wherein the first conveyor system includes a housing;
   wherein the first conveyor system includes a drag chain having links and a plurality of flights;
   wherein the drag chain is configured to transport grain through the housing from a tail end to a head end;
   wherein the housing includes a top wall;
   wherein the first conveyor system includes a support arrangement positioned adjacent the top wall in the curved section;
   wherein the support arrangement is configured to maintain separation between the top wall of housing and the drag chain during operation.

2. The system of claim 1, further comprising a pair of side conveyor systems;
   the side conveyor systems extending from a tail section to a head section;

the side conveyor systems operatively connected to the first conveyor system;
wherein operation of the motor simultaneously drives operation of the first conveyor system and drives operation of the side conveyor systems.

3. The system of claim 1, further comprising a pair of side conveyor systems;
the side conveyor systems extending from a tail section to a head section;
the side conveyor systems operatively connected to the first conveyor system;
wherein operation of the motor simultaneously drives operation of the first conveyor system and drives operation of the side conveyor systems
a hopper associated with each of the side conveyor systems, wherein each side conveyor systems is configured to receive grain through the associated hopper, wherein each side conveyor system is configured to convey the received grain to the first conveyor system.

4. The system of claim 1, further comprising a pair of side conveyor systems;
wherein the side conveyor systems are configured to convey grain toward the first conveyor system.

5. The system of claim 1, further comprising a pair of side conveyor systems;
the side conveyor systems extending from a tail section to a head section;
wherein the head section of the side conveyor systems are positioned adjacent and above the tail section of the first conveyor system such that grain conveyed from the side conveyor systems is dispensed onto the first conveyor system.

6. The system of claim 1, further comprising a pair of side conveyor systems;
wherein the side conveyor systems are positioned in approximate linear alignment with one another and wherein the first conveyor system is positioned in approximate perpendicular alignment to the side conveyor systems.

7. The system of claim 1, wherein the motor is configured to rotate a shaft connected to the head section of the first conveyor system.

8. The system of claim 1, wherein the motor is operatively connected to a gearbox that is operatively connected to a shaft connected to the head section of the first conveyor system.

9. The system of claim 1, further comprising a pair of side conveyor systems;
wherein the tail section of the first conveyor system is operatively connected to the head section of the side conveyor systems such that rotation of the first conveyor system causes rotation of the side conveyor systems.

10. The system of claim 1, further comprising a gearbox positioned between each side conveyor system and the first conveyor system.

11. A conveyor system, comprising:
a center conveyor system;
wherein the center conveyor system includes a drag chain having links and a plurality of flights;
wherein the plurality of flights include a cut-out section positioned below the links of the drag chain;
a guide;
the guide positioned within the cut-out section of the plurality of flights in alignment with and below the links of the drag chain;
the guide configured to prevent the buildup of grain within the area of the cut-out section of the plurality of flights.

12. The system of claim 11, further comprising:
a first hopper;
a first side conveyor system;
wherein the first hopper provides a path for grain to the first side conveyor system;
a second hopper;
a second side conveyor system;
wherein the second hopper provides a path for grain to the second side conveyor system.

13. The system of claim 11, further comprising:
a first side conveyor system;
a second side conveyor system;
wherein the center conveyor system has a head section and a tail section, wherein the tail section is positioned between the first side conveyor system and the second side conveyor system.

14. The system of claim 11, wherein the center conveyor system has a tail section and a head section, wherein the head section feeds grain to an exterior grain transfer or storage device.

15. The system of claim 11, further comprising:
a motor;
a first side conveyor system;
a second side conveyor system;
wherein the motor is operably connected to the center conveyor system, the first conveyor system and the second conveyor system by a chain drive system or a belt drive system.

16. A high side conveyor system, comprising:
a housing;
the housing having an upper chamber;
the housing having a lower chamber;
the housing having a divider separating the upper chamber and the lower chamber;
a drag chain having links and a plurality of flights; the drag chain positioned within the housing such that the drag chain travels forward in the upper chamber;
the drag chain positioned within the housing such that the drag chain travels rearward in the lower chamber;
wherein each of the plurality of flights has a first cut-out section;
a guide;
the guide positioned within the first cut-out section; the guide configured to prevent the buildup of grain within the area of the cut-out section.

17. The system of claim 16, further comprising a support arrangement;
wherein the conveyor system includes a first straight section configured to transport grain horizontally,
wherein the conveyor system includes a second straight section configured to transport grain at an inclined angle; and
wherein the conveyor system includes a curved section configured to transport grain from the first straight section to the second straight section;
wherein the housing includes a top wall;
wherein the support arrangement is positioned on the top wall in the curved section;
wherein the flights have a second cut-out section;
wherein the support arrangement is positioned within the second cut-out section;
wherein the support arrangement is configured to maintain separation between top wall of housing and drag chain during operation.

18. The system of claim 16, further comprising a support arrangement;
  wherein the conveyor system includes a first straight section configured to transport grain horizontally,
  wherein the conveyor system includes a second straight section configured to transport grain at an inclined angle; and
  wherein the conveyor system includes a curved section configured to transport grain from the first straight section to the second straight section;
  wherein the housing includes a top wall extending from the first straight section to the second straight section;
  wherein the support arrangement is positioned on the top wall in the curved section;
  wherein the support arrangement is configured to maintain separation between the top wall of the housing and the drag chain;
  wherein the support arrangement includes a rail operably connected to the top wall;
  the rail having an elongated planar shape extending from an upper edge to a lower edge and between opposing ends;
  wherein the upper edge of the rail is operably connected to the top wall of the housing;
  wherein the lower edge of the rail is configured to engage the drag chain during operation;
  wherein the flights have a second cut-out section;
  wherein the rail is positioned within the second cut-out section.

19. The system of claim 16, wherein the guide is connected to an upper surface of the lower chamber.

20. The system of claim 16, wherein the guide has a peaked upper surface that is configured to shed grain to one or more sides of the guide.

21. The system of claim 16, wherein the housing includes a divider separating the upper chamber and lower chamber;
  wherein the guide has a pair of opposing sidewalls that extend upward from the upper surface of the divider,
  wherein the guide has a pair of end walls that extend upward from the sidewalls that connect to one another at an angled peak.

22. The system of claim 16, wherein the guide provides guidance and alignment to the drag chain as the drag chain travels through the housing.

23. The system of claim 16, wherein the links of the drag chain are engaged by a sprocket at ends of the housing.

24. The system of claim 16, wherein the housing includes a divider separating the upper chamber and lower chamber;
  wherein the divider, the guide and the links are formed of a metallic material, and wherein the flights are formed of a non-metallic material.

25. The system of claim 16, wherein the system transports grain in the upper chamber of the housing.

26. A high side conveyor system, comprising:
  a housing;
  a drag chain having links and a plurality of flights;
  wherein the drag chain is configured to transport grain through the housing from a tail end to a head end;
    wherein the housing includes a first section configured to transport grain at a first angle,
  wherein the housing includes a second section configured to transport grain at a second angle;
  wherein the second angle is greater than the first angle;
  wherein the housing includes a curved section configured to transport grain from the first section to the second section;
  wherein the housing includes an upper wall;
  a support arrangement;
  wherein the support arrangement is configured to maintain separation between the upper wall of housing and the drag chain during operation.

27. The system of claim 26, wherein the support arrangement is a rail.

28. The system of claim 26, wherein the support arrangement is a rail formed of a non-metallic material.

29. The system of claim 26, wherein each of the plurality of flights has a cut-out section;
  wherein the support arrangement is positioned within the cut-out section.

30. The system of claim 26, wherein the first angle is horizontal.

* * * * *